United States Patent [19]
Nelson et al.

[11] Patent Number: 5,222,361
[45] Date of Patent: Jun. 29, 1993

[54] ROCKETJET ENGINE

[76] Inventors: Daniel E. Nelson; Anju Nelson, both of 605 S. North Lake Blvd., No. 91,, Altamonte, Springs, Fla. 32701

[21] Appl. No.: 713,099

[22] Filed: Jun. 11, 1991

Related U.S. Application Data

[63] Continuation-in-part of Ser. No. 227,766, Aug. 3, 1988, abandoned.

[51] Int. Cl.$^5$ ............................................. F02K 3/00
[52] U.S. Cl. ........................................ 60/269; 60/729
[58] Field of Search ................ 60/39.33, 39.53, 39.55, 60/226.1, 262, 269, 729

[56] References Cited

U.S. PATENT DOCUMENTS 3,541,795 11/1970 Nelson ................................. 123/532
3,570,463 3/1971 Nelson ................................. 60/269

Primary Examiner—Richard A. Bertsch
Assistant Examiner—W. T. Wicker

[57] ABSTRACT

A rocketjet engine has a light, hollow double-acting compressor piston (35 and 123). It is reciprocated by a smaller-diameter double-acting power piston (51) through a power shaft (52 and 60) connecting them. Up to 90 percent of intake air is routed from a compressor cylinder (36) to a thruster (1 and 106) and the remaining ten percent to a power cylinder (55). Fuel and water are preheated and sprayed into the power cylinder with phase-change injectors 67–70 at ends of compression strokes after complete flame-front propagation to actuate the compressor with combined combustion and steam pressure. To provide steam-propulsion pressure in addition to peak-heat combustion pressure and to cool the thruster, fuel is preheated and spray injected into an upstream combustor (8 and 109) portion of the thruster (1 and 106). Water is added as wet steam through a flash-boiler-steam injector (30) at a downstream portion of the combustor in order achieve prior peak combustion heat, pressure and completeness of flame propagation. Variable nozzle-to-throat-ratio thrusters (1) maximize thrust efficiency at any atmospheric or space altitude. Fixed-nozzle-to-throat-ratio thrusters (106) maximize efficiency and low weight at dedicated altitude ranges. A porous intake cone (90) has less frontal drag than pointed rocket engines. Various vibration-damping, power-take-off and operational features are provided.

52 Claims, 15 Drawing Sheets

FIG. 11

FIG.13
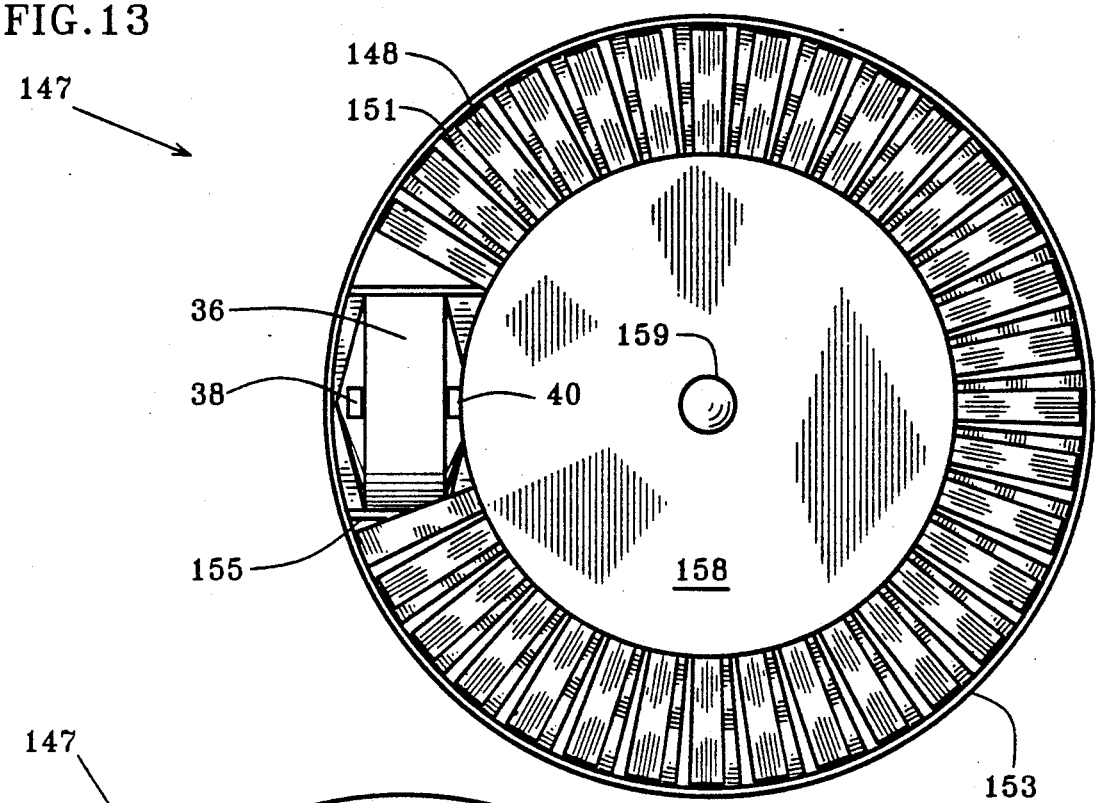
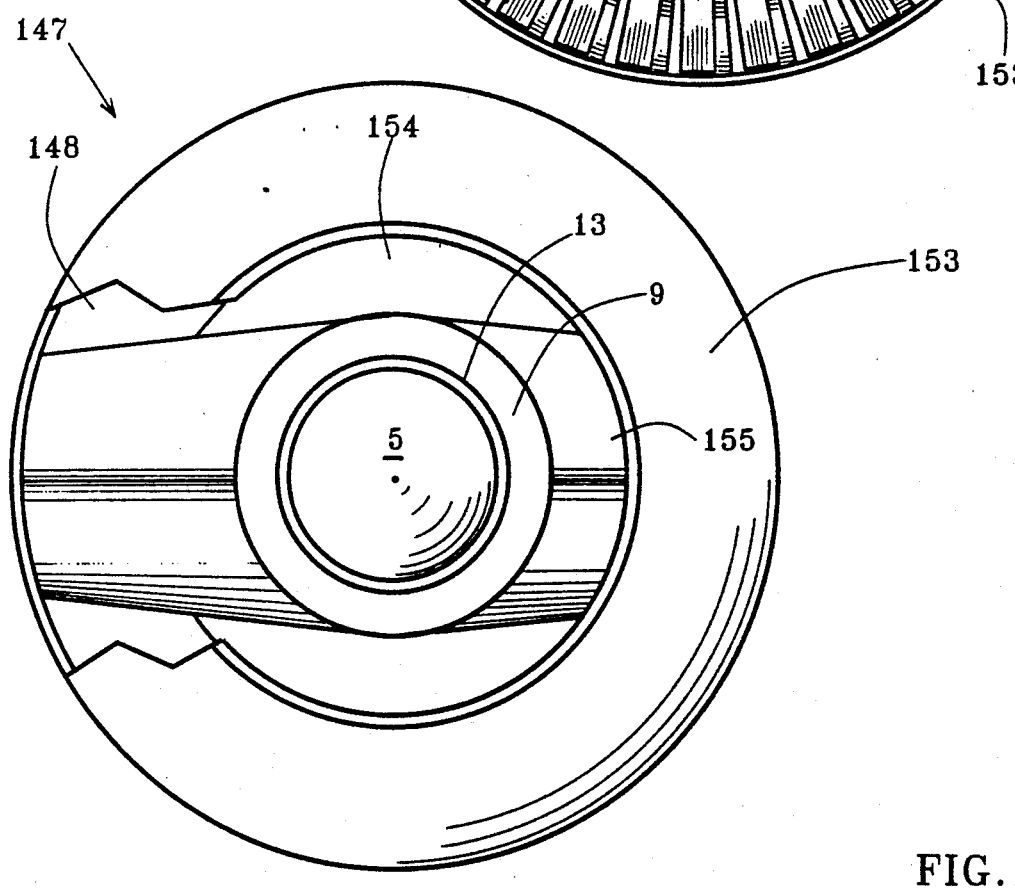
FIG.14

ROCKETJET ENGINE

This is a continuation-in-part of U.S. application having Ser. No. 07/227,766 with a filing date of Aug. 3, 1988 by Applicant Daniel E. Nelson et al titled ROCKETJET ENGINE, abandoned.

BACKGROUND OF THE INVENTION

1. Field of the Invention

This invention relates to rocket and jet engines. More particularly, it is a reaction engine which is convertible interchangeably and variably in flight between air-breathing and on-board-oxidizer modes of operation by use of reciprocative actuation of a double-acting compressor piston by a double-acting power piston directly through a reciprocative power shaft connecting them to compress air for air-breathing mode to a thruster with flash-boiler-steam injection of water into a double-ended power cylinder and separate flash-boiler-steam injection of water into a thruster as a cooling propellant to utilize heat of stoichiometric combustion completely for compression by a compressor for variable or complete air-breathing mode and for selectively variable or complete air-breathing and rocket thrust modes with the same thruster for both modes.

2. Description of Related Art.

It has been known since the beginning of the Rocket Era that there would be no need for the massive costs, danger and confining utility of blast-off rocketry if an air-breathing jet engine could provide the efficiency and stratospheric thrust velocity of a liquid rocket engine and if it were convertible interchangeably in flight between jet and rocket modes of operation. Such an engine would make space flight less expensive than present long-distance commercial air flight. More speed per fuel consumption could be achieved with decreasing resistance at stratospheric and space altitudes. Short-distance air flight also would be far less expensive.

That is the objective and nature of this invention. It solves problems of present air-breathing and rocket reaction engines to make possible a rocketjet engine that combines the best features and performs the best functions of each synergistically. With different structure and different working relationships of parts, it is a highly versatile reaction engine with far greater effectiveness and economy than present rocket engines, space systems, jet engines, propeller engines and helicopter systems. The effects can be similar for high-speed marine transportation and water propulsion systems.

Turbojet engines require airflow-overrun cooling for maintaining material integrity of turbine blades and associated engine parts. Excess air for the overrun cooling is compressed to full combustion-supportive pressure along with air utilized to achieve complete combustion even though only minimal mass augmentation is derived from it as an added thrust benefit. Decrease of combustion heat decreases combustion pressure by the same two-thirds proportion, leaving only one-third as much pressure to cause exhaust velocity for achieving thrust. This occurs upstream from venturi "squirting" of a mixture of combustion gases and overrun air. It is upstream also from velocity-retarding turbine power-take-off for operating a turbine compressor. Mass-flow is increased by the excess air but with the high penalty of decreased pressure from the cooling required. Because the cooling air does not add expansion pressure independently of combustion pressure, mixture of combustion gases with the cooling air decreases exhaust velocity as a result of both heat reduction and inertial resistance more than though the mixture occurred downstream from a thruster venturi for mass augmentation. As a result of these factors, exhaust velocity is approximately one-third of the velocity of liquid rocket engines that an air-breathing jet engine could achieve without airflow overrun cooling and without obstruction by turbine blades. Exhaust velocity and cooling of a turbine engine in rocket mode would be inadequate for convertibility between rocket and jet modes of operation. Consequently, turbojet engines are incapable of providing sufficient propellant efficiency and exhaust velocity in the atmosphere and in the stratosphere for achieving earth-orbital or earth-escape velocity either in combination with a rocket engine or separately.

Solid rocket engines and ram jet engines separately or together also are incapable of providing sufficient atmospheric thrust for economically-feasible space travel. The technical reasons are different. Solid rocket engines contain materials that "host" solid fuel, that cool thruster housing and that, therefore, decrease exhaust temperature, pressure and velocity to approximately two-thirds that of liquid rocket engines. In addition, solid rocket engines are heavy in proportion to their achievable thrust because propellant is carried in a thruster that must be heavily constructed to contain combustion pressure and heat. Propellant host material also adds weight to solid rocket engines.

Ram-jet-engine air-scoop resistance is, in effect, vehicle resistance. Vehicle resistance resulting from ram pressurization increases propulsive power and propellant required proportionately. Fuel is injected at a sufficient rate greater than stoichiometric requirements to achieve propulsive combustion at a high flow rate of ram-compressed air. Initial ram-pressurization speed must be provided by turbojet, solid rocket or liquid rocket engine system. It is a thrust-augmentation engine which must be separated from a host engine after providing a stage of thrust assistance for most applications. But it provides this assistance at high penalties of fuel weight from high fuel consumption and from vehicle resistance. To the extent that air or other oxidizer can be pressurized sufficiently without it, ram-jet engines and partial ram pressurization in any type of engine should be avoided to the fullest extent possible.

In liquid rocket engines, cooling losses are largely avoided because there are no turbine blades or other moving machinery to cool for maintaining material integrity. For this reason, liquid-rocket exhaust velocity is approximately three times that of turbojet engines. However, rocket engines must propel themselves or be propelled sufficiently far into the stratosphere with the aid of other engine systems to achieve space flight.

Various combinations of ram-jet, turbojet, solid-rocket and liquid-rocket engines may be devised to achieve space flight with a space plane as currently being attempted by U.S. sponsorship through NASA and by sponsorships of other governments. However, the costs are astronomically exorbitant and the effects are infinitesimal in comparison to what can be achieved with this invention.

Prior U.S. Pat. No. 3,541,795 issued to the same primary inventor, Daniel E. Nelson, on Nov. 24, 1970 described an earlier version of a rocketjet engine. Unlike this invention, however, it did not have a means for preventing pistons from hitting ends of cylinders in reciprocative travel. There was no rotational power-take-off for operating peripheral equipment or for operating an optional propeller for low-altitude atmospheric thrust augmentation. It was limited to a regenerative chamber outside of a combustion cylinder. Nor did it provide flash-boiler-steam injection of water as a propellant and other significant features of this invention.

Similar principles in a totally different mechanical system using special turbine components were described in U.S. Pat. No. 3,308,626 for a convertible turbine-ram-rocket engine issued to the same inventor, Daniel E. Nelson, on Mar. 14, 1967.

Similar mechanical components in totally different products with different working relationships of parts are explained in the following additional patents issued to the same inventor.

| | | |
|---|---|---|
| 3,570,463 | Nelson | Regenerative Piston (Shaft) Engine |
| 3,685,294 | Nelson | Hot Gas Pumps and Thrusters |
| 3,916,702 | Nelson | Double Roller Cam Drive |
| 3,999,402 | Nelson | Regenerative Refrigerator |

No anticipating prior art has been found and none is believed to exist.

SUMMARY OF THE INVENTION

Objectives of this invention are to:

1. Provide higher thrust velocity in either air-breathing or rocket mode than achievable with known rocket engines;
2. Provide in-flight interchangeability between air-breathing jet and on-board-oxidizer modes of operation in the atmosphere and in oxygen-existing levels of the stratosphere;
3. Provide complete variability in proportions of rocket and air-breathing modes of operation in the atmosphere and in oxygen-existing levels of the stratosphere;
4. Provide rocket-only propulsion at any desired altitude;
5. Provide up to twenty-five percent greater thermal efficiency in rocket mode than possible with known rocket engines;
6. Provide one-third of the fuel consumption for propulsive power of any known air-breathing reaction engine;
7. Provide in excess of fifteen times the thrust per weight of known turbojet engines;
8. Provide wet-steam marine reaction propulsion with aircraft speeds;
9. Provide high-speed marine propulsion for less than one-third of the cost per thrust of other known high-speed marine propulsion engines;
10. Decrease ram-pressurization resistance to less than one-third per thrust level of known turbojet engines;
11. Provide in excess of five times the flow rate of compressed air per weight of engine system of known turbine engines;
12. Utilize all air compressed by the engine system for generation of combustion pressure;
13. Achieve stoichiometric mixture ratio of fuel and oxidizer in both air-breathing and rocket modes;
14. Avoid all waste-heat cooling in both air-breathing and rocket modes;
15. Avoid all resistance to thrust by moving parts;
16. Decrease engine drag in both rocket and air-breathing modes to less than achievable with conventional rocket engines;
17. Provide increased thrust with flash-broiler-injected water in the form of wet steam as a propellant with thrust potential competitive with known liquid fuels at a water-injection ratio of up to forty-percent of fuel by weight without deterring completeness of combustion;
18. Provide efficient and convenient rotational power-take-off for operating peripheral equipment and vehicle systems;
19. Provide means to prevent pistons from contacting ends of cylinders in reciprocative travel without a crankshaft system;
20. Provide efficient and convenient rotational power-take-off with bypass fans and propellers in desired proportions to reaction power-take-off;
21. Provide efficient and convenient rotational power-take-off for rotary-wing vehicles;
22. Provide efficient and convenient rotational power-take-off for rotary wing propulsion in combination with reaction thrust;
23. Provide efficient and convenient reciprocative power-take-off for vehicle systems and equipment which utilize reciprocative power;
24. Provide rocketjet engine construction costs of less than one-tenth of the cost per pound of thrust for known air-breathing engines and less than one-tenth of one percent of known liquid rocket engines;
25. Provide complete vibration damping for tradeoff values that favor complete operational smoothness over initial engine costs;
26. Minimize vibrational effects by positioning reciprocating travel in the directional axis of thrust for tradeoff values that favor initial cost over total vibration damping;
27. Eliminate all requirements or advantages for blast-off rocketry:
28. Provide greater safety and reliability for space or air travel than now possible with known jet engines and rocket engines; and
29. Provide greater engine life than possible with present air-breathing engines.
30. Provide a dedicated air-breathing reaction engine with higher thrust per weight, greater efficiency, lower cost and longer use-life than any other air-breathing reaction engine.

A rocketjet engine to accomplish these objectives has a light, hollow double-acting compressor piston. It is reciprocated by a smaller-diameter double-acting power piston through a power shaft connecting them. Up to 90 percent of intake air is routed from a compressor cylinder to a thruster and the remaining ten percent to a power cylinder. Fuel and water are preheated and sprayed into the power cylinder with phase-change injectors at ends of compression strokes after complete flame-front propagation to actuate the compressor with combined combustion and steam pressure. To provide steam-propulsion pressure in addition to peak-heat combustion pressure and to cool the thruster, fuel is preheated and spray injected into an upstream combustor portion of the thruster. Water is added as wet stream through a flash-boiler-steam injector at a downstream portion of the combustor in order achieve prior peak combustion heat, pressure and completeness of flame propagation. Variable nozzle-to-throat-ratio thrusters maximize thrust efficiency at any atmospheric or space altitude. Fixed-nozzle-to-throat-ratio thrusters maximize efficiency and low weight at dedicated altitude ranges. A porous intake cone has less frontal drag than pointed rocket engines. Various vibration-damping, power-take-off and operational features are provided.

BRIEF DESCRIPTION OF THE DRAWINGS

FIG. 13 is a cutaway front view of the FIG. 12 embodiment of the rocketjet engine.

FIG. 14 is a cutaway rear view of the FIG. 12 embodiment of the rocketjet engine.

DESCRIPTION OF PREFERRED EMBODIMENT

Figure 1:
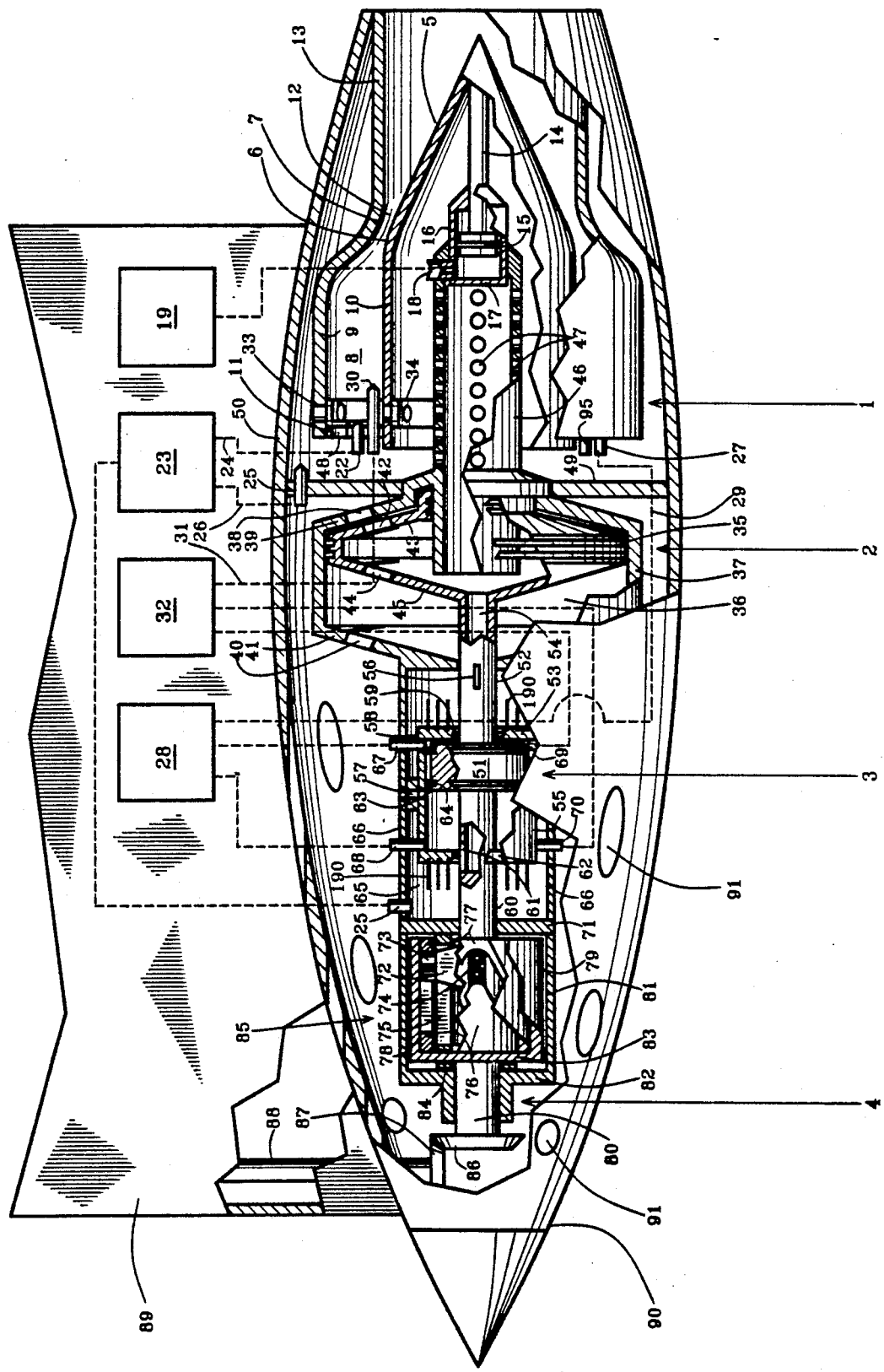
FIG. 1 is a cutaway side view of an embodiment of this invention of a rocketjet engine with a thruster having a variable nozzle, a single-stage compressor and a compressor engine with a regenerative chamber.

Referring to FIG. 1, intake air for air-breathing mode of this embodiment of the rocketjet engine is directed to a variable-nozzle thruster 1 from a compressor 2 which is operated by a compressor engine 3 with a rotational power-takeoff 4. The variable-nozzle thruster 1 has a variable nozzle-to-throat ratio comprised of a nozzle cone 5 with a cone base 6 positionable linearly in relation to a thruster sleeve base 7. A combustor section 8 is formed between combustor sleeve 9 and cone sleeve 10 circumferentially. A combustor plate 11 is extended inward radially to sliding contact with an outside periphery of the cone sleeve 11. Linear positioning of the cone base 6 towards the thruster sleeve base 7 decreases nozzle-to-throat ratio of a plug-nozzle venturi throat 12 formed circumferentially between the cone base 6 and the thruster sleeve base 7. Positioning of the cone base 6 in the opposite direction away from thruster sleeve base 7 increases nozzle-to-throat ratio of the plug-nozzle venturi throat 12. Exhaust gases discharged from the combustor section 8 through the venturi throat 12 expand linearly against inwardly-tapered walls of nozzle cone 5. The exhaust gases are prevented from expanding circumferentially within the thruster 1 by inside peripheral walls of thruster nozzle sleeve 13. Linear positioning of the nozzle cone 5 is achieved selectively by control rod 14 which is actuated by nozzle piston 15 in nozzle cylinder 16 by means of variable pressure of a nozzle-control fluid directed in and out of a control end 17 of the nozzle cylinder through nozzle-control conveyance 18 which is in fluid communication with nozzle-control fluid container 19. A relief port 20 can be provided at a nozzle end 21 of the nozzle cylinder 16 to allow ingress and egress of gases from the nozzle end 21 from linear actuation of the nozzle piston with nozzle-control fluid from nozzle-control fluid container 19.

The objective of regulating nozzle-to-throat ratio is to optimize combustion efficiency and mass flow of variable thrust for various speed, load, atmospheric altitude, stratospheric altitude and space requirements. A rocketjet engine with this variable nozzle-to-throat ratio can operate at peak efficiency from full thrust to one percent of thrust. Other embodiments described later also vary mass-flow for maximizing thrust in atmospheric and stratospheric conditions.

On-board oxidizer is injected directly into the combustor section 8 for space and optionally for atmospheric conditions with thruster oxidizer injector 22 from oxidizer container 23 through direct-injection oxidizer conveyance 24. Optionally for some types of oxidizer and some applications of the rocketjet engine, on-board oxidizer may be supplied also with upstream oxidizer injector 25 through upstream oxidizer conveyance 26 from the oxidizer container 23.

Fuel is injected into the combustor section 8 with thruster fuel injector 27 from fuel container 28 through thruster fuel conveyance 29. The thruster fuel injector 27 can be a conventional spray injector for some embodiments of this invention. However, it is preferably a phase-change injector illustrated and described later in relation to FIGS. 15 and 16.

In addition to fuel and oxidizer, water also is injected into the combustor section 8 of thruster 1. Water is not injected in liquid form, however. Contrary to prior practices of water injection in some conventional jet, rocket and internal-combustion engines, water is converted to steam during injection to increase pressure and velocity and to decrease specific mass of exhaust, rather than added in liquid form to increase mass-flow. Water injected in the manner made possible by this invention yields the same results as fuel and oxidizer with heat of combustion that requires dissipation with waste-heat cooling in conventional air-breathing engines and limited regenerative cooling in liquid rocket engines. Rather than save combustion heat regeneratively for utilization to generate combustion pressure and resulting exhaust velocity, the rocketjet engine utilizes all excess heat to generate greater expansion ratio and pressure of steam than achievable with combustion gases to the extent that the steam so injected does not douse flame after peak heat has been achieved and to the extent that heat is not lost to achieve phase-change in this combustion system. Basically, water injection is treated the same as fuel injection with the exception that electrical-resistance heating continues to be added in addition to compression heat and regenerative heat after combustion and after the engine has been heated initially. A system of flash-boiler injection is employed. The same as for fuel injection, water is spray-atomized and heated in the process of being injected into high-heat combustion products. Only about forty percent as much water as fuel by weight is injected but provides greater thrust per weight than all of the fuel added. This additional thrust is achieved by a cooling process without decreasing combustion efficiency or completeness in this engine system. Increase rather than decrease of combustion efficiency and thrust are achieved by cooling the engine with a regenerative combustion augmentation thermodynamic cycle. This principle applies equally to (a) full rocket mode with on-board oxidizer at any altitude in space or optionally in the atmosphere, (b) variable levels of on-board oxidizer in combination with compressed-air oxidizer, or (c) full air-breathing mode in the atmosphere and lower stratosphere. Phase-change water injection, the same as phase-change fuel injection, is illustrated and described in relation to FIGS. 15 and 16.

Water is converted to steam in the process of injection into the thruster section 8 with thruster phase-change water injector 30. The water is conveyed through thruster water conveyance 31 from water container 32. The water injector 30 can be longer, as illustrated, or variably positionable downstream in the combustor section 8 from the combustor plate 11 than the fuel injector 27 and the oxidizer injector 22 in order to allow sufficient completeness of combustion and combustion heat to be achieved to prevent dousing of combustion or decreasing of combustion completeness with the proportionately small amount of water that is flash-boiler injected. Water injected at this point and in this manner actually increases completeness of combustion while decreasing combustion heat with complete phase-change of the water to high-pressure steam while entering the plug-nozzle venturi throat 12.

For full rocket mode of thruster operation, thruster inlet valves 33 in the combustor sleeve 9 and the combustor plate 11 together with the inlet valves 34 in the cone sleeve 10 can be closed to eliminate back-flow of combustion gases from the combustor section 8. Here, the valves 33 and 34 are shown as a sliding-seal type. They can also be poppet valves, flapper valves or other types of valve systems.

For full or partial air-breathing mode of operation, intake air is compressed in this embodiment of the rocketjet engine by hollow double-acting single-stage compressor piston 35 in compressor 2. A double-ended compressor cylinder 36 having compressor cylinder walls 37 is provided with thruster-end one-way-inlet-valved ports 38 in a thruster-end compressor head 39. Drive-end one-way-inlet-valved ports 40 are provided in a drive-end compressor head 41. Rather than having outlet ports in the cylinder heads 39 and 41, thruster-end one-way-outlet-valved ports 42 are provided in a thruster-end compressor-piston head 43 of hollow double-acting single-stage compressor piston 35 and drive-end one-way-outlet-valved ports 44 are provided in a drive-end compressor-piston head 45 of the hollow double-acting single-stage compressor piston 35. Intake air from inside of the compressor piston 35 is directed through compressor outlet sleeve 46 with which thruster-end compressor-piston head 43 is in sliding-seal contact.

The nozzle cylinder 16 can be attached to an extremity of the compressor outlet sleeve 46 having outlet-sleeve orifices 47 which allow flow of compressed intake air to thruster inlet ports 48 which can be positioned in the cone sleeve 10, combustor sleeve 9 and combustor plate 11. When the rocketjet engine is in air-breathing or partial air-breathing mode, valves 33 and 34 are opened to allow flow of intake air into the combustion section 8.

A back-flow wall 49 circumferentially between an outside periphery of the compressor outlet sleeve 46 and an inside periphery of engine housing 50 prevents mixing of compressed intake air with uncompressed intake air. The back-flow wall 49 can be appropriately streamlined in relation to outside surfaces of the compressor 2 and inside surfaces of the engine housing 50. The back-flow wall also allows addition of preferably gaseous oxidizer through upstream oxidizer injector 25 without escape of the oxidizer through the engine when operating in full rocket mode. However, the one-way-outlet-valved ports in piston heads 43 and 45 also prevent back-flow of oxidizer through the engine.

The compressor piston 35 is reciprocated by double-acting power piston 51 to which it is connected by compressor-end power shaft 52 which is extended in sliding-seal contact through drive-end compressor head 41 and compressor-end power-cylinder head 53. An internal fluid conveyance 54 in the compressor-end power shaft conveys intake air from the hollow compressor piston 35 to double-ended power cylinder 55. When compressor-end power-shaft outlet port 56 is in fluid communication between the internal fluid conveyance 54 and a compressor end of double-ended power cylinder 55, exhaust ports 57 radially round the linear center of double-ended power cylinder 55 are uncovered by a power-cylinder compressor end 58 and compressor-end sealing rings 59 at a compression-intake end of reciprocative strokes. The internal fluid conveyance 54 is extended through the power piston 51 and into a portion of drive-end power shaft 60 to a drive-end power-shaft outlet port 61. When drive-end power-shaft outlet port 61 is positioned in fluid conveyance between the internal fluid conveyance 54 and a power-cylinder drive end 62, the exhaust ports 57 are uncovered by a drive-end power-cylinder head 63 and drive-end sealing rings 64. At exhaust-intake strokes, there is a scavenge pattern of intake air entering around a center of one end of a cylinder when exhaust is being discharged around the outside of the opposite end of the cylinder alternately at the exhaust-intake end of each reciprocative stroke. There is a supercharged two-stroke cycle with regenerative combustion augmented by steam pressure at each end of a double-acting piston.

Contrary to incomplete purging of exhaust gases in conventional two-stroke cycles, the rocketjet power cylinder is purged thoroughly with an overflow abundance of fresh intake air under supercharge pressure from the compressor piston. There is a more complete supply of fresh intake air than possible with the compression inefficiencies of four-stroke cycle engines, even with conventional supercharge practices.

In this FIG. 1 embodiment of the rocketjet engine, but not in other embodiments illustrated, there is a regenerative heat-exchange chamber 65 with regenerative-chamber walls 66 at an outside periphery of the double-acting power cylinder 55. Heat-exchange members 190 are extended in heat-exchange relationship between the power cylinder 55 and the regenerative chamber 65. Shaft outlet ports 56 and 61 are in constant communication with the regenerative chamber 65. When the shaft outlet ports are not positioned by reciprocation to be in communication between the internal fluid conveyance 54 and alternately opposite ends of the power cylinder 55, intake air flows into the regenerative chamber 65 where it is preheated after one-way-valved containment and then directed into the cylinder at exhaust-inlet ends of reciprocative strokes. This regenerative preheating aids ignition, decreases the amount of flame heat required to achieve effective combustion heat and increases the heat available for converting phase-change-injected wet steam into high-pressure dry steam in the processing of cooling the engine. In this engine, all heat possible is generated with stoichiometric mixture ratio and converted fully to the higher phase-change expansion ratio of water than fuel. Spray ignition and regenerative preheating of both fuel and air are utilized to achieve the highest heat level possible in the shortest combustion time possible in order to convert the heat to steam pressure. This is in contrast to delayed combustion, unbalanced mixture ratio for limiting peak heat and waste-heat cooling of present internal-combustion and reaction engines.

At a compression-injection end of each reciprocative stroke of the double-acting power piston 51, there is phase-change injection of both fuel and water when there is exhaust and intake at the opposite side. Every stroke is a power stroke.

Factors contributing to six times the mean-effective-pressure (mep) of conventional engines are: (1) effective use of peak-heat pressure, (2) use of all heat without waste-heat cooling, (3) conversion of low-expansion-ratio per heat of combustion gases to high-expansion-ratio steam, (4) high piston-surface-per-wall area, (5) low mechanical friction losses, (6) use of fuel heat saved regeneratively to achieve effective combustion heat without loss of heat and pressure to achieve effective combustion heat and, (7) nigh pressure endurance of steam throughout combustion strokes.

Fuel is injected through alternately through compressor-end phase-change fuel injector 67 and drive-end phase-change fuel injector 68. Owing to regenerative preheat of fuel and air in addition to combustion heat of intake air, and owing also to mixture ratios ranging from stoichiometric to air-rich, combustion will be explosively rapid rather than slow with long combustion lag as sought for conventional engines. Fuel injection will be timed for ends or slightly after ends of compression strokes, rather than slightly before ends of compression strokes. Fuel is injected at one side of the double-ended power cylinder and water at the opposite side through alternately compressor-end phase-change water injector 69 and drive-end phase-change water injector 70 at opposite ends of reciprocative strokes.

By the time flame front from fuel injection travels around the compressor-end power shaft 52 or alternately around the drive-end power shaft 60 to the opposite side of respective cylinder ends 58 and 62, there is sufficient completeness of combustion and peak heat to convert wet steam from spray-injected and ignition-heated water into high-pressure dry steam without decreasing completeness of combustion or dousing combustion flame. Instead, the small amount of water injected under these conditions increases combustion completeness.

There is no water injected when the engine is cold and the amount of water injected is thermostatically controlled at a level that does not deter completeness of combustion. Water injected will average approximately 40 percent of fuel by weight. The greater expansion ratio of water yields a relatively flat pressure-volume curve with approximately six times the mean-effective pressure of waste-heat-cooled engines. This is one of the features of the rocketjet engine that make possible its many advantages over other reaction engines. Other features will be explained in their obvious form as this description of preferred embodiments continues.

The drive-end power shaft 60 is extended through a base plate 71 to a cam-follower gear 72 with a plurality of cam-followers 73 extended in sliding contact through transverse-guide channels 74 of a transverse guide 75 which is extended from the base plate 71. The cam followers 73, typically tandem rollers, are in cam-drive contact with counter-beveled cam slopes, peaks and valleys of drive-end end cam 76 and compressor-end end cam 77 which are attached at outside peripheries to an inside periphery of cam sleeve 78 in a sleeve extension 79 of a rotational power-takeoff shaft 80. A drive-housing sleeve 81 is extended from the base plate 71 at a select distance from an outside periphery of the sleeve extension 79 of the power-takeoff shaft 80 to drive-housing plate 82 at the opposite end of the sleeve extension 79 from the base plate 71. Between the drive-housing plate 82 and a drive-shaft plate 83 is a forward thrust bearing 84. Between the drive-shaft plate 83 and a drive end of the transverse guide 75 is a rear thrust bearing. This is a standard prior-art double-end-cam drive 85 described by earlier patents of the same inventor, Daniel E. Nelson, and developed for in a variety of forms for a variety of mechanisms as referenced above.

The double-end-cam drive 85 in the rocketjet engine prevents the double-acting power piston 51 and the double-acting compressor piston 35 from hitting heads of cylinders 36 and 55 respectively in which they reciprocate. The double-end-cam drive 85 also provides a power-takeoff shaft 80 for rotational starting of the rocketjet engine and for operating accessories such as compressors, pumps and generators. In some embodiments of the rocketjet engine described later there are various thrust augmentation fans and propellers attached to the power-takeoff shaft 80. Accessories described later can be positioned on the rocketjet engine proximate the double-end-cam drive 85 or on a vehicle to which the rocketjet engine is attached. For the different uses of the double-end-cam drive 85, it is sized differently with different pluralities of cam followers, greater diameter with more leverage and slower rotation for lower-geared power-takeoff requirements and other features. In this embodiment of the rocketjet engine, the drive 85 has a relatively small diameter because its main functions are control of piston reciprocation and accessory operation without high rotational power requirements.

Attached to the rotational power-takeoff shaft 80 in this embodiment is a beveled power-takeoff gear 86 in gear-drive relationship to a beveled accessory gear 87 which rotates an accessory drive shaft 88 extended from a vehicle section 89. Positioning accessory equipment, such as starter, generator and pumps on a vehicle, rather than on the rocketjet engine decreases engine size and drag but transfers the size requirements to the vehicle where they can be economized more effectively.

Positioned on a vehicle, here designated as a vehicle section 89, are also the control-fluid container 19, the one-board oxidizer container 23, the fuel container 28 and the water container 32. These containers are and conveyances from them are illustrated schematically in FIG. 1 but not repeated for other illustrations to avoid redundancy. The basic working relationship of parts is the same for all embodiments. Only the nature of some of the components are different for the different embodiments of the rocketjet engine.

Intake air can be taken into the rocketjet engine through any appropriate type of air scoop. The preferred air scoop is a nose cone 90 with a plurality of air-scoop orifices 91 sized, shaped and positioned to provide an appropriate amount of intake area while minimizing boundary-layer drag of the engine.

The proportion of air-scoop area to thrust is varies between one-half an done-fifth of that required for conventional air-breathing jet engines because there is no requirement for intake and compression of overrun cool air and there is no requirement for ram-assist compression. Only enough ram-pressurization effect to assure low-atmospheric density of intake air is required. This is less than one-tenth of the ram-effect requirement per thrust of turbine engines. It is negligible in comparison to the ram-drag effect of ram-jet engines and yet the exhaust velocity is greater than ram-jet engines, several times greater than turbine engines and a few percent greater than liquid rocket engines, depending on the particular type of rocketjet engine being compared with conventional air-breathing and rocket engines.

The nose-cone 90 positioning of air-scoop orifices 91 causes less drag than the nose cone of a conventional liquid or solid rocket engine. Reduction of boundary-layer drag with air-scoop orifices 91 is a greater drag-reduction benefit than the minimal ram-effect required to maintain a relatively low-altitude level of atmospheric density. In addition, owing to high-altitude capabilities of the rocketjet engine in air-breathing mode resulting from high thrust velocity, flight altitude can be increased in proportion to speed for maintaining relatively low drag and avoiding friction-heat contact rate with air at any altitude. As altitude is increased in the stratosphere, on-board oxidizer can be supplied progressively for progressive in-flight conversion to full rocket mode.

Flash-boiler injection of water has the same thrust effect in full air-breathing mode, in progressively rocket mode and in full rocket mode. Rather than adding density of exhaust that is effective only at relatively low speed and low altitude and that is a high weight burden on a vehicle, water as used in the rocketjet engine is more effective per weight than fuel increasing thrust velocity with lighter rather than heavier exhaust gases. The steam portion of exhaust gases is lighter than products of combustion, making the combination of steam and products of combustion lighter than products of combustion alone. The exhaust velocity is higher than for products of combustion alone in liquid rocket engines because there can be a stoichiometric mixture ratio of fuel and oxidizer without melting engine components and the additional heat is converted to higher and longer-duration steam pressure. The higher pressure is then converted to higher velocity with a wide ranger of efficient thrust of the variable nozzle. Being 10-to-20 percent higher in velocity in all ranges of air-breathing and rocket modes than liquid rocket engines in rocket-only mode, thrust of the rocketjet engine is several times higher than possible with turbine engines and approximately 40 percent higher than solid rocket engines. Water as used in the rocketjet engine provides the effect of a low-cost and low-weight fuel by converting excess combustion heat to additional thrust more effectively than with gas expansion from heat of combustion. Lower expansion ratio and pressure of fuel and oxidizer from heat of combustion is replaced by higher expansion ratio and higher pressure from heat of combustion to the extent that combustion completeness and efficiency are not deterred by the transfer and to the extent that heat is not lost to the work of phase-change of water to high-pressure dry steam in the rocketjet engine. The net effects described in relation to the FIG. 1 embodiment differ for the different tradeoff advantages of different embodiments for different applications of the rocketjet engine.

Figure 2:
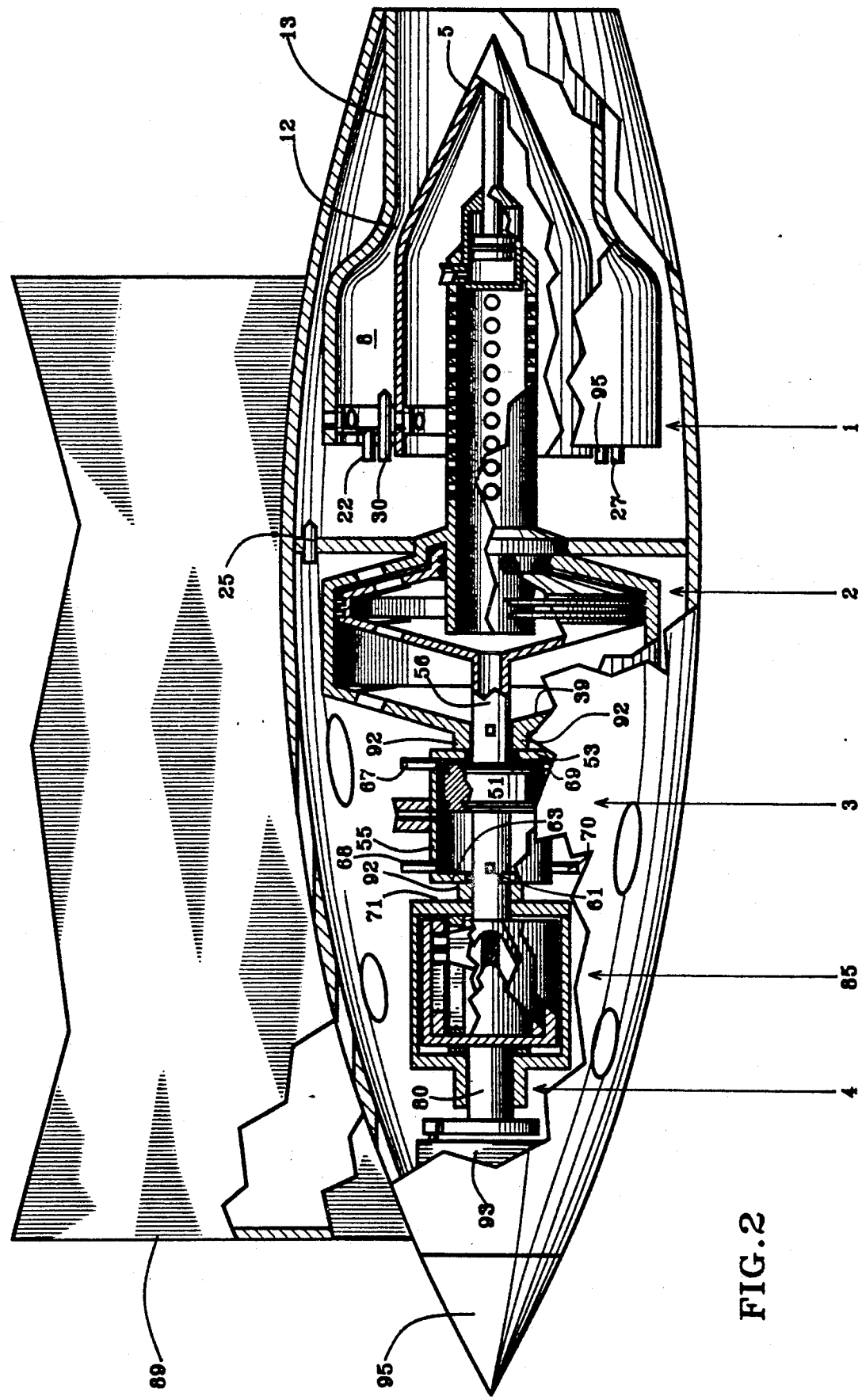
FIG. 2 is a cutaway side view of an embodiment without the regenerative chamber for the compressor engine, as are all other drawings, but with other features the same as the FIG. 1 embodiment.

Referring now to FIG. 2, the regenerative chamber 65 in FIG. 1 with regenerative walls 66 at the outside periphery of the double-ended power cylinder 55 is omitted. In its place, a connecting sleeve 92 at each end of the double-ended power cylinder 55 is utilized between the base plate 71 and the cylinder 55 at the drive end power-cylinder head 63 and between the thruster-end compressor head 39 and the compressor-end power-cylinder head 53 respectively. Because there is no regenerative chamber to be in fluid communication with the inside of the cylinder 55 by means of the power-shaft outlet ports 56 and 61, these power-shaft outlet ports 56 and 61 can be shorter as illustrated in FIG. 2 and in all other illustrations which do not illustrate the regenerative chamber 65. Also different from the FIG. 1 embodiment, engine accessories 93 actuated by the power-takeoff shaft 80 with an accessory gear 94 are positioned on the engine proximate the shaft 80. Illustration of the container 19, 23, 28 and 32 for nozzle-control fluid, oxidizer, fuel and water respectively is omitted for brevity for all drawings subsequent to FIG. 1. Illustrated but not described in FIG. 1 and all other illustrations showing a thruster 1 or a conventional rocket thruster described later is an igniter 95. The igniter 95 is employed for embodiment in which electrical current for ignition and phase-change injection is not supplied in conjunction fuel conveyance 29 and water conveyance 31 for use as described below in relation to FIGS. 15 and 16. A nose-cone tip 96 constructed of a high-temperature-resistant material can be employed. However, the altitude height that can be achieved with high exhaust velocity and efficient use of air as an oxidizer allows a vehicle to attain sufficient altitude as vehicle speed is increased to avoid friction heat and sonic boom as well. High enough altitude to avoid sonic boom at supersonic speeds is one of numerous advantages made possible with the rocketjet engine in either air-breathing or progressively rocket mode of operation. All other aspects of FIG. 2 are the same as for FIG. 1 as described above.

Figure 3:
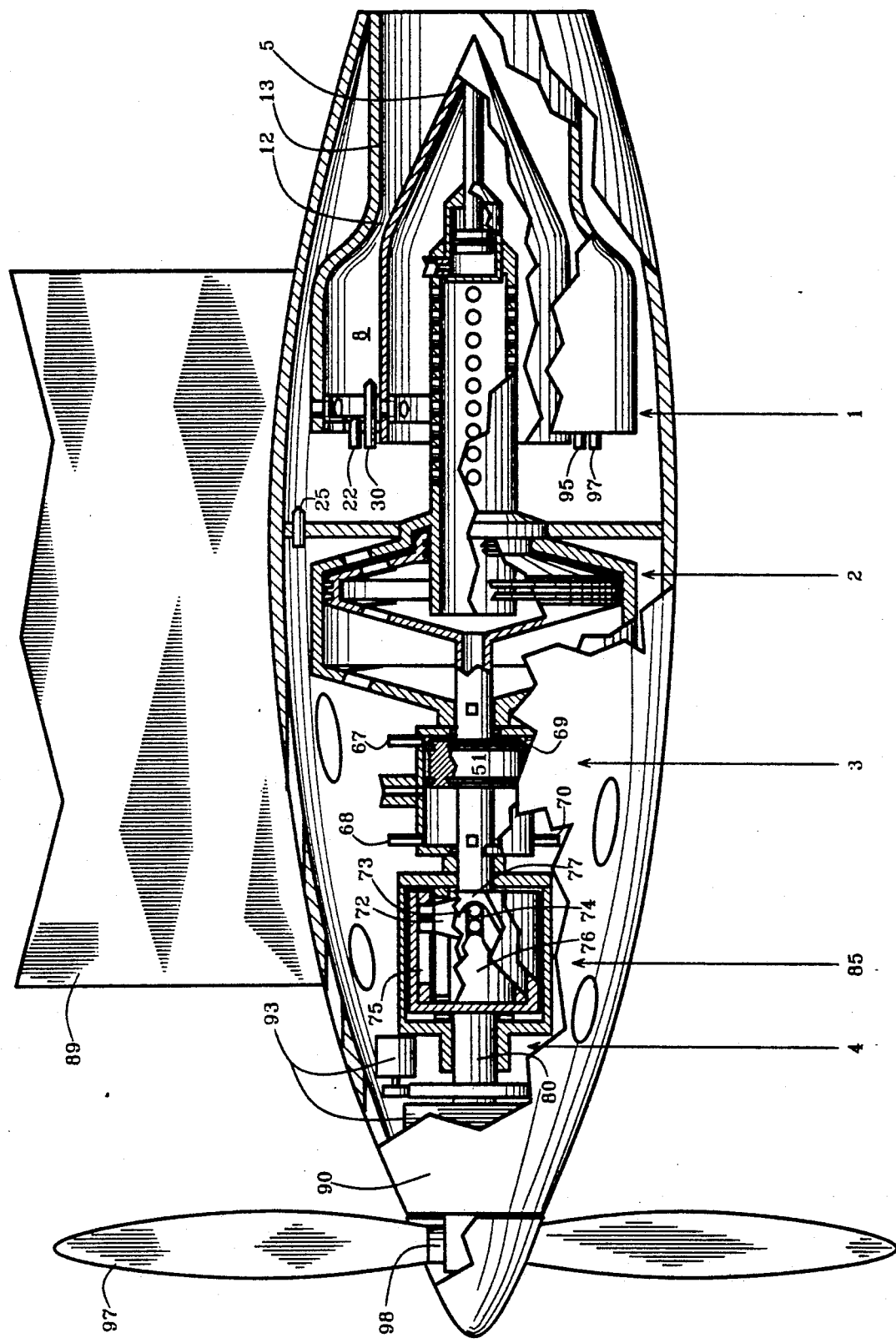
FIG. 3 is a cutaway side view of an embodiment of the rocketjet engine with an optional propeller in addition to rocket and jet thrust.

Referring to FIG. 3, a propeller 97 on a propeller shaft 98 attached to power-takeoff shaft 80 is extended through nose cone 90. The end cams 76 and 77 can be designed with larger diameters and the cam-follower gear 72 can be designed proportionately longer to provide down-gearing sufficient for the workload of rotating a propeller rather than merely controlling reciprocative travel with the rotational power take-off 4. In addition to the cam-follower gear 72 being longer and the cams 76 and 77 being larger in diameter, there would also be a greater quantity of cam-followers 73 attached to the gear 72 for the embodiment. The transverse guide 75 would be larger and have proportionately more transverse-guide channels 74. To balance additional power directed from compressor engine 3 for rotating propeller 97, the compressor 2 would be smaller and the thruster 1 smaller. This is a compound engine with compromises for achieving multiple forms of propulsion. All other aspects of the FIG. 3 embodiment are the same as for the FIG. 2 embodiment and are explained basically in relation to FIG. 1.

Figure 4:
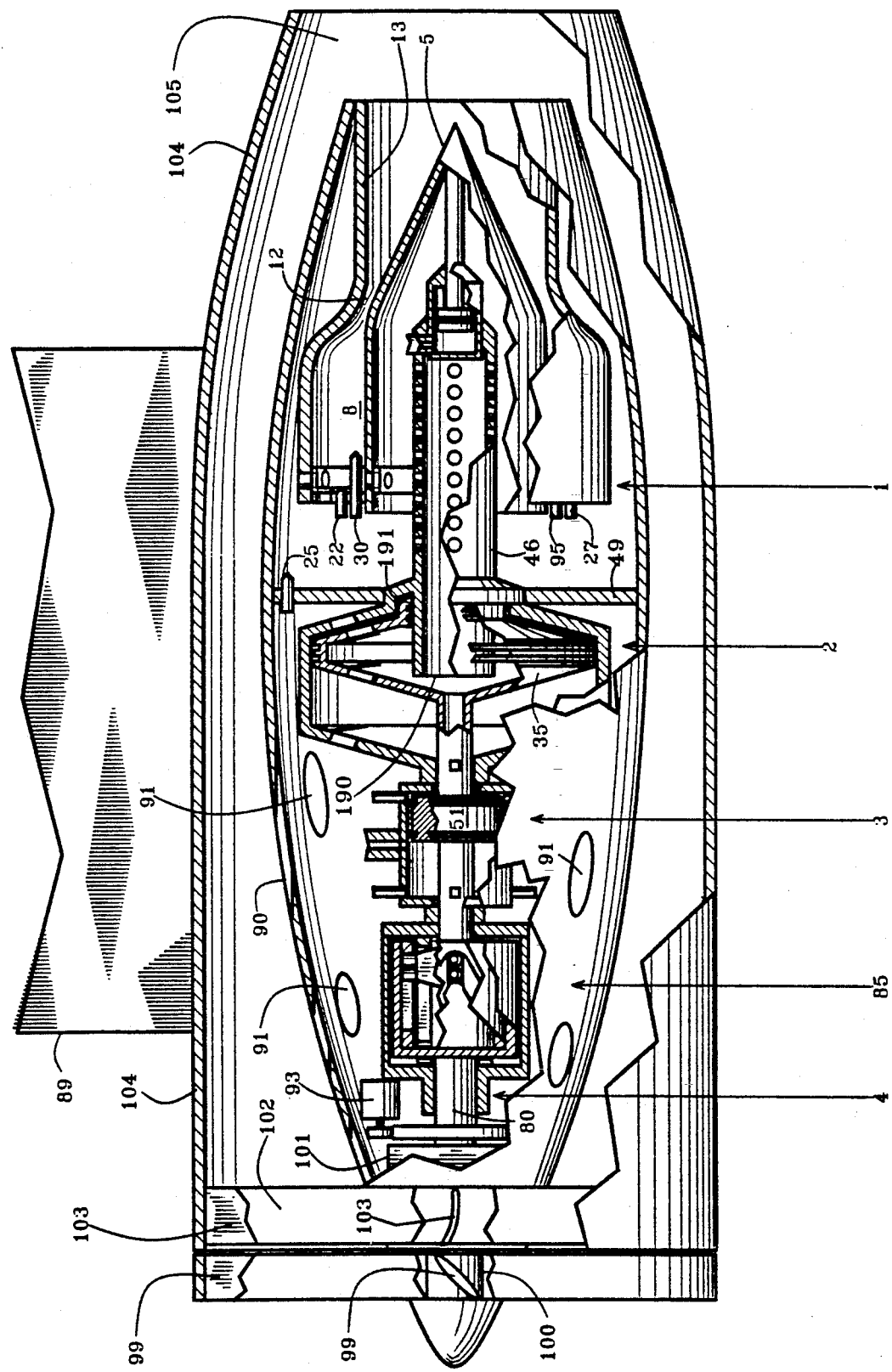
FIG. 4 is a cutaway side view of an embodiment of the rocket engine with an optional bypass fan for air augmentation in variably rocket and jet modes in atmospheric conditions and straight rocket mode in space flight.

Referring to FIG. 4, a bypass fan 99 on a bypass-fan shaft 100 is rotated at geared-up speeds by gear box 101 with rotational power from shaft 80. Design tradeoff factors are similar to the FIG. 3 propeller and FIG. 4 bypass embodiments of the rocketjet engine. Both are compound engines with compromise tradeoffs. A flow straightener 102 with flow-straightener blades 103 can be provided in conventional form aft of the bypass fan 99. A bypass duct 104 directs bypass air to a bypass mix section 105 aft of thruster sleeve 13. Only enough intake air to support stoichiometric combustion at the thruster 1 and the compressor engine 3 are taken in through the air-scoop orifices 91 in the nose cone 90. There is no compression of airflow overrun, resulting in far less engine drag and workload of compression in comparison to present bypass jet engines. In addition, the exhaust velocity is approximately three times higher, resulting in as much as fifteen times as mush thrust independently of bypass augmentation in air-breathing mode and up to three times the effectiveness of bypass-air supply. Thus the net thrust can be as much as 30-to-40 times greater than for conventional bypass jet engines.

A fan is more effective than this form of piston compressor at pressure levels lower than required to support effective combustion. But the double-acting forms of power piston 51 and compressor piston 35 employed in the rocketjet engine are far more effective and efficient at combustion-supportive pressure levels. When the advantages of a fan for mere low-pressure transfer of large volumes of bypass air are combined with the advantages of pistons as employed in the rocketjet engine for combustion-supportive pressure levels, the results are multiply advantageous in comparison to present reaction engines.

Figure 5:
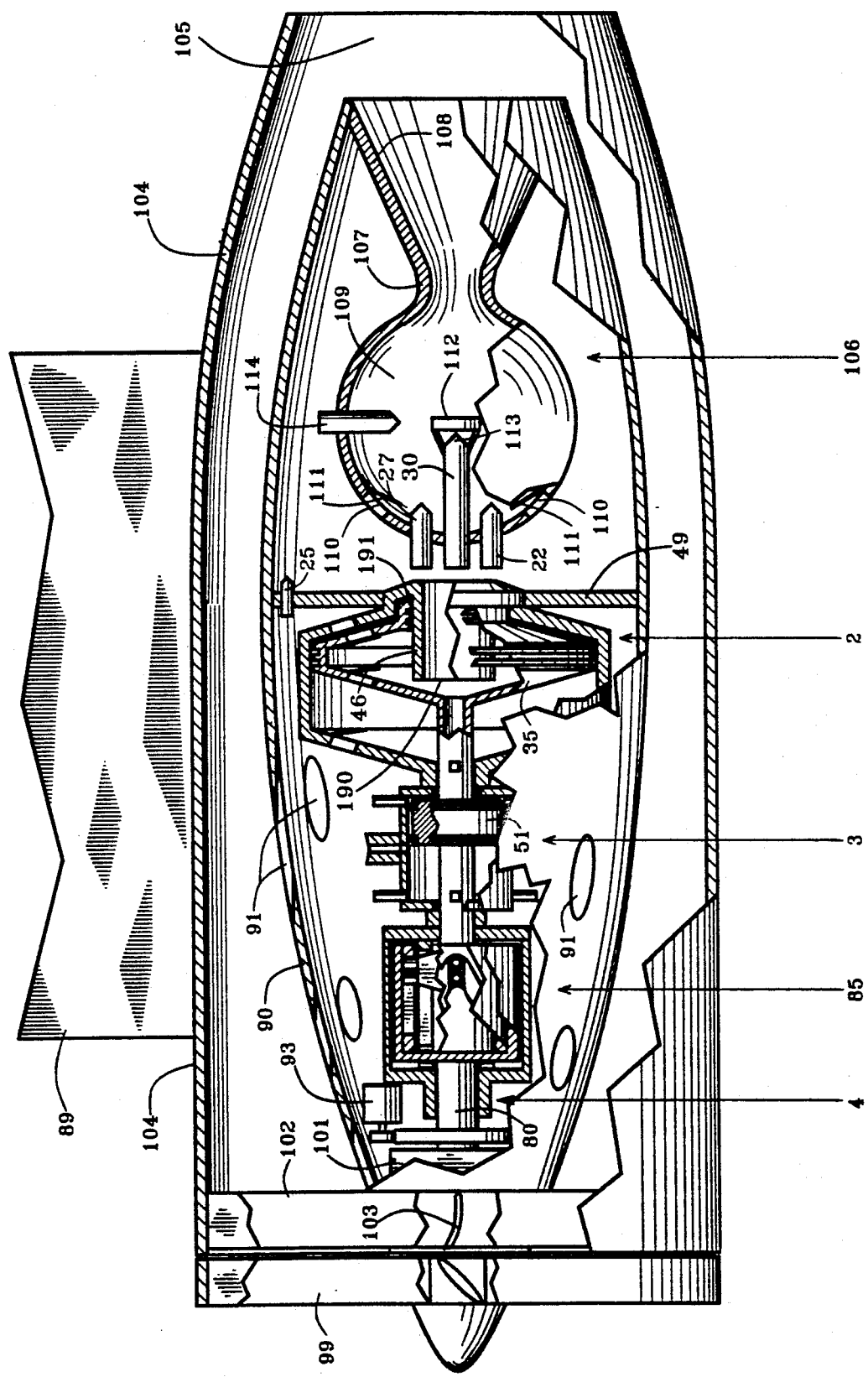
FIG. 5 is a cutaway side view of the rocketjet engine with a fixed nozzle for variably air and rocket modes, single-stage compressor and a bypass fan for atmospheric air augmentation.

Referring to FIG. 5, a conventional liquid rocket form of thruster 10G is employed for an embodiment of the rocketjet that is dedicated more to efficiency in space conditions with less efficiency at atmospheric altitudes. It has less weight per thrust at high stratospheric and space altitudes but less variation of speed with optimized efficiency than the FIG. 4 embodiment. A fixed nozzle throat 107 is employed in combination with a fixed nozzle skirt 108 and a fixed nozzle combustor section 109. Thruster inlet ports 110 can be provided with thruster inlet valves 111 which can be any form of a self-actuating one-way compressor type as illustrated by a simple reed valve, or a mechanically-operable type. A flash-boiler steam injector, also referred to as a phase-change water injector 30, is illustrated with a circular resistance heater 112 positioned down-stream from an atomization injector nozzle 113. The phase-change water injector 30 is provided with sufficient length to allow water in it to be heated to approximately phase-change level before being injected into the thruster. This length also allows injection of wet steam particles for partially-phase-changed water to be injected sufficiently downstream to allow sufficient completeness of combustion before flame contact with the wet steam to avoid dousing combustion flame or decreasing combustion completeness. The amount of water so injected can be thermostatically controlled through thermostat 114. Fuel is injected through thruster fuel injector 27 which can be provided with resistance heat for ignition as described in relation to FIGS. 15 and 16. Oxidizer is provided through thruster oxidizer injector 22. An open aft end of the circular resistance heater 112 further allows combustion gasses originating from upstream positioning of injectors 22 and 27 to access water particles of wet steam being injected through atomization nozzle 113 to add further assurance of complete phase change of water to high-pressure dry steam as it enters the fixed nozzle throat 107. These same combustion physics are applicable in the variable-nozzle thruster 1.

A bypass fan 99, bypass duct 104, flow straightener 102 and bypass mix section 105 aft of fixed nozzle skirt 108 are employed in this FIG. 5 embodiment, the same as for the FIG. 4 embodiment but with a fixed nozzle instead of the variable-nozzle thruster 1 that is employed in the FIG. 4 embodiment. The same tradeoffs for a compound air-augmentation rocketjet engine are applicable as explained above for FIG. 4.

Figure 6:
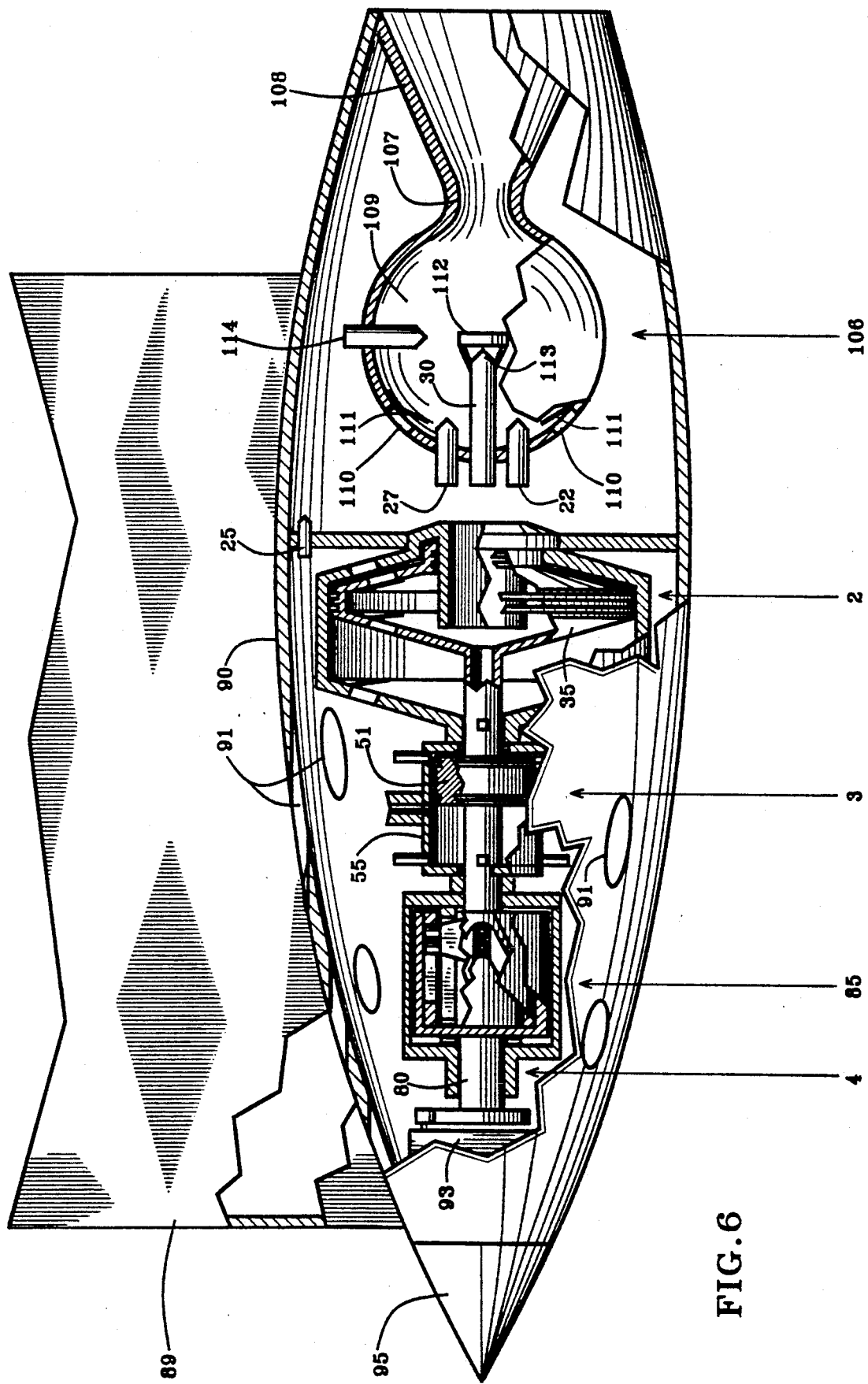
FIG. 6 is a cutaway side view of the rocketjet engine with a fixed nozzle and single-stage compressor without air augmentation.

Referring now to FIG. 6, the fixed-nozzle thruster 106 employed in the FIG. 5 embodiment is used without bypass-fan air augmentation. The FIG. 6 embodiment is the same as the FIG. 2 embodiment except for the type of thruster 106 employed in place of the variable nozzle thruster 1. Advantages of this FIG. 6 embodiment are for light weight with fixed thrust at space and high stratospheric altitudes. Tradeoff disadvantages are less efficiency and, therefore, more fuel consumption at atmospheric altitudes and slow speeds. It must be used to achieve high altitude rapidly and then be operated at low-oxygen levels of the stratosphere in partial or total air-breathing mode or in total rocket mode for greatest advantage.

Figure 7:
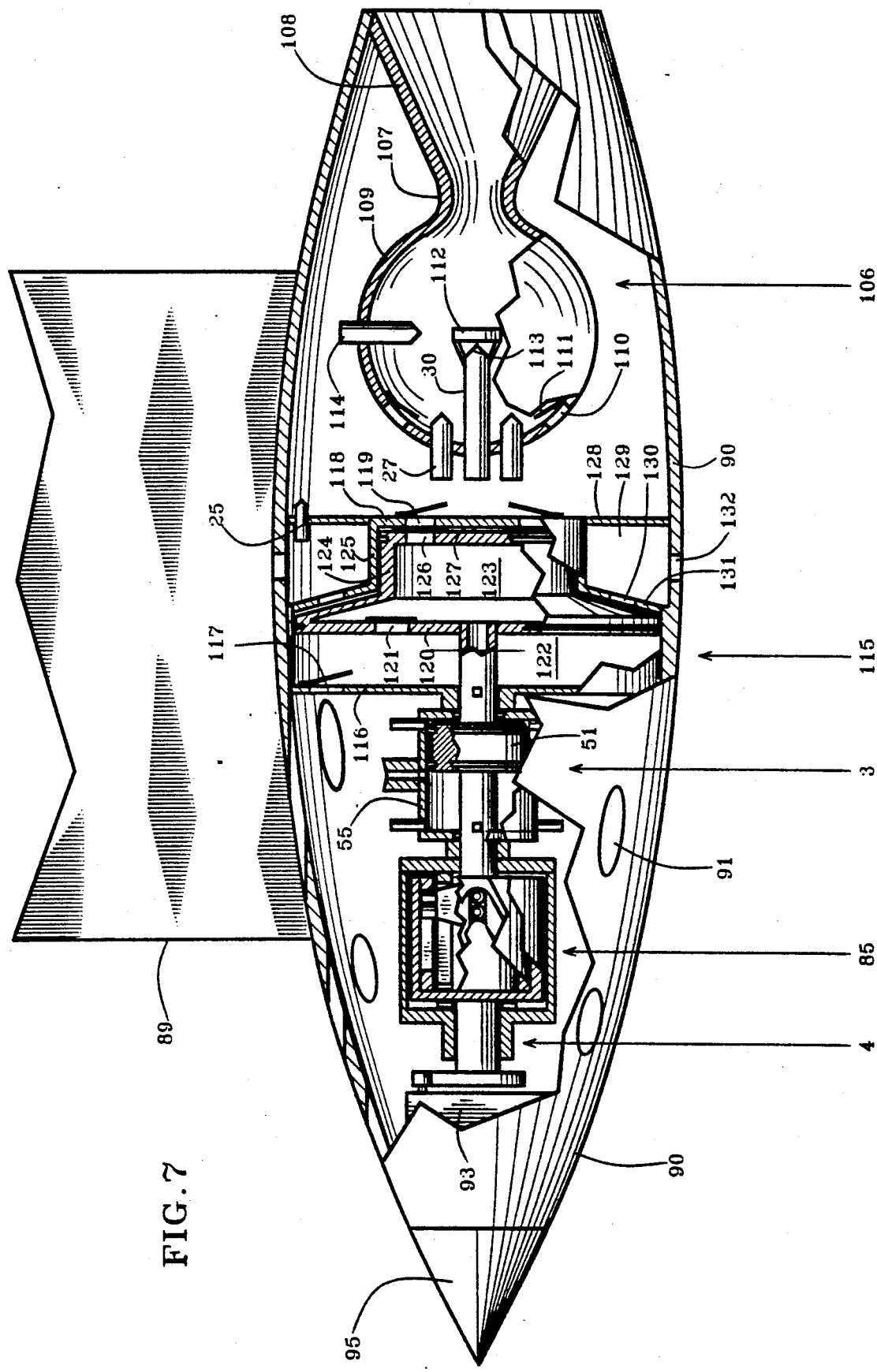
FIG. 7 is a cutaway side view of the rocketjet engine with a fixed nozzle and a two-stage compressor for atmospheric thrust.

Referring to FIG. 7, a different type of two-stage compressor is employed in what otherwise would be the FIG. 6 embodiment with some modifications for the different type of two-stage compressor. The different type of two-stage compressor employed in this embodiment and in some other embodiments is a two-stage double-acting compressor 115. This compressor 115 takes air in through only a first-stage cylinder head 116 at one-way-intake-valved ports 117. The first-stage cylinder head 116 can be larger in diameter per work load than for the single-stage double-acting compressor 1 described in relation to FIG. 1 and having parts numbered 35 through 47. The reason the two-stage compressor 115 can be larger in diameter is because it compresses air to only 2-to-3 atmospheres of pressure. Additional pressure of up to 6-to-10 atmospheres is achieved at a second-stage cylinder head 118 having one-way-outlet-valved ports 119. The two-stage double-acting compressor 115 is more efficient than the single-stage double-acting compressor 1 because higher pressures can be achieved with a smaller piston area. A tradeoff penalty is higher frontal drag of the two-stage double-acting compressor 115 than the single-stage double-acting compressor 1. This frontal-drag penalty is offset largey by the pointed nose cone 90 with air-scoop orifices 91 that reduce boundary-layer drag in the absence of ram-pressurization drag made possible with positive-displacement of the rocketjet air-compressor system. This FIG. 7 embodiment has its greatest advantages at relatively fast atmospheric speeds and in space and near-space conditions. The double-acting two-stage compressor 115 is provided with a first-stage piston head 120 having first-stage one-way-outlet-valved ports 121 which direct intake air from a first-stage compressor cylinder 122 to an inside periphery of a hollow two-stage compressor-piston section 123 with second-stage piston walls 124 which reciprocate within second-stage cylinder walls 125. Intake air is directed out from the hollow two-stage compressor-piston section 123 through one-way-outlet-valved ports 126 into second-stage compressor cylinder 127. A compressor wall 128 provides a portion of a pressure-relief conveyance 129 between a pressure-relief port 130 in a first-stage-cylinder back wall 131 and an engine-housing pressure-relief port 132. This pressure-relief conveyance 129 is necessary to avoid compressive work load by a first-stage-piston back wall 133. An optional upstream oxidizer injector 25 can be positioned in the compressor wall 128, the same as in the back-flow wall 49 for single-stage double-acting-compressor embodiments of the rocketjet engine. Compressed intake air or a combination of gaseous oxidizer injected through oxidizer nozzle 25 and compressed intake air can be allowed to circulate around outside peripheral walls of fixed nozzle skirt 108, fixed nozzle throat 107 and fixed nozzle combuster section 109 of this conventional liquid-rocket form of thruster 106. Allowing this outside peripheral circulation of oxidants is heat regeneration to the extent that combustion heat is transferred to propellants without consuming flame heat in the combustion section 109. The regenerative heat added hastens combustion and adds completeness of combustion before combustion gases come in contact with wet steam injected through a flash-boiler injector which is referred to also as thruster phase-change water injector 30. Other aspects of combustion in the fixed-nozzle thruster 106 are explained above in relation to FIG. 5.

Figure 8:
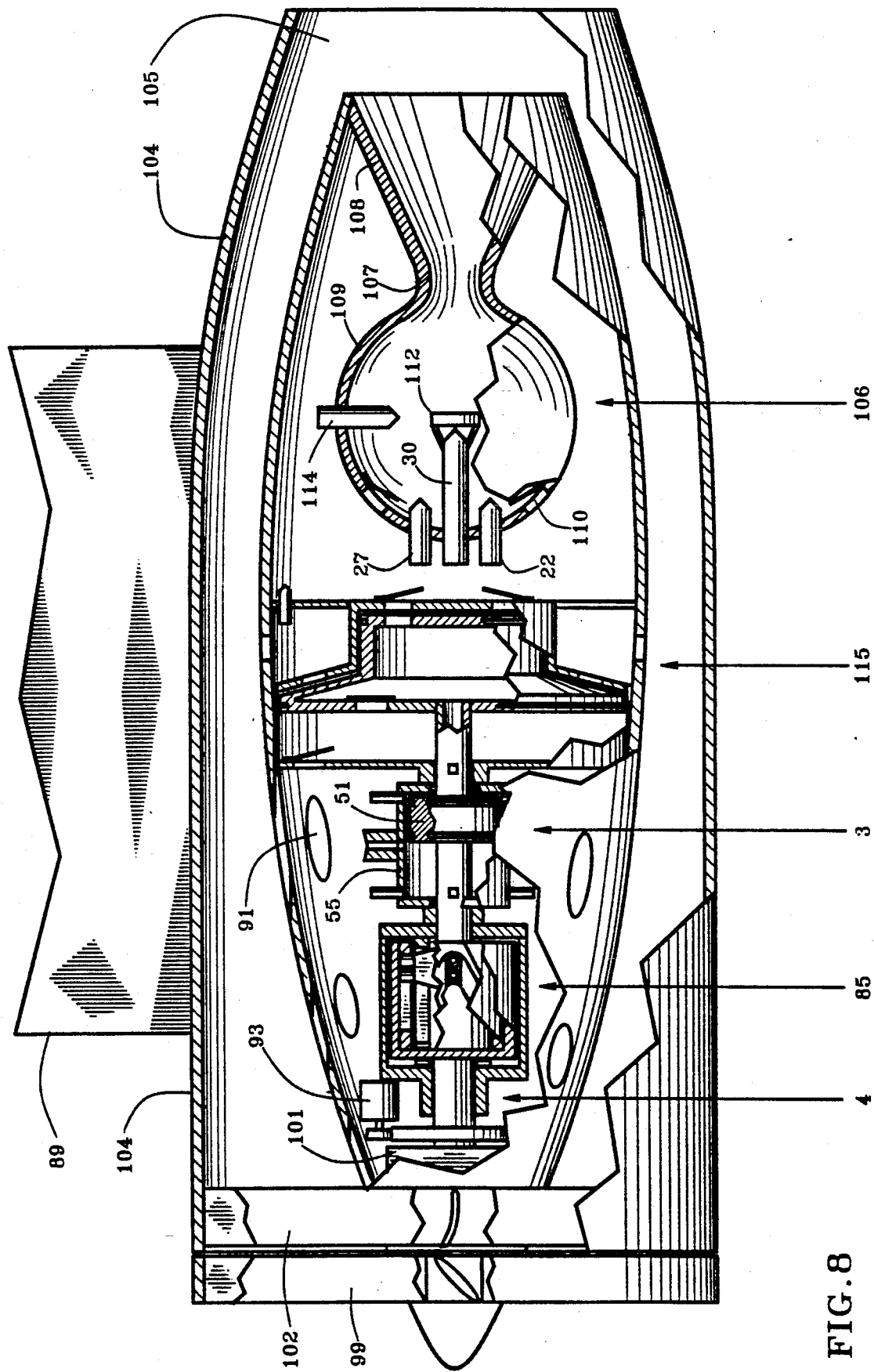
FIG. 8 is a cutaway side view of the rocketjet engine with a fixed nozzle, a two-stage compressor and a bypass-fan for air augmentation of atmospheric thrust.

Referring to FIG. 8, the fixed-nozzle thruster 106 is employed in combination with a two-stage double-acting compressor 115 and a bypass fan 99 with air-qugmentation mixing at bypass mixing section 105 in this embodiment of the rocketjet engine. All of the features are described above where they are employed first in other embodiments of the rocketjet engine. Advantages for flight at 25,000-to-80,000 feet altitude are provided with this embodiment of the rocketjet engine. Without injection of on-board oxidizer, it can be economical for 300-to-10,000 mile ranges of flight in and out of sonic-boom ranges at supersonic speeds. With injection of on-board oxidizer, it can travel in space and near space.

Figure 9:
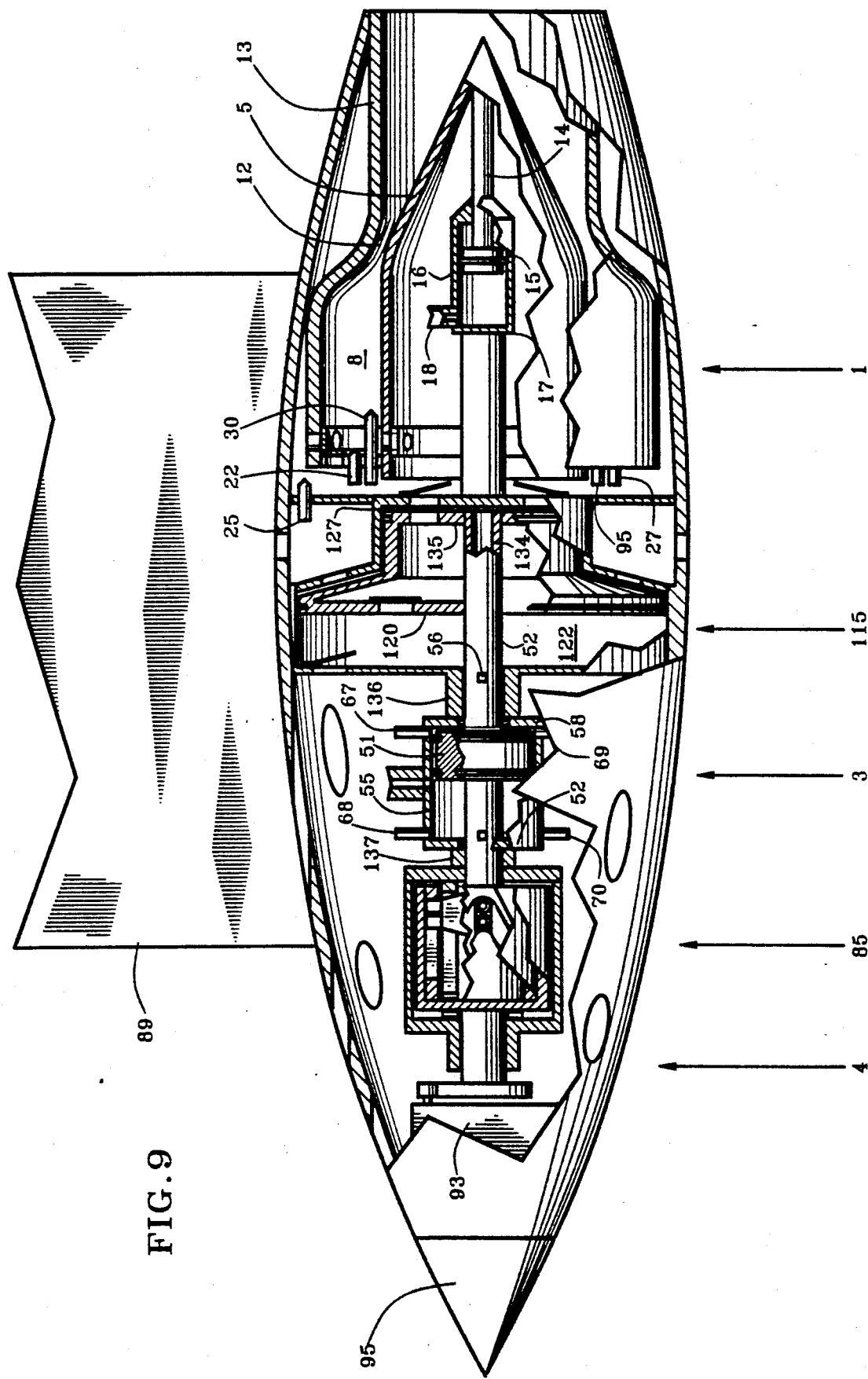
FIG. 9 is a cutaway side view of the rocketjet engine with a variable nozzle and two-stage compressor.

Referring to FIG. 9, a two-stage double-acting compressor 115 is employed in an embodiment of the rocketjet engine which is otherwise the same as the FIG. 2 embodiment. It has a margin of higher efficiency than the FIG. 2 embodiment for all of the same altitudes and speeds of operation. It has a higher range of speed with high efficiency than the FIG. 6 embodiment. Its main advantages will be shutting between earth and space stations, rather than between earth-only stations. All components of this embodiment of the rocketjet engine are described above in relation to Figures in which the numbered components are first described. In addition, however, it will be noted that compressor-end power shaft 52 takes intake air in from only a first-stage compressor cylinder 122 for prior embodiments employing the two-stage double-acting compressor 115. This is an advantage for some design options. However, as illustrated in this FIG. 9 embodiment, a second-stage power shaft 134 can be extended between a second-stage piston head 135 and first-stage piston head 120 to convey high-pressure air from second-stage compressor cylinder 127 through to power-cylinder ends 58 and 52 as described in relation to FIG. 1. A longer cylinder connection sleeve 136 is provided to prevent escape of intake air from the compressor-end power shaft 52 into first-stage-compressed intake air. A connection sleeve 137 is employed at both ends of the double-ended power cylinder 55 for embodiments using either the single-stage double-acting compressor piston 35 and cylinder 36 or the first-stage intake of air as in FIGS. 7–8. This connection sleeve 137 and the sleeve 136, together with shaft sealing means should be long enough to prevent fluid communication between compressor cylinders 122 or 36 and the shaft outlet ports 56 and 61 respectively at ends of reciprocating strokes.

In all embodiments of the rocketjet engine which transfer high-pressure air from a compressor cylinder 36 or from a second-stage compressor cylinder 127 to double-ended power cylinder 55, there would be a high work-load of double compression in the power cylinder 55 if the power-shaft outlet ports 56 and 61 were not designed small enough to prevent excessive air-flow through the cylinder 55. High pressure of intake air supplied to the power cylinder 55 decreases the volumetric requirements of the power shafts 52 and 60 and provides complete scavenging in a two-cycle intake-exhaust condition with an ideal end-to-end and center-to-outside flow pattern of supercharged air.

Figure 10:
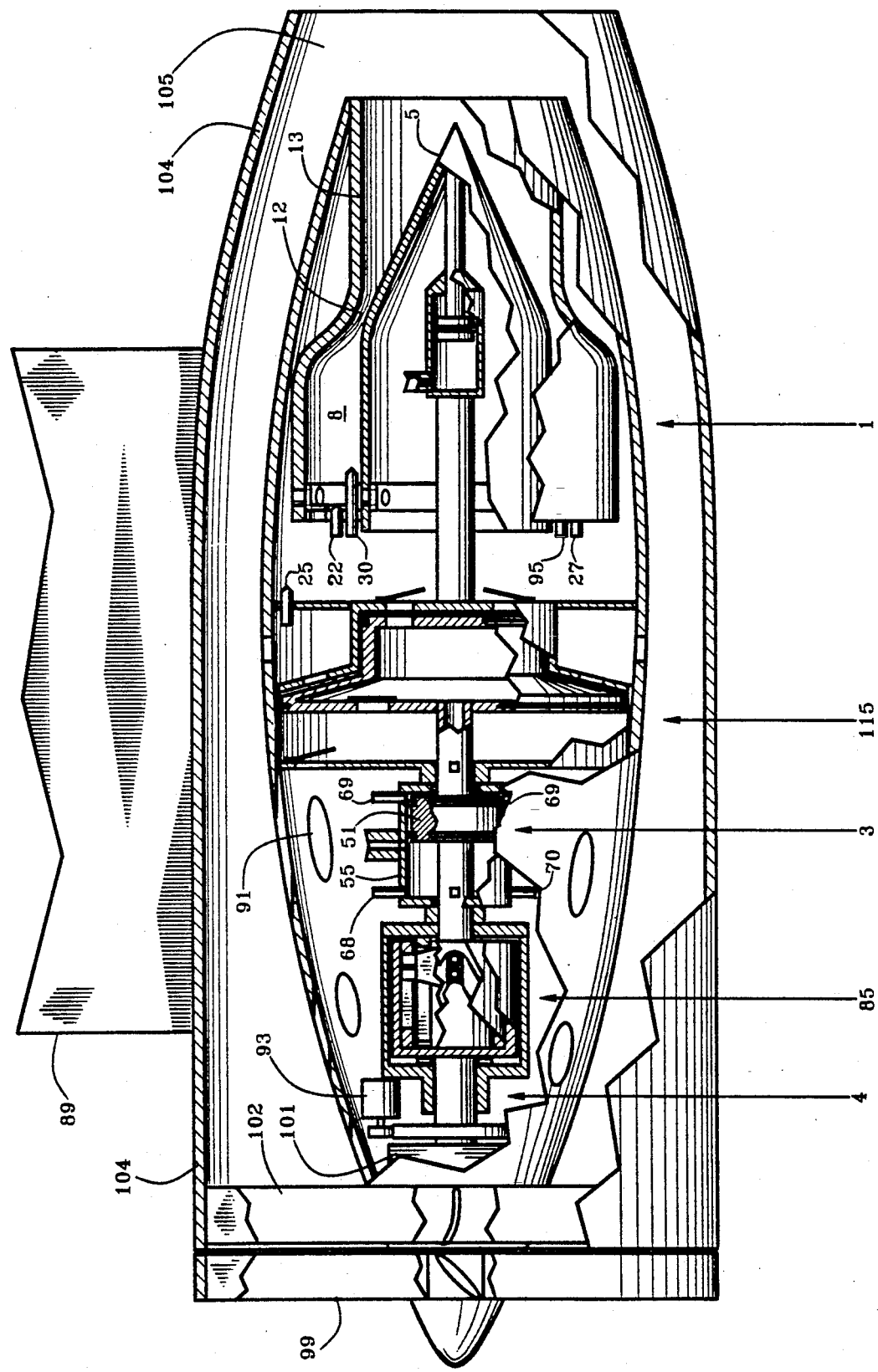
FIG. 10 is a cutaway side view of the rocketjet engine with a two-stage compressor, a bypass fan and a variable nozzle.

Referring to FIG. 10, a two-stage double-acting compressor 115 is employed in working relationship with a variable-nozzle thruster 1 and a bypass fan 99 that directs bypass air past flow-straightener blades 103 and through bypass duct 104 to bypass mix section 105 in this embodiment. This embodiment of the rocketjet engine has the highest versatility in combination with maximum efficiency and variability of thrust for all altitudes of any form of this invention. Except for dedicated low-altitude and space applications of the invention, this is the preferred embodiment for high versatility and utility. It can provide sufficient low-altitude and short-range economy and performance for business uses in the atmosphere and yet provide efficient and fast world range above sonic-boom stratospheric altitudes. It can be used for high-lift-wing aircraft for medium speeds in the atmosphere and then taken above sonic-boom altitudes or into space or near-space for high-speed and long-range uses. It can make a business aerospace plane feasible at a small fraction of the operating costs of present jet aircraft. All components of this illustration are described in relation to the above FIGS. in which they are illustrated and mentioned first.

Figure 11:
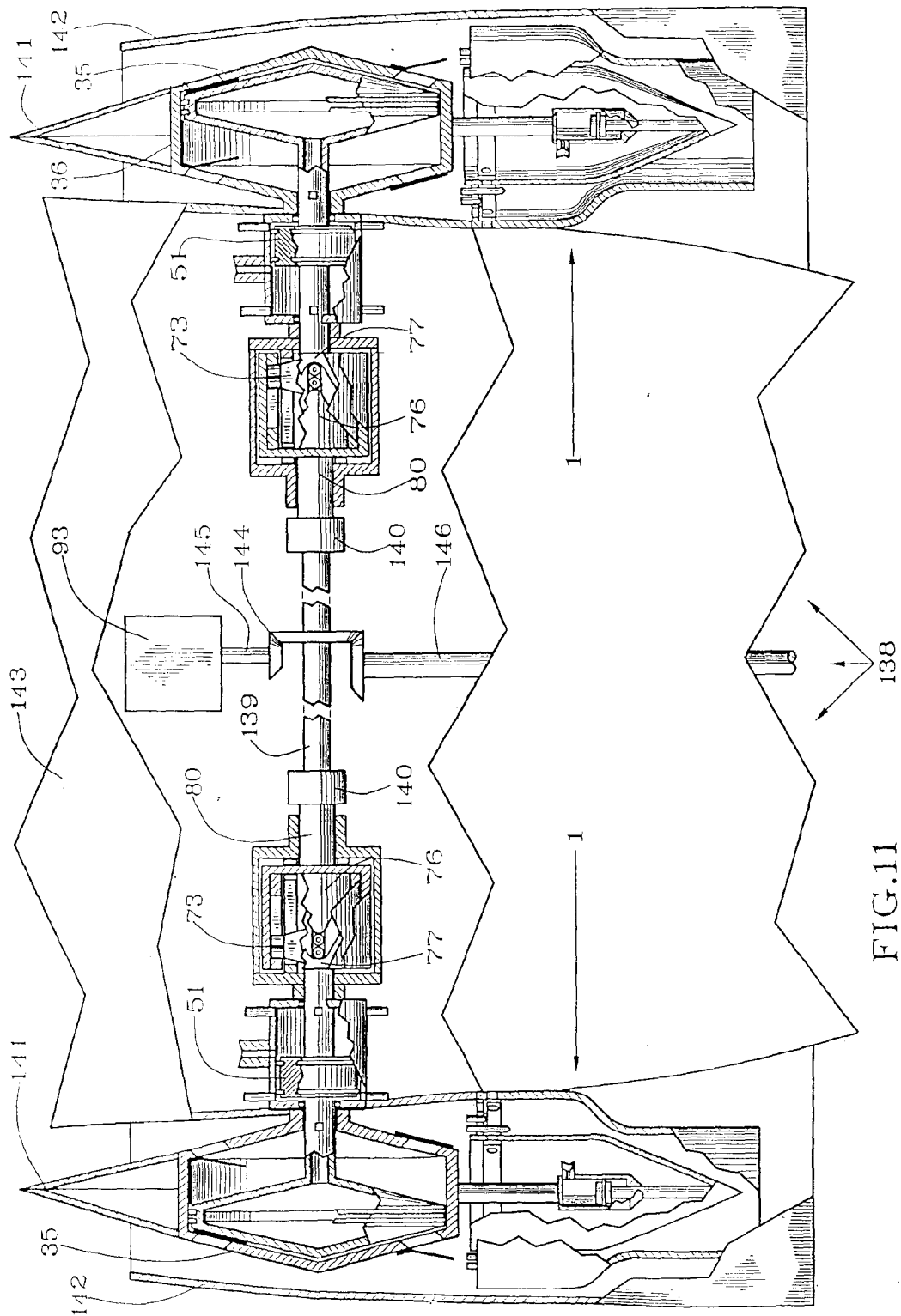
FIG. 11 is a cutaway side view of a dual opposed rocketjet engine with twin thrusters at opposite sides of a vehicle or at opposite ends of opposite-side struts or wings.
Figure 12:
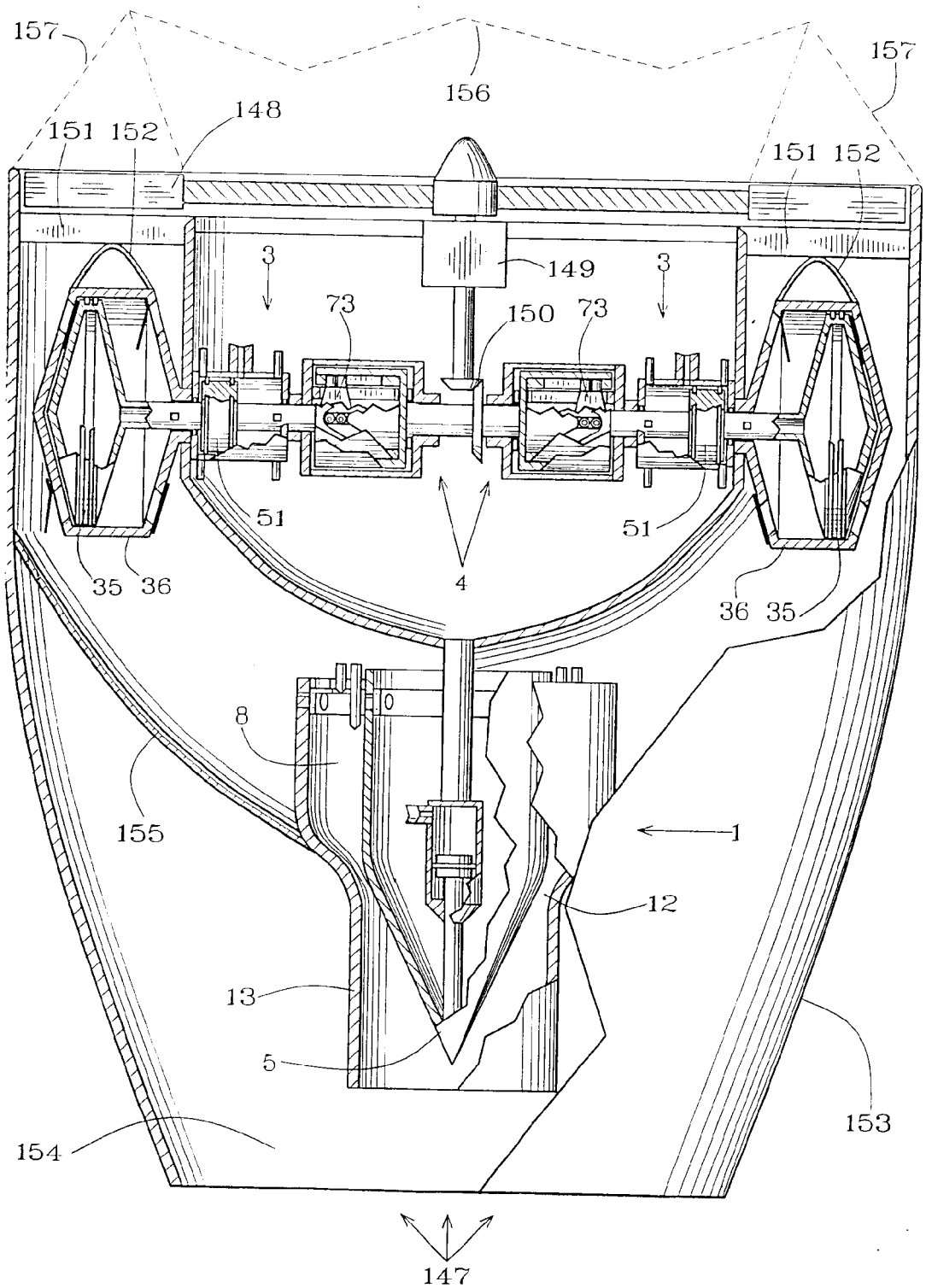
Figure 15:
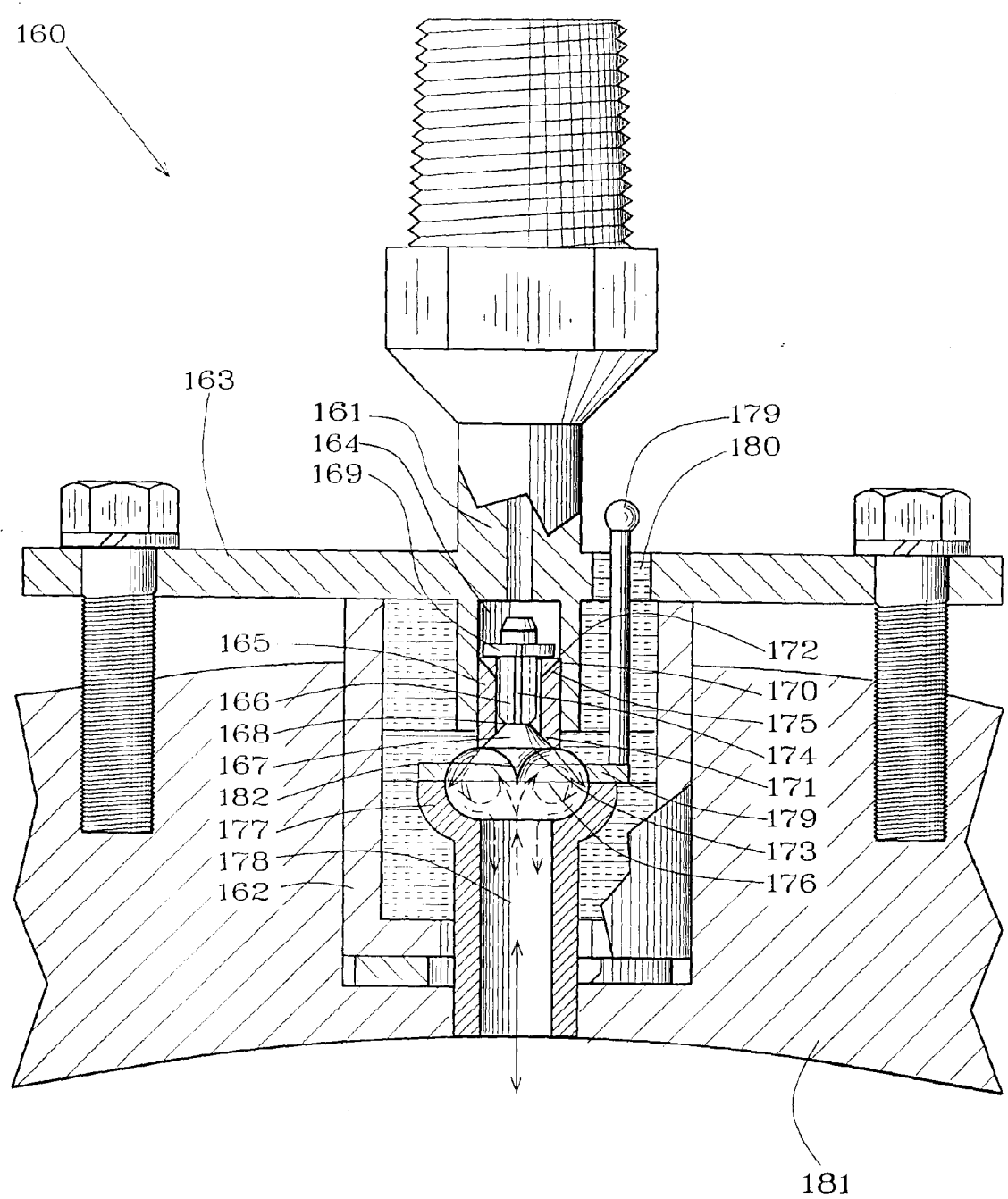

Referring to FIG. 11, an opposed twin-thruster rocketjet engine 138 has a separate variable-nozzle thruster 1 positioned at right angles to axes of separate double-ended compressor cylinders 36 with hollow double-acting single-stage compressor pistons 35 in opposed, counter-reciprocative, vibration-damping relationship through connection of rotational power shafts 80. A joining shaft 139 is indexed at joint sleeves 140 such that double-end cams 76 and 77 cause cam-followers 73 to travel in opposite reciprocative directions and to be positioned at opposite ends of reciprocative travel at ends of reciprocative strokes of the double-acting power piston 51 and the double-acting compressor piston 35. All vibration can be eliminated for totally smooth operation. In addition to vibration damping, intake-scoop surface area is lower because the compressor cylinder is provided with a pointed leading cylinder edge 141. The cylinder 35 and the thruster 1 can be positioned end-to-end in opposed engine housings 142 at opposite sides of a vehicle section 143. The joining shaft 139 is illustrated in broken section to indicate select design distances between thrusters 1. It is foreseeable, for instance, that this form of the rocketjet engine could have a separate thruster at each end of opposite-side struts of a vehicle or at opposite ends of fixed or swivel wings of a vehicle. A power-takeoff gear wheel 144 can be attached to the joining shaft 139 for rotating a peripheral-equipment shaft 145 and an optional propeller or bypass-fan shaft 146. Air augmentation for very slow speeds could be provided by an aft push propeller positioned between two thrusters 1 on rear struts of a vehicle for instance. Foreseeably, a push propeller could be enclosed in a tail section to avoid drag when not in use at high speeds. However, it is possible with all embodiments of the rocketjet engine to achieve sufficient altitude in a high-lift-wing vehicle before excessive speed is reached to be able to avoid drag that would occur in denser atmosphere at equal vehicle speeds. Although drag ratio to thrust is less than for any present engine, drag is less significant at the altitudes achievable with this engine, assuming appropriate vehicle design.

Figure 12:
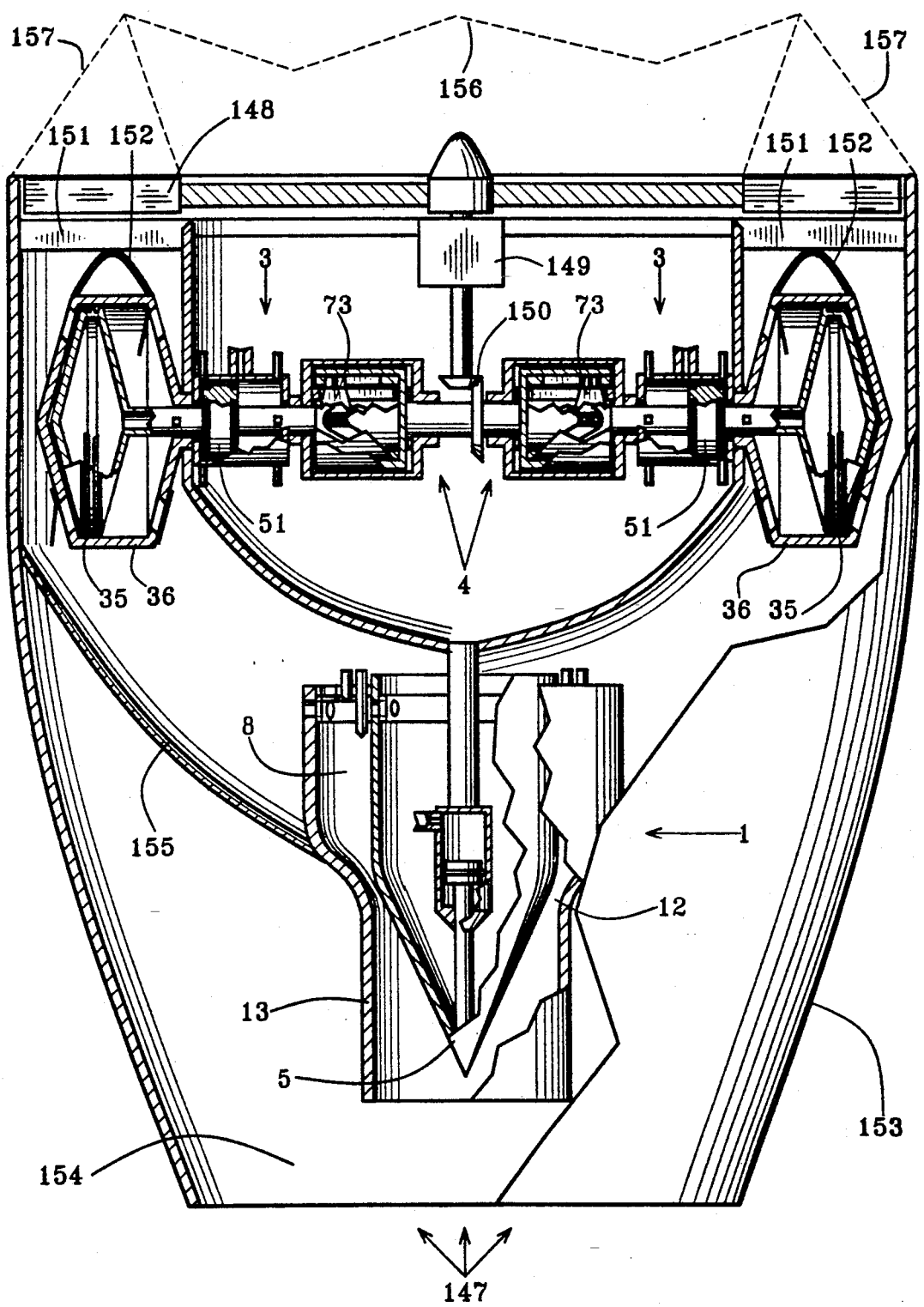
FIG. 12 is a cutaway side view of a dual opposed rocketjet engine with a single thruster mountable on a tail section or a strut of a vehicle.

Referring to FIG. 12, a double-compressor, single-thruster rocketjet engine 147 has a variable-nozzle thruster 1 supplied with compressed air for air-breathing or partial air-breathing mode from double-ended compressor cylinders 36 at opposite ends of compressor engines 3 with rotational power-takeoff shafts 4 attached in-line end-to-end. The same as for opposed twin thruster engine 138, the compressor pistons 35 and power pistons 51 are indexed for counter-reciprocative vibration damping. Owing to the single thruster 1, this embodiment of the rocketjet engine is more amenable to strut attachment under a wing or on a side strut than the twin-thruster engine 138. Consequently, it is more adaptable also to a bypass fan 148 positioned for rotation in front of compressor cylinders 36. Rotational rate of the bypass fan 148 can be geared appropriately by gear box 149 with power take-off gearing 150 from connected power-takeoff shafts 4. A double-compressor flow-straightener 151 upstream from pointed leading cylinder edges 152 can be employed to maximize efficiency of the by pass fan 148. A double-compressor-engine bypass duct 153 conveys bypass air from the fan 148 to a double-compressor bypass mixing section 154 appropriately downstream from thruster nozzle sleeve 13. Separate thruster intake ducts 155 convey compressed intake air from the compressor cylinders 36 to the thruster 1. Bypass-augmentation air from the bypass fans is not compressed to compression-supportive pressure. It is only moved in high volume into exhaust flow from the nozzle sleeve 13. If a fixed nozzle thruster 106 were employed as foreseeable for some applications in place of the variable-nozzle thruster 1 illustrated, only the thruster and related components would be changed. It is foreseeable that this double-compressor engine 147 can be attached aft of a vehicle section 156 where it would receive intake air from intake air scoops 157. This engine as well as the twinthruster engine 138 are mostly for increased smoothness and duplicity for commercial applications. However, smoothness is not so much a factor because of the effect of thrust linear to vibration of the single-compressor embodiments of the rocketjet engine. Vibration not being up-and-down or from-side-to-side, it is not significantly detectable for most applications.

Referring to FIG. 13, bypass fan 148 with flow-straightener 151 behind it occupies approximately the same proportion of frontal section as for convention bypass jet engines. However, the exhaust gases of the rocketjet engine are three times higher as a result of three times the heat that is converted to effective pressure for thrust from the rocketjet engine. Thus the frontal-drag is approximately one-third per thrust level of present bypass engines generally. The bypass fan 148 can be positioned at a circumferential perimeter of a bypass-fan wheel 158 if the engine 147 is mounted aft of a fuselage or other engine section. However, for strut mounting, the bypass-fan wheel 158 can be cone-shaped to where hub cone 159 occupies the entire area within the circumference of the bypass fan 148. A compressor cylinder 36 is shown at the left side where illustration of blades of the bypass fan 148 are omitted in cutaway illustration.

Referring to FIG. 14, a rear view of double-compressor engine 147 reveals bypass duct 153 in communication between bypass fan 148 and mixing section 154. Thruster intake ducts 155 are illustrated in conveyance of compressed intake air from compressor cylinders 36 to combustor sleeve 9 of thruster 1. Nozzle cone 5 is illustrated centrally within thruster nozzle sleeve 13.

Figure 15:
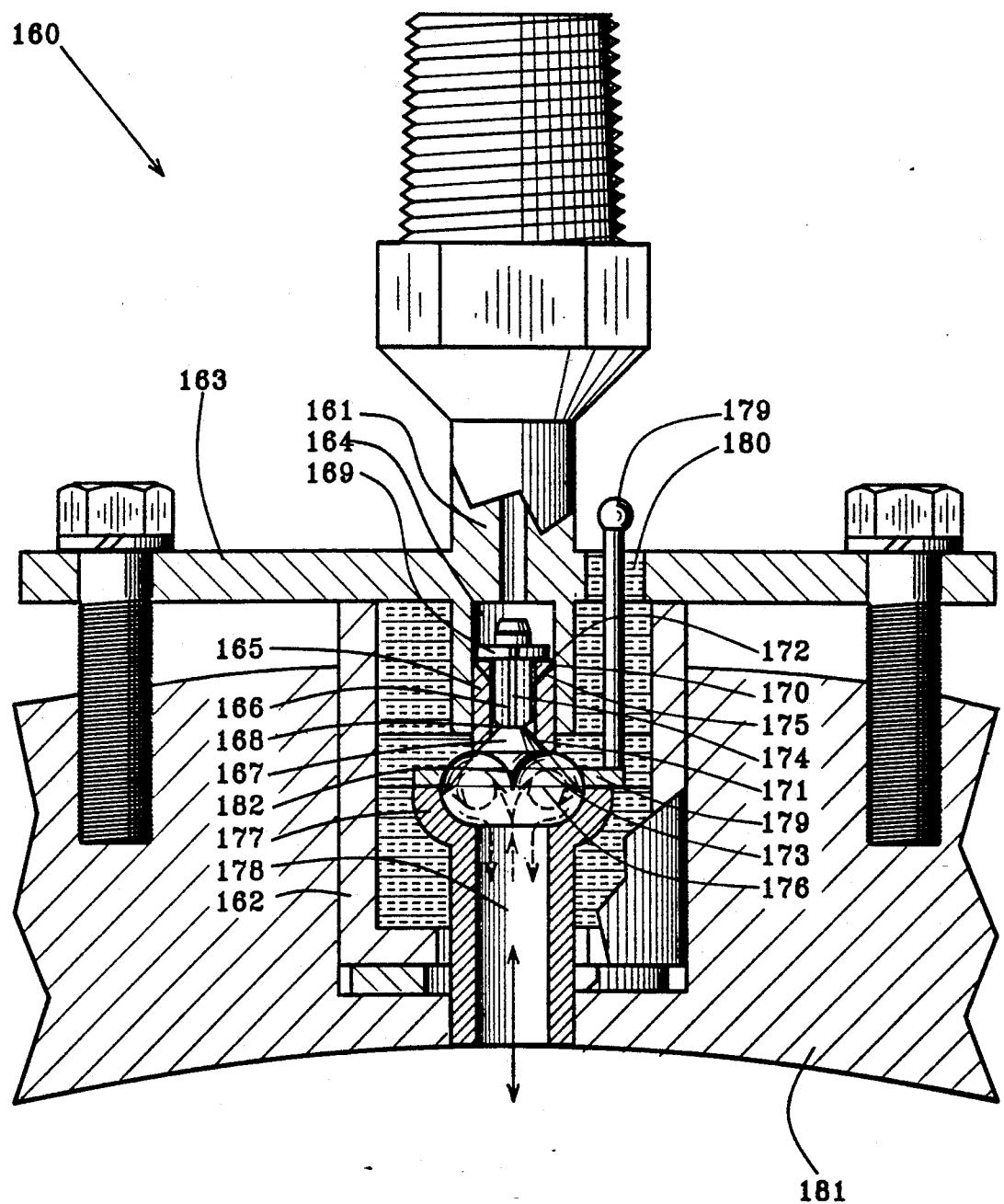
FIG. 15 is a cutaway side view of a phase-change injector of either water or fuel into a compressor-engine portion of the rocketjet engine. When used to inject water for achieving high-pressure-steam thrust by cooling the engine, this phase-change injector is known also as a flash-boiler water injector.

Referring now to FIG. 15, the same general construction and operation features can be employed for injection of fuel as for injection of water into compressor end 58 and drive end 62 of double-ended power cylinder 55 of the compressor engine 3. In the rocketjet engine, water is treated substantially the same as fuel for achieving phase-change injection. In separate fuel injectors 67 and 68 and in separate water injectors 69 and 70, a compressor-engine injector 160 allows either liquid fuel or water to be preheated to near phase-change level in the injector. A high preheat level is achieved within the injector because, unlike conventional compression-end fuel injectors used generally in compression-ignition engines, there is no return flow of overrun-cooling liquid from an injector to a fuel source or to a fuel line. Instead, only the amount of liquid fuel or water in separate injectors 160 injected into the engine 55 flows to the injectors 160. Cooling to prevent heat distortion and to assure structural integrity under combustion-heat operating conditions of the injectors 160 is achieved not by return-flow cooling within an injector but by phase-change water cooling of the entire double-ended power cylinder 55 which includes the same phase-change cooling of the injectors 160. Fuel for fuel injection or water for water injection, either referred to as fluid, is the injector tube 161 are designed to provide sufficient contact with heated transferred from cylinder 55 to raise temperature of the fluid to near phase-change heat. For fuel, the heat level would be near 300 degrees F. For water, the heat level would be near 200 degrees F. The injector tube 161 and a phase-change housing 162 are attachable to an engine framework such as cylinder ends 69 and 70 by a fastener means such as injector shoulders 163 with fastener members such as injector bolts. Different fastener means can be employed alternatively for different engine forms and use conditions. From the injector tube 161, the fluid is directed into a valve chamber 164. The valve chamber 164 houses a valve sleeve 165 inside of which reciprocates a valve stem 166 having poppet valve 167 at a valve-seat end 168 and a valve-stem shoulder 169 at a valve-control end 170 of the valve stem 166. The valve 167 seats in a valve seat 171 when closed and opens a distance determined by contact of the valve-stem shoulder 169 with valve-sleeve control shoulder 172. Positioning of the valve-stem shoulder 169 on the valve stem 166 at the valve-control end 170 determines opening distance of travel of the valve 167. Typically, the valve-stem shoulder 169 would be fastened on the valve stem 166 at a position which would allow several thousandths of an inch of travel of the valve 167 from the valve seat 171 before the valve-stem shoulder 169 contacted the valve-sleeve control shoulder 172 to prevent further opening of the valve 167. This opening distance of the valve causes fluid sprayed past the open valve to be in a fine film which atomizes the fuel being injected to aid in its phase-change to a gaseous state. The valve 167 is opened by timed injection pressure of fluid entering through the injector tube 161. The valve is closed by pressure against valve head 173 resulting from compression pressure in cylinder 55 prior to injection and by combustion pressure in cylinder 55 after injection. Flow of fluid along the valve stem 166 can be aided by linear grooves 174 in the inside periphery of valve sleeve 165 and radial grooves 175 in either the valve-sleeve control shoulder 172 or in the valve-stem shoulder 169. The valve head 173 and valve seat 171 are terminal at a phase-change chamber 176. The phase-change chamber 176 can be provided with a resistance heater phase-change wall 177 which can be extended to form a resistance-heater phase-change bore 178 in fluid communication between the phase-change chamber 176 and cylinder 55. Electrical current for resistance heating of wall 177 and bore 178 can be provided by a conductor 179 bounded by electrical insulation 180. The electrical insulation 180 can be positioned between the inside periphery of housing 162 and the outside periphery of the conductor 179, the outside periphery of phase-change chamber 176 and the outside periphery of bore 178. The bore 178 can be grounded against engine housing 181 of cylinder 55. A swirl cone 182 can be positioned on valve head 173 concentrically with axis of the bore 178 to direct intake air into inwardly-swirling gas flow to aid phase change within the phase-change chamber 176. A coned spray of atomized fluid passing an open valve 167 can be directed against resistance-heater phase-change wall 177 while being atomized and mixed further by action of inwardly-swirling gases being compressed into the phase-change chamber by compression strokes of double-acting power piston 51 in double-ended power cylinder 55. With preheat of the fluid, preheat and compression heat of intake air and resistance-wall heating of the phase-change chamber, water is flash-boiler converted to wet steam within the phase-change chamber. Dry, high-pressure steam initially within the phase-change chamber is prevented by volume confinement and by the amount of water injected by thermostatic regulation which dissipates excessive phase-change heat. When the wet steam escapes through bore 178 into cylinder 55, it comes in contact with peak heat of combustion and changes to high-pressure dry steam by converting combustion heat to steam pressure after peak combustion pressure has been utilized for initial power-stroke pressure and after sufficient completeness of combustion has been achieved to prevent dousing of combustion flame with the wet steam conversion to high-pressure dry steam. The amount of water injected in this flash-boiler method is thermostatically regulated to maintain a heat level which assures complete combustion and complete phase-change of flash-boiler-injected water in the cylinder 55. Fuel is injected in the same manner as water through separate but similar injectors. A difference between water injection and fuel injection, however, is that the electrical current provided through conductor 179 can be terminated after engine heat is achieved because the fuel generates its own phase-change heat while water dissipates rather than generates heat and because regenerative heating of intake air in addition to compression heating of intake air provides ample heat for ignition of fuel after an engine has been started and warmed up. Moderate compression ratios between 6-and-12-to-1 can be employed in this combustion process. Fuel will be injected through a fuel injector 67 or 68 at one side of a power cylinder 55 slightly ahead of injection of water through a water injector 69 or 70 at a different circumferential location in power cylinder 55. By the time flame front from rapid-burning of balanced mixture ratio of fuel and air directed from a fuel injector 67 or 68 reaches wet steam directed from a water injector 69 or 70, combustion completeness and thorough phase-change of wet steam to high-pressure dry steam are assured under these controlled conditions.

Figure 16:
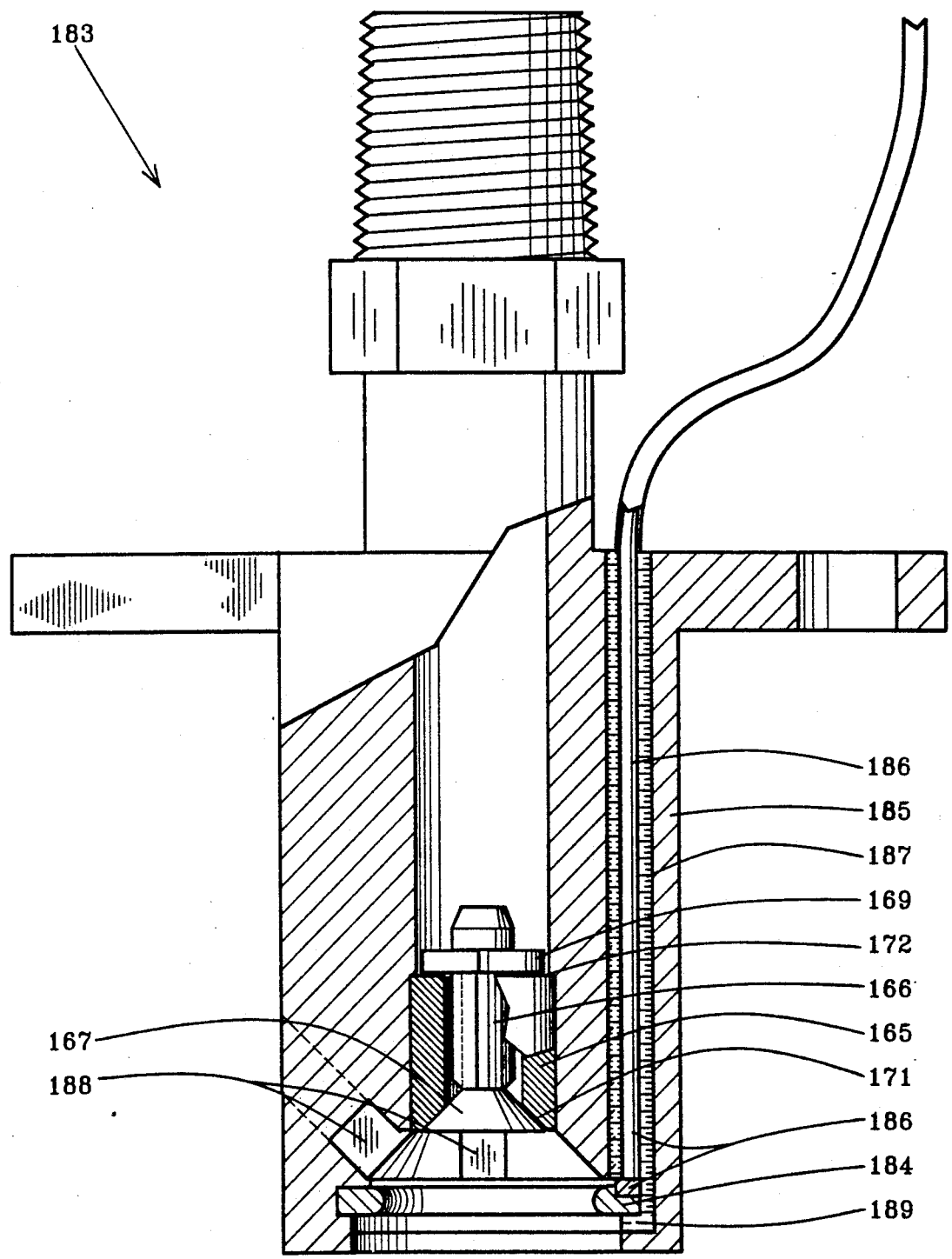
FIG. 16 is a phase-change injector of either water, as a flash-boiler water injector, or fuel into a thruster portion of the rocketjet engine.
Figure 1:
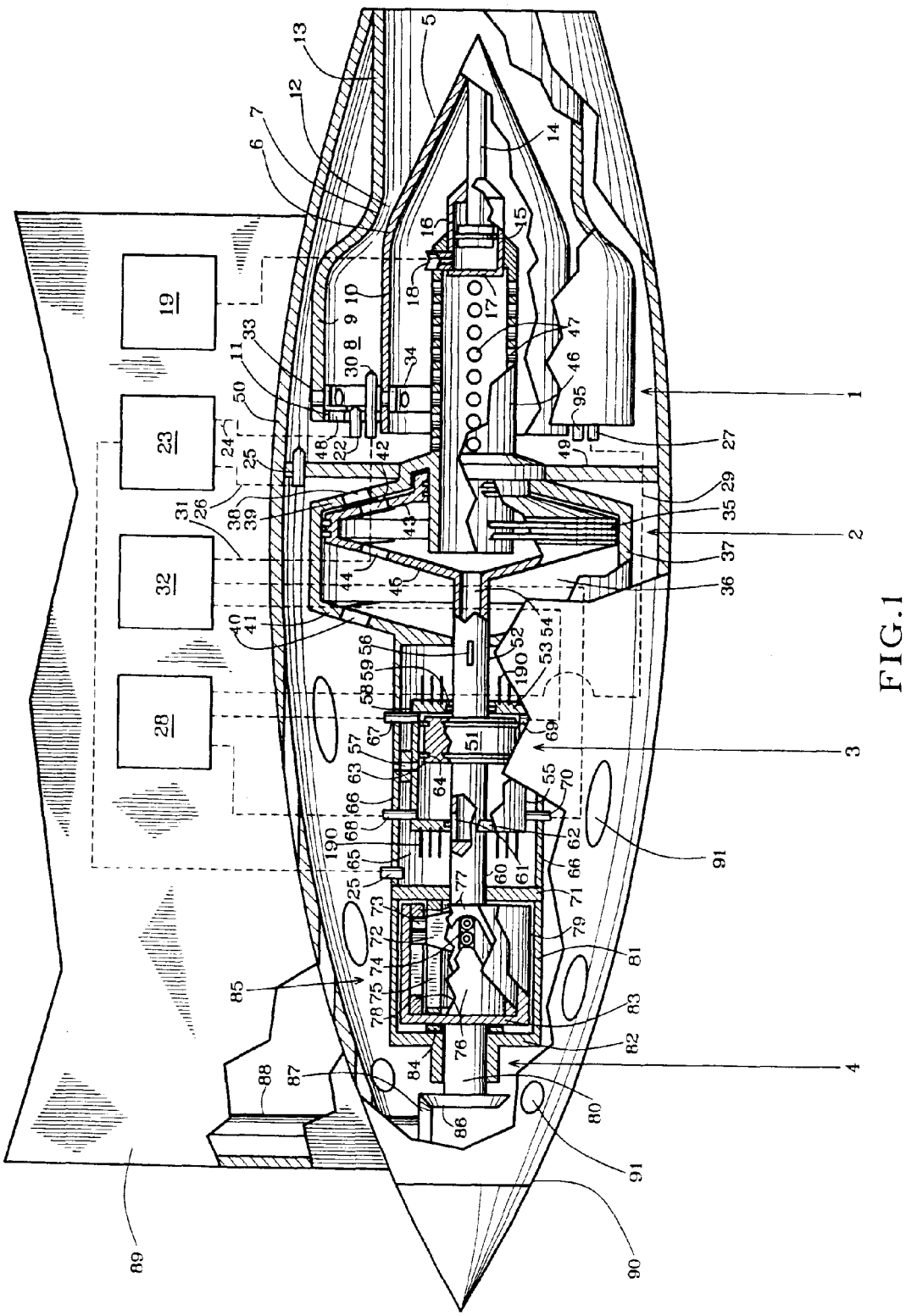
Figure 2:
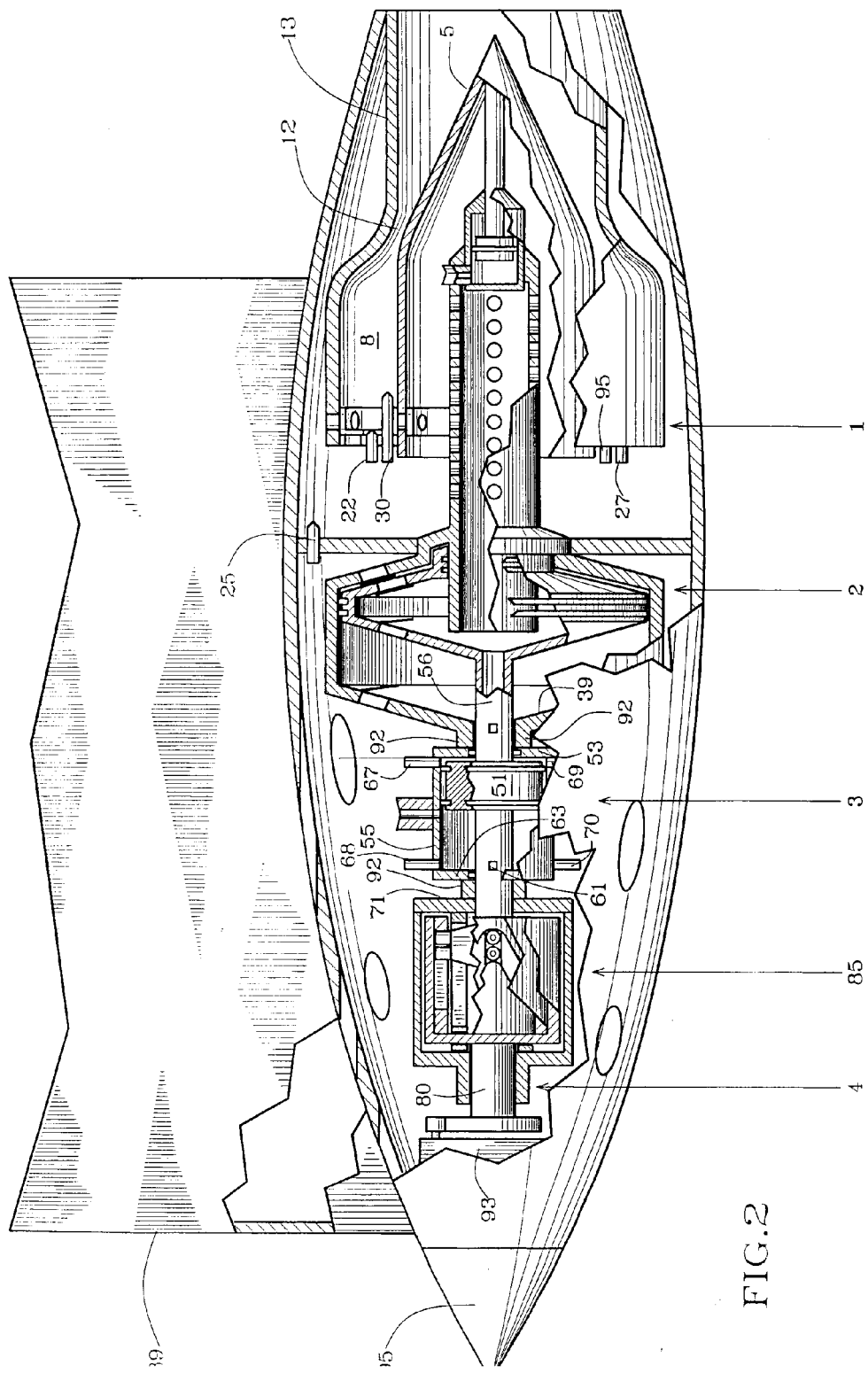
Figure 3:
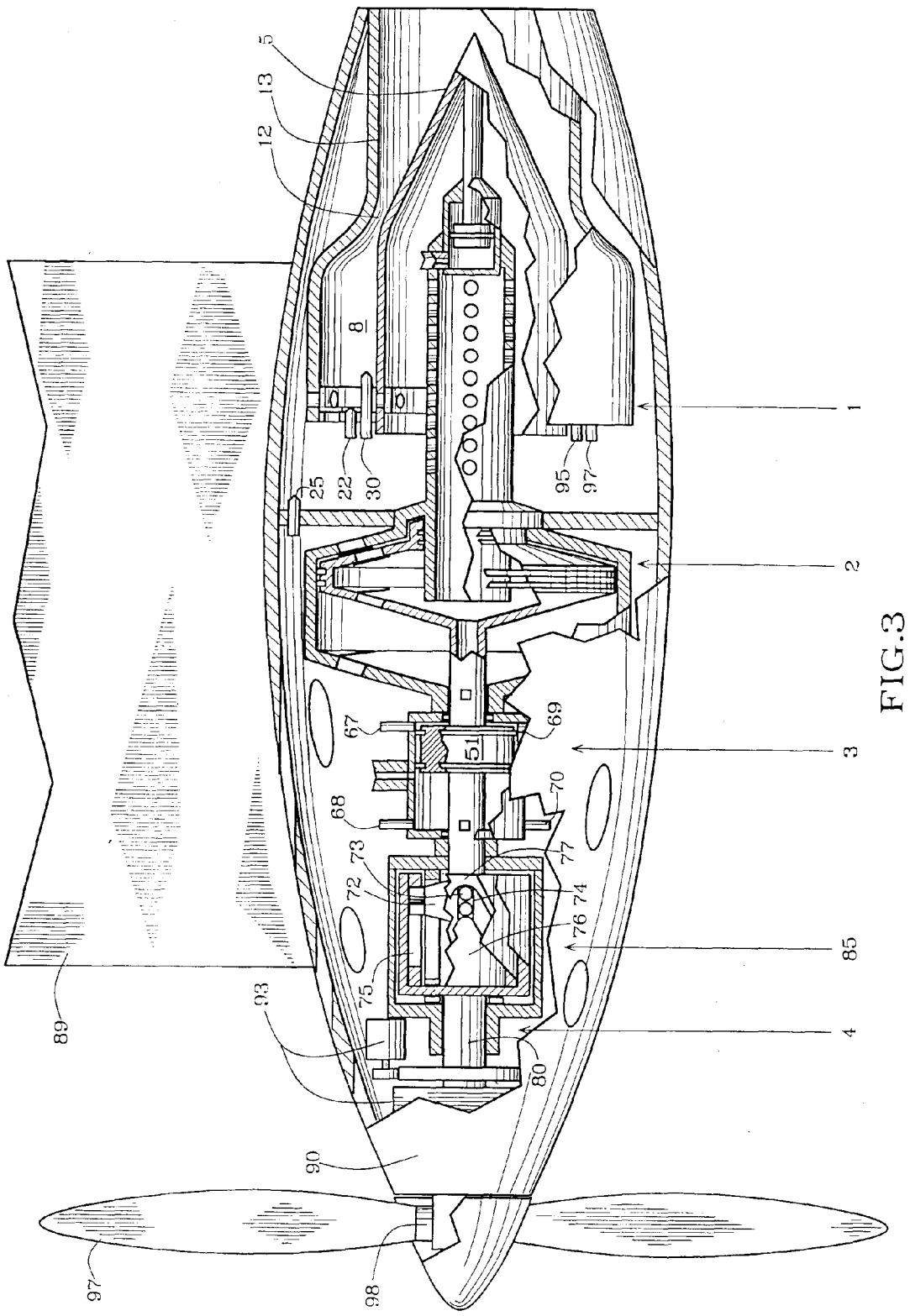
Figure 4:
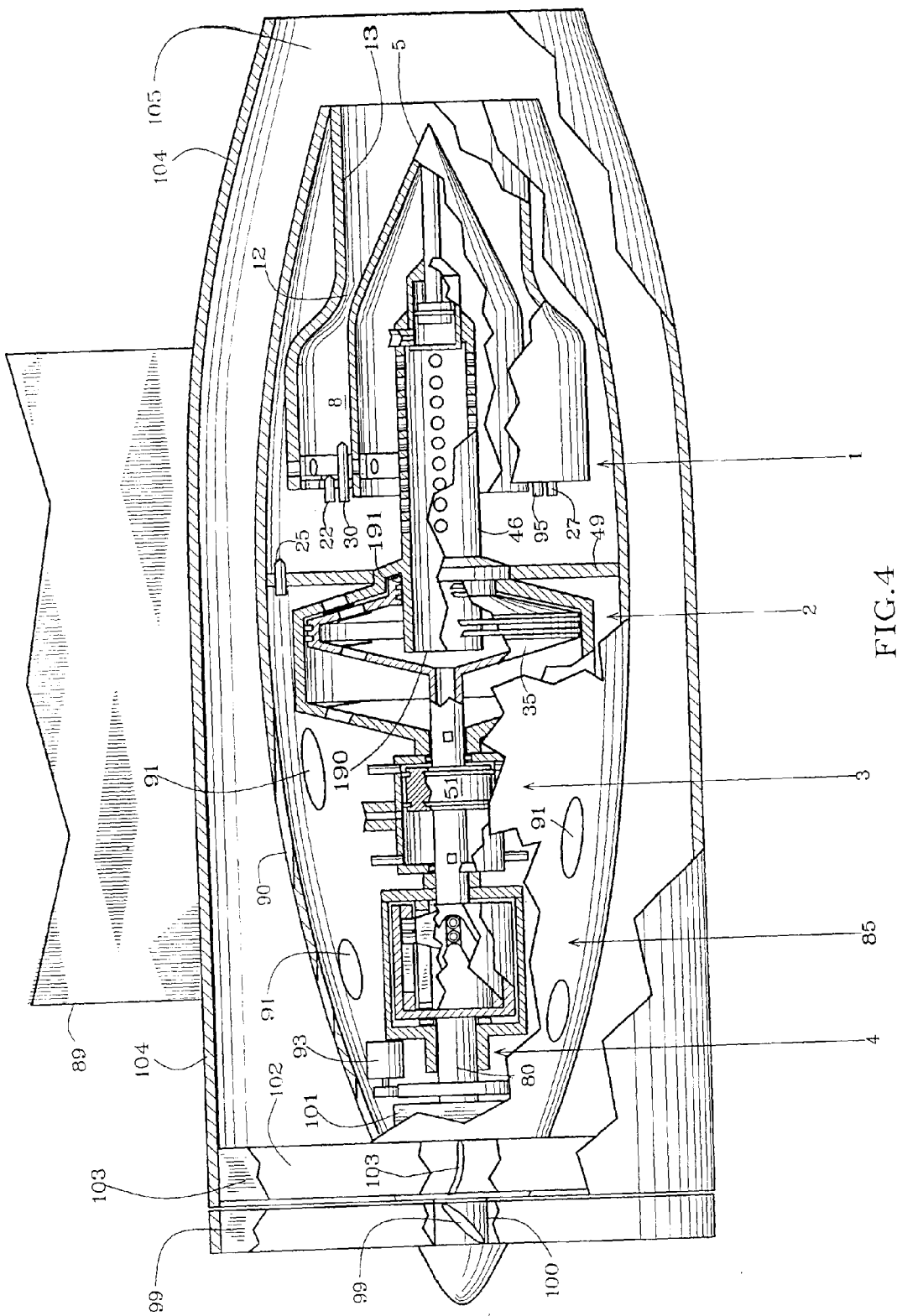
Figure 5:
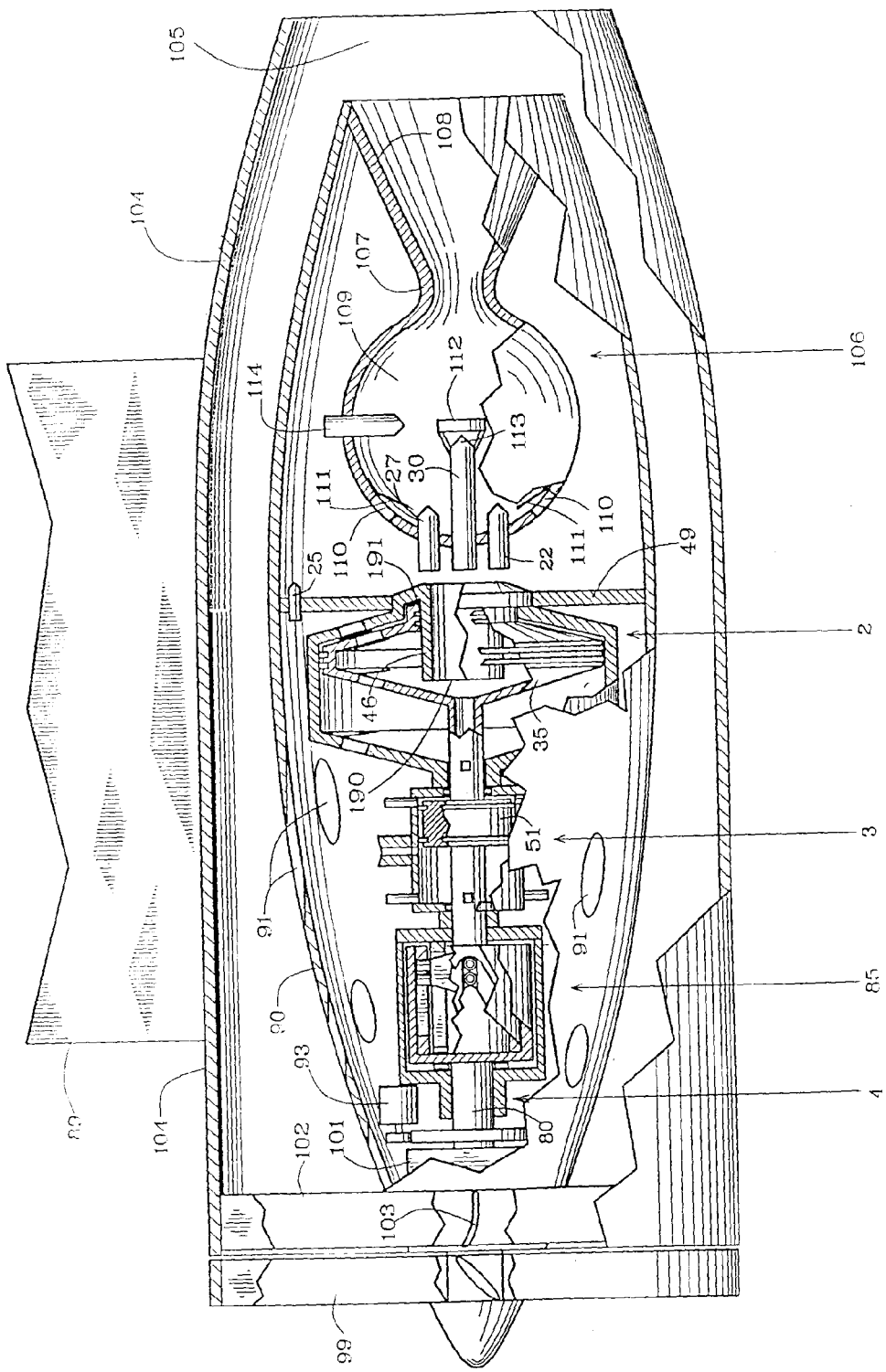
Figure 6:
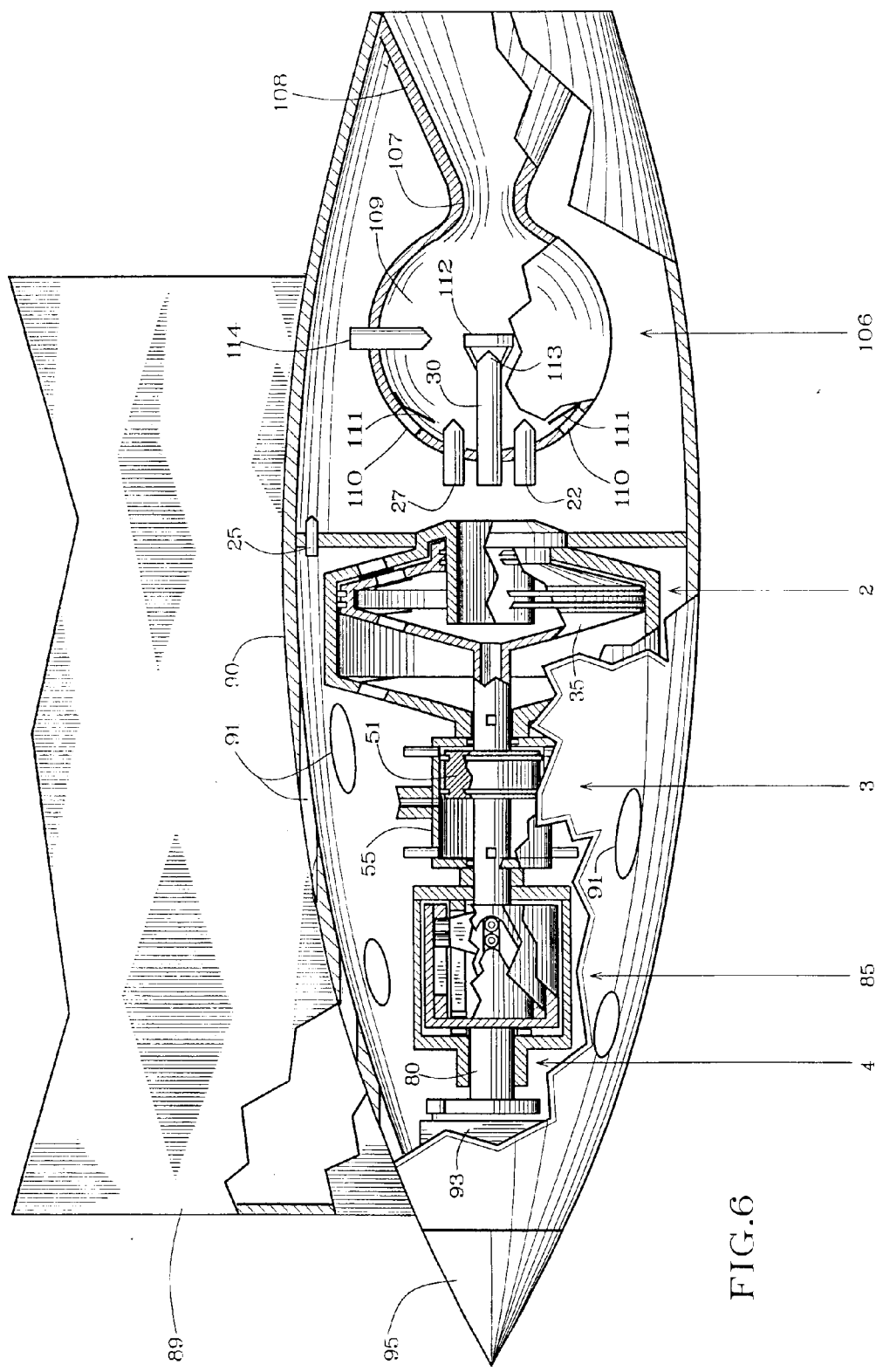
Figure 7:
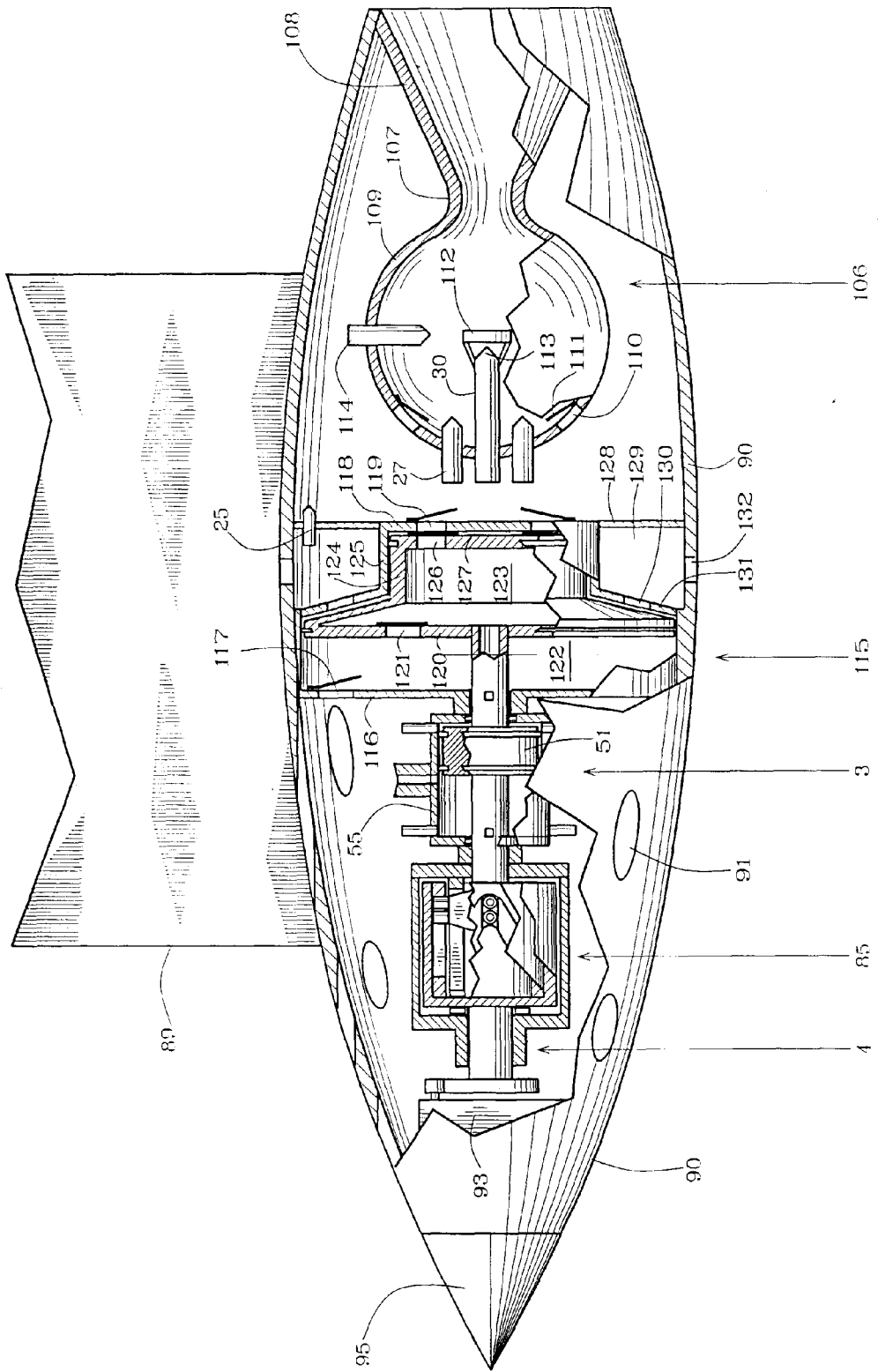
Figure 8:
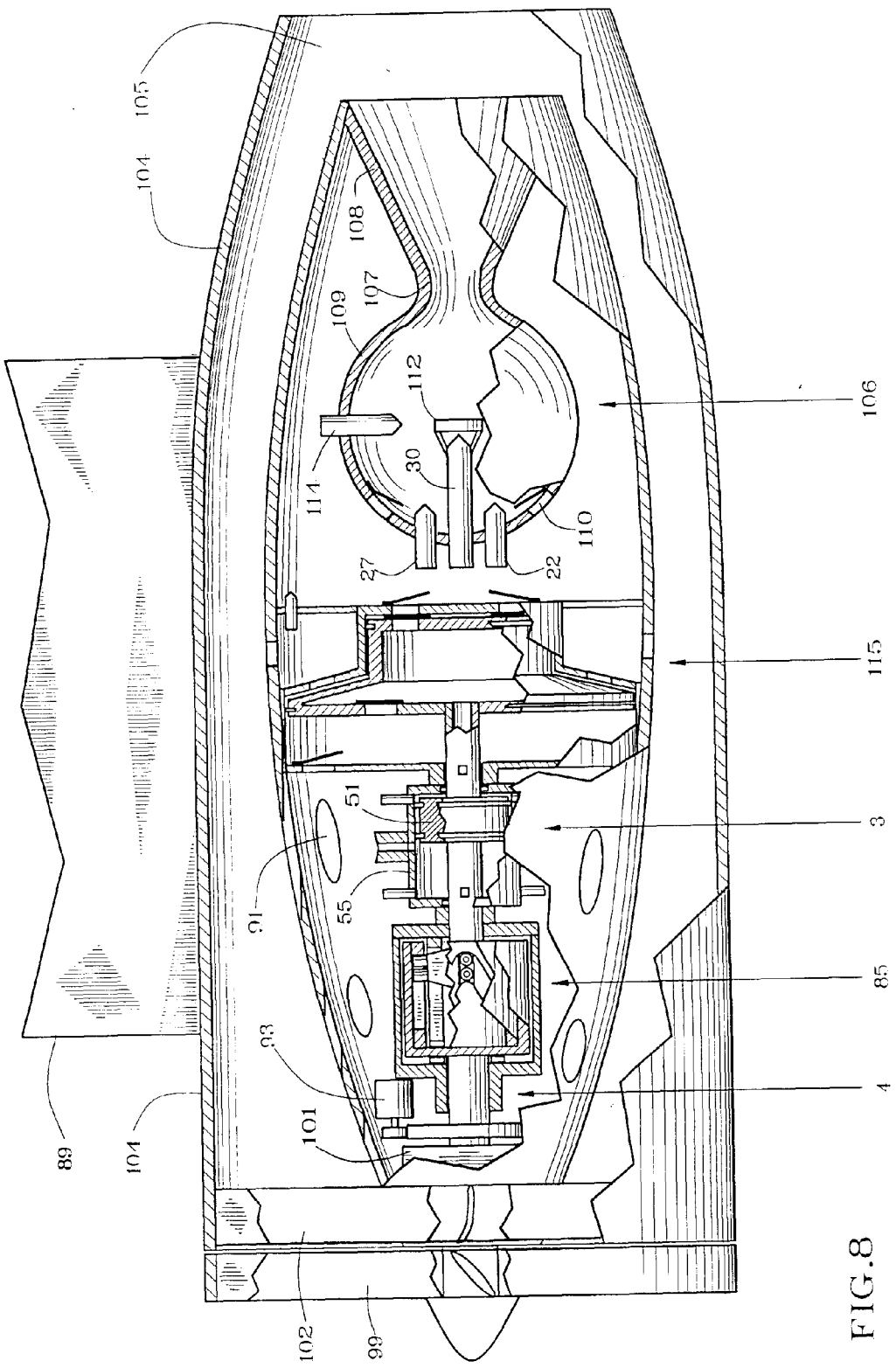
Figure 9:
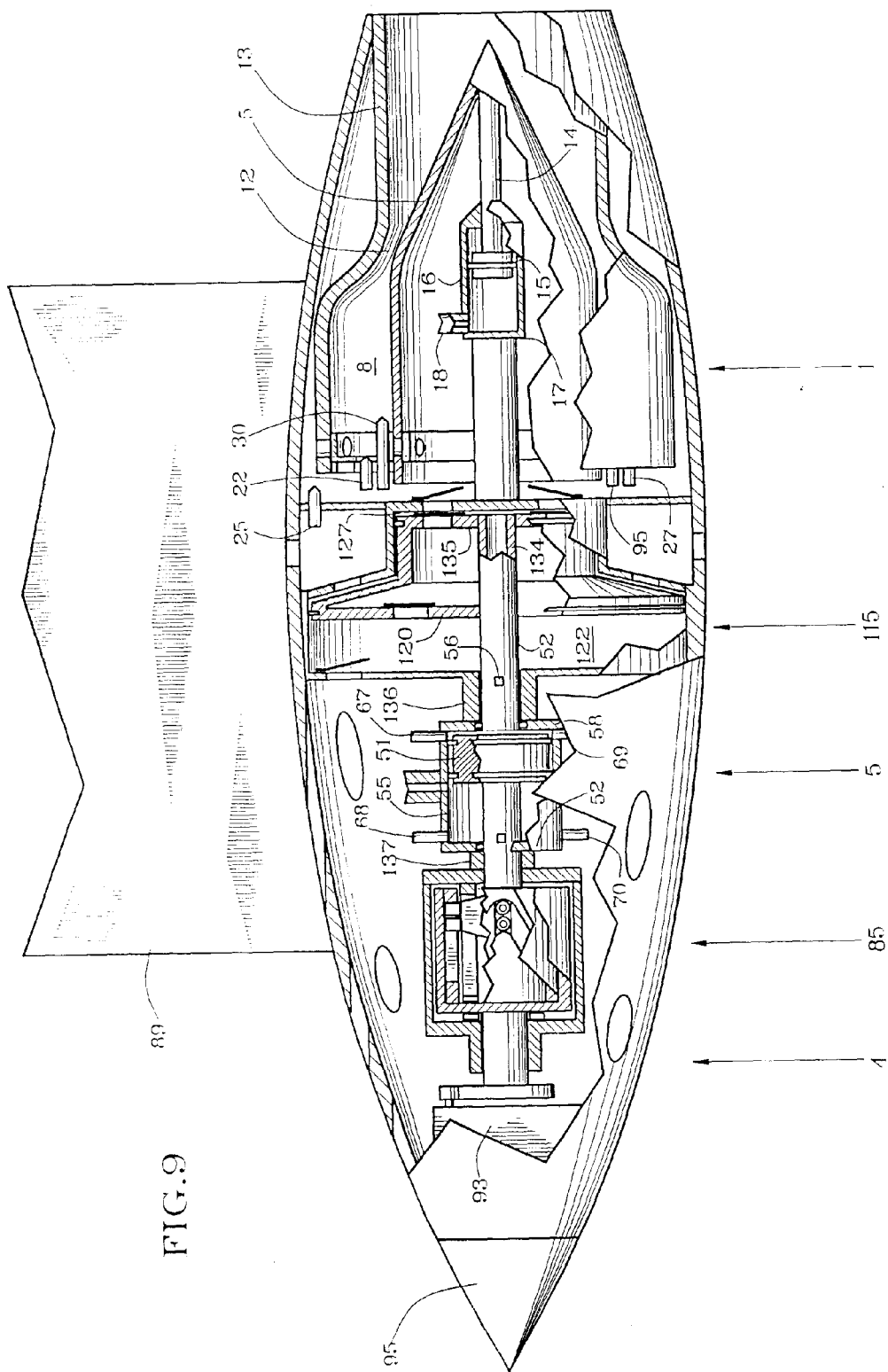
Figure 10:
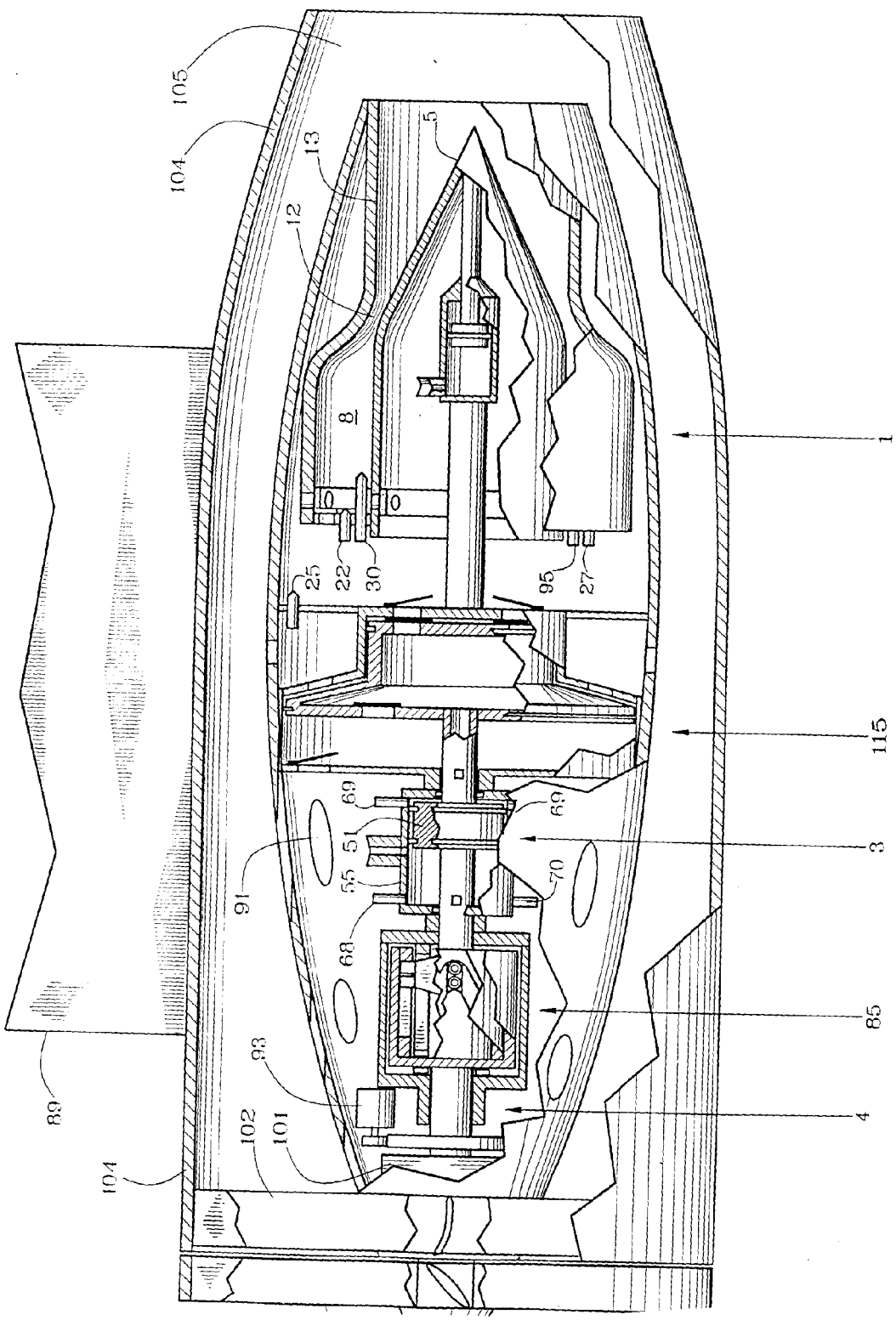

Referring now to FIG. 16, a thruster injector 183 is different from a compression-engine injector 160 in that there is no phase-change chamber 176. Instead, the combustor is a phase change-change chamber. There is no cyclic compression of oxidizer, such as air, that can be directed into a phase-change chamber 160 between cycles of combustion. There is, however, a combustor resistance heater 184 which can be positioned circumferentially around a valve seat 171 of valve 167 in sleeve 165. A thruster-injector housing 185 can be constructed slightly different from a compressor-engine injector housing 162. The valve stem 166, shoulders 169 and valve-sleeve control shoulder 172 can be similar but sized and shaped for combustor conditions. A thruster-injector conductor 186 and insulation 187 can be positioned to provide current to an integral ring heater 184 or to a separate ring heater 112 illustrated in FIGS. 5–8. A thruster water injector 30 can be longer than a thruster fuel injector 27 and regulative in distance of insertion into a combustor. Fuel, oxidizer and combustion gases can circulate around the integral heater ring 184 through igniter channels 188. Heater-ring insulation 189 assures flow of current from the conductor 186 through the resistance heater 184 and into housing 185 at an oppositely-disposed position circumferentially from the conductor 186 to complete an electrical circuit.

Construction of the injectors 27, 30 and 67–70 are not limited to the particular forms illustrated. Any construction which atomize-injects fuel or water into a resistance-heated phase-change chamber or into a combustor of a reaction engine to achieve these objectives is included in the rocketjet invention.

What is claimed is:

1. A rocketjet engine comprising:

a double-acting power piston in reciprocative relationship to an inside periphery of a double-ended power cylinder;

a double-acting compressor piston in reciprocative relationship to an inside periphery of a double-ended compressor cylinder that is attached concentrically to the double-ended power cylinder;

a compressor-end power shaft having a power-piston end attached to a compressor end of the double-acting power piston and a compressor-piston end attached to a power-cylinder end of the double-acting compressor piston;

a reaction-engine thruster attached to the double-ended compressor cylinder;

a compressed-air conveyance means in communication between one-way outlet valves in the double-ended compressor cylinder and at least one combustor intake port in a combustor section of the reaction-engine thruster;

a drive-end power shaft having a power-piston end attached to a drive end of the double-acting power piston and a drive end attached to a rotational power-takeoff means;

a separate cylinder fuel injector in fluid communication between a fuel-supply line and an inside periphery of each end of the double-ended power cylinder;

a separate cylinder phase-change water injector in fluid communication between a water-supply line and an inside periphery of each end of the double-ended power cylinder;

a combustor fuel injector in fluid communication between a fuel-supply line and an inside periphery of the combustor section of the reaction-engine thruster; and a combustor phase-change water injector in fluid communication between a fuel supply line and an inside periphery of the combustor section of the reaction-engine thruster.

2. A rocketjet engine according to claim 1 wherein the rotational-power-takeoff means is a double-end-cam drive having a double-end-cam follower to which the drive end of the drive-end power shaft is connected concentrically.

3. A rocketjet engine according to claim 1 and further comprising:

an accessory gear in gear-drive relationship to the double-end-cam drive.

4. A rocketjet engine according to claim 1 wherein the double-acting compressor piston is a single-stage compressor piston having equal diameters of both ends of the double-acting compressor piston in reciprocative contact with inside peripheral walls of a single-stage compressor cylinder having equal diameters of both ends of the single-stage compressor cylinder.

5. A rocketjet engine according to claim 1 wherein the double-acting compressor piston is a two-stage compressor piston having a first-stage piston head that is larger in diameter than a second-stage piston head, the double-ended compressor cylinder is a two-stage cylinder in which a first-stage end of the double-acting compressor piston is in sliding contact with an inside periphery of a first-stage end of the double-ended compressor cylinder, and a second-stage end of the double-acting compressor piston is in sliding contact with an inside periphery of a second-stage end of the double-ended compressor cylinder concentrically.

6. A rocketjet engine according to claim 1 wherein the reaction-engine thruster has a fixed nozzle throat and a fixed nozzle skirt.

7. A rocketjet engine according to claim 1 wherein the reaction-engine thruster has a variable-ratio nozzle throat with a nozzle cone positional linearly in relation to a thruster sleeve.

8. A rocketjet engine according to claim 1 wherein the cylinder phase-change water injector has a phase-change chamber with a resistance-heated phase-change chamber into which water is sprayed and a resistance-heater phase-change bore through which steam is discharged from the resistance-heated phase-change chamber into the combustor section of the reaction-engine thruster.

9. A rocketjet engine according to claim 1 wherein the combustor phase-change water injector has a combustor resistance heater ring positioned proximate sprayed entrance of water into the combustor section of the reaction-engine thruster.

10. A rocketjet engine according to claim 1 and further comprising:

an air-scoop nose cone attached to the double-ended compressor cylinder and having air-scoop orifices through which intake air is directed for conveyance to the double-ended compressor cylinder.

11. A rocketjet engine according to claim 1 wherein the rotational-power-takeoff means is a double-end-cam drive having a double-end-cam follower to which the drive end of the drive-end power shaft is connected concentrically, and wherein the double-acting compressor piston is a single-stage compressor piston having equal diameters of both ends of the double-acting compressor piston in reciprocative contact with inside peripheral walls of a single-stage compressor cylinder having equal diameters of both ends of the single-stage compressor cylinder.

12. A rocketjet engine according to claim 1 wherein the rotational-power-takeoff means is a double-end-cam drive having a double-end-cam follower to which the drive end of the drive-end power shaft is connected concentrically, and wherein the double-acting compressor piston is a two-stage compressor piston having a first-stage piston head that is larger in diameter than a second-stage piston head, the double-ended compressor cylinder is a two-stage cylinder in which a first-stage end of the double-acting compressor piston is in sliding contact with an inside periphery of a first-stage end of the double-ended compressor cylinder, and a second-stage end of the double-acting compressor piston is in sliding contact with an inside periphery of a second-stage end of the double-ended compressor cylinder concentrically.

13. A rocketjet engine according to claim 1 and further comprising:

a cylinder regenerative heat-exchange chamber positioned externally to the double-ended power cylinder;

cylinder heat-exchange members extended from walls of the double-ended power cylinder into the regenerative heat-exchange chamber;

an intake air conveyance in fluid communication between the double-ended compressor cylinder and the regenerative heat-exchange chamber; and an intake air conveyance in fluid communication between the regenerative heat-exchange chamber and an inside periphery of the double-ended power cylinder.

14. A rocketjet engine according to claim 1 wherein the compressed-air conveyance means is extended as a thruster heat-exchange chamber externally to walls of the reaction-engine thruster in communication between one-way outlet valves in the double-ended compressor cylinder and the at-least-one combustor intake port in the combustor section of the reaction-engine thruster and further comprising; and thruster heat-exchange members extended from walls of the thruster into the thruster heat-exchange chamber.

15. A rocketjet engine according to claim 1 and further comprising:

a bypass-air duct positioned externally to the double-ended compressor cylinder and in fluid communication from proximate an air scoop fluidly upstream from the double-ended compressor cylinder to a bypass mix section fluidly downstream from the reaction-engine thruster.

16. A rocketjet engine according to claim 15 and further comprising:

a bypass fan positioned in the bypass-air duct in gear-driven relationship to the rotational power-takeoff shaft.

17. A rocketjet engine according to claim 1 and further comprising:

a thruster oxidizer injector in fluid transmission between the outside periphery and the inside periphery of the combustor section of the reaction-engine thruster; and a thruster oxidizer pump regulative to pump regulatable amounts of oxidizer at predetermined rates and timing to a thruster oxidizer injector through oxidizer conveyances from an oxidizer container.

18. A rocketjet engine according to claim 1 wherein the rotational-power-takeoff means is a double-end-cam drive having a double-end-cam follower to which the drive end of the drive-end power shaft is connected concentrically and further comprising:

an air-scoop nose cone attached to the double-ended compressor cylinder and having air-scoop orifices through which intake air is directed for conveyance to the double-ended compressor cylinder.

19. A rocketjet engine according to claim 18 and further comprising:

a thruster oxidizer injector in fluid transmission between the outside periphery and the inside periphery of the combustor section of the reaction-engine thruster; and a thruster oxidizer pump regulative to pump regulatable amounts of oxidizer at predetermined rates and timing to a thruster oxidizer injector through oxidizer conveyances from an oxidizer container.

20. A rocketjet engine according to claim 19 and further comprising:

a bypass-air duct positioned externally to the double-ended compressor cylinder and in fluid communication from proximate an air scoop fluidly upstream from the double-ended compressor cylinder to a bypass mix section fluidly downstream from the reaction-engine thruster.

21. A rocketjet engine according to claim 20 and further comprising:

a bypass fan positioned in the bypass-air duct in gear-driven relationship to the rotational power-takeoff shaft.

22. A rocketjet engine having: a reaction-engine thruster;

an air-compressor engine having an air compressor in air-compression relationship to the reaction-engine thruster;

a fuel container;

a fuel conveyance in fluid communication between the fuel container and the air-compressor engine;

a fuel conveyance in fluid communication between the fuel container and the reaction-engine thruster;

a water container;

a water conveyance in fluid communication between the water container and the air-compressor engine;

a water conveyance in fluid communication between the water container and the reaction-engine thruster;

a fuel injector in fluid communication between the fuel conveyance to the air-compressor engine and the air-compressor engine;

a fuel injector in fluid communication between the fuel conveyance to the reaction-engine thruster and a combustor portion of the reaction-engine thruster;

a phase-change water injector in fluid-phase-change communication between the water conveyance to the air-compressor engine and the air-compressor engine; and a phase-change water injector in fluid-phase-change communication between the water conveyance to the reaction-engine thruster and a combustor portion of the reaction-engine thruster.

23. A rocketjet engine according to claim 22 and further comprising:

an oxidizer container;

an oxidizer conveyance in fluid communication between the oxidizer container and a combustion portion of the reaction-engine thruster; and an oxidizer injector in fluid communication between the oxidizer conveyance and an inside periphery of a combustion portion of the reaction-engine thruster.

24. A racketjet engine having:

a double-acting compressor piston and a double-acting power piston centrally connected to each other by a compressor power shaft extended between them in sliding contact through an intermediate cylinder head of a double-ended compressor cylinder in which the double-acting compressor piston in caused to reciprocate and in sliding contact through an intermediate head of a double-ended power cylinder in which the double-acting power piston is caused to reciprocate;

a means of attachment of the double-ended compressor cylinder to the double-ended power cylinder;

a reaction-engine thruster attached to the double-ended compressor cylinder and the double-ended power cylinder proximate the double-ended compressor cylinder;

a compressor-air conveyance in fluid communication between outlet-valved ports for the double-ended compressor cylinder and inlet ports for a combustor section of the reaction-engine thruster;

a compressor-air conveyance in fluid communication between outlet-valved ports for the double-ended compressor cylinder and inlet ports for the double-ended power cylinder;

power-cylinder exhaust ports circumferentially around the inside periphery of the double-ended power cylinder at a position midway between opposite ends of the double-ended power cylinder;

power-piston compression rings at a drive end of the double-acting power piston positioned to uncover the power-cylinder exhaust ports when the compressor end of the double-acting power piston is at a compression end of a reciprocative stroke;

power-piston compression rings at a compressor end of the double-acting power piston positioned to uncover the power-cylinder exhaust ports when the drive end of the double-acting piston is at a compression end of a reciprocative stroke;

a power-cylinder exhaust manifold positioned in exhaust-conveyance relationship in fluid communication with power-cylinder exhaust ports around around an outside periphery of the double-ended power cylinder;

a double-end-cam drive positioned at a rotational-drive end of the double-ended power cylinder;

opposing end cams of the double-end-cam drive with cam slopes having a height equal to reciprocative travel of the double-acting power piston and double-acting compressor piston;

a cam-drive power shaft extended from a rotational-drive end of the double-acting power piston and having a plurality of cam followers extended radially in rotation-resisting reciprocative contact with a drive housing to cam contact with cam-drive contoured ends of the opposing end cams;

a rotational power-takeoff shaft in reciprocative-resisting rotational contact with the drive housing and having a cam sleeve with an inside periphery to which the opposing end cams are attached;

rotational power-takeoff means in rotational-drive relationship to rotational starting means and peripheral equipment;

a power-cylinder fuel injector in fluid conveyance of fuel from outside of each end of the double-ended power cylinder into each end of the double-ended power cylinder;

a power-cylinder phase-change water injector in fluid conveyance of water in liquid phase from outside of each end of the double-ended power cylinder to water in gaseous phase inside of each end of the double-ended power cylinder;

a thruster fuel injector in fluid conveyance of fuel from outside of a combustion section of a reaction-engine thruster into the combustor section of the reaction-engine thruster;

a thruster phase-change water injector in fluid conveyance of water in liquid phase from outside of the combustor section of the reaction-engine thruster to water in a gaseous phase inside of the combustion section of the reaction-engine thruster;

a power-cylinder fuel pump regulative to pump predetermined amounts of fuel into the double-ended power cylinder through a fluid conveyance through and the fuel injector at intervals determinable in relationship to compression ends of reciprocative strokes of the double-acting power piston;

a power-cylinder water pump regulative to pump predetermined amounts of water into the double-ended power cylinder through a fluid conveyance and the phase-change water injector at intervals determinable in relationship to compression ends of reciprocative strokes of the double-acting power piston;

a thruster fuel pump regulative to pump predetermined amounts of fuel into the combustion section of the thruster at a rate determinable in relationship to airflow rate from the double-ended compressor cylinder to the combustor section of the reaction-engine thruster; and an intake-air conveyance in intake-air transmission between an air scoop and intake-valved ports in the double-ended compressor cylinder.

25. A rocketjet engine according to claim 24 and further comprising:

a thruster oxidizer injector in fluid transmission between the outside periphery and the inside periphery of the combustor section of the reaction-engine thruster;

a thruster oxidizer pump regulative to pump predetermined amounts of oxidizer at design rates and timing to the thruster oxidizer injector through thruster oxidizer conveyances from an oxidizer container.

26. A rocketjet engine according to claim 25 and further comprising:

a power-cylinder oxidizer injector in fluid communication between an outside periphery and an inside periphery of ends of the double-ended power cylinder; and a power-cylinder oxidizer pump regulative to pump regulatable amounts of oxidizer at design rates and timing to the power-cylinder oxidizer injector conveyances from the oxidizer container.

27. A rocketjet engine according to claim 24 wherein the power-cylinder phase-change water injector has a tubular conveyance in fluid communication between a proximal end positional outside of the power cylinder and an electrical-resistance-heated phase-change bore at a distal end in fluid communication with the inside of the power cylinder, a means for attachment of a fluid conveyance at the proximal end of the power-cylinder phase-change water injector, a means for attachment to the power cylinder intermediate the proximal end and the distal end of the power-cylinder phase-change water injector, an electrical-resistance-heated phase-change chamber having an inside periphery formed by walls extended from the distal end of the power-cylinder phase-change water injector in a generally-circular form at a design distance from the electrical-resistance-heated phase-change bore, and a one-way valve having a one-way-valve seat at a distal end of the electrical-resistance-heated phase-change chamber.

28. A rocketjet engine according to claim 27 and further comprising:

a valve chamber at a proximal end of the tubular conveyance;

a valve sleeve positional in the valve chamber;

a valve seat with coned walls extending from a minor diameter at a distal end of the valve sleeve to a larger major diameter at an entrance to the electrical-resistance-heated phase-change chamber;

an injector valve having a valve shaft extended from a minor diameter and extendible through the valve sleeve with fluid-conveyance space between the inside diameter of the valve sleeve and an outside peripheral portion of the valve shaft;

a fastener with flow-control shoulders attachable to the valve shaft inside the valve chamber at a position on the valve shaft which allows a design distance of travel of the fastener and the flow-control shoulders to a control base at a distal end of the valve sleeve such that distance of opening travel of the injector valve is determinable by positioning of the fastener with flow-control shoulders on the valve shaft;

truncate-coned valve walls extended from a minor diameter at a proximal end to a major diameter at a distal end and positional in sealing contact with the valve seat;

a swirl cone on the distal end of the valve opposite the truncate-coned valve walls;

an electrical-resistance-heated phase-change bore concentric with the swirl cone in fluid communication between the inside periphery of the electrical-resistance-heated phase-change chamber and a distal end of the electrical-resistance-heated phase-change bore;

truncate-sphere-shaped inside peripheral walls of the electrical-resistance-heated phase-change chamber concentric with the electrical-resistance-heated phase-change bore such that a gaseous substance such as air which is being compressed into the electrical-resistance-heated phase-change chamber through the electrical-resistance-heated phase-change bore is directed against a point of the swirl cone which directs the gaseous substance outward radially against the truncate-sphere-shaped inside peripheral walls of the electrical-resistance-heated phase-change chamber which then directs the gaseous substance inward radially against additional gaseous substance which is being compressed into the electrical-resistance-heated phase-change chamber in a manner to cause a progressively-compressed inward swirl of the gaseous substance within the electrical-resistance-heated phase change chamber;

major diameters of the valve seat and valve are positioned to allow exit of fluid from within the valve chamber at a design relationship to the progressively-compressed inward swirl of the gaseous substance within the electrical-resistance-heated phase-change chamber for optimizing mixture of the water with the gaseous substance; and walls of the valve and walls of the valve seat are tapered in a common design angle for directing exit of fluid from within the valve chamber into the progressively-compressed inward swirl of the gaseous substance within the electrical-resistance-heated phase-change chamber for optimizing mixture of the water with the gaseous substance.

29. A rocketjet engine according to claim 28 wherein the inside peripheral walls of the electrical-resistance-heated phase-change chamber are positioned for impingement of a skirt of injected water from the valve at a design angle and further comprising;

an electrical-supply line in insulated electrical communication with the electrical-resistance-heated phase-change chamber; and a ground connection of the electrical-resistance-heated phase-change chamber and the electrical-resistance-heated phase-change bore to the double-ended power cylinder.

30. A rocketjet engine according to claim 24 and further comprising:

a phase-change injector having a tubular conveyance in fluid communication between a proximal end outside of the reaction-engine thruster and an injector orifice at a distal end inside of the combustor section of the reaction-engine thruster;

means for attachment of a fluid conveyance at the proximal end of the thruster phase-change injector;

a means for attachment to the reaction-engine thruster intermediate the proximal end and the distal end of the thruster phase-change injector; and an atomizer valve port at the distal end of the thruster phase-change injector.

31. A rocketjet engine according to claim 30 and further comprising:

an electrical-resistance heater at a design distance circumferentially from an axis of the injector orifice and positioned a design distance downstream fluidly from the injector orifice.

32. A rocketjet engine according to claim 24 and further comprising:

a regenerative heat-exchange chamber positioned at a design distance from an outside periphery of the double-ended power cylinder in fluid communication between the compressed-air conveyance and in fluid communication between outlet-valved ports for the double-ended compressor cylinder and inlet ports for the double-ended power cylinder.

33. A rocketjet engine according to claim 24 wherein the double-acting compressor piston is hollow and further comprising:

one-way-outlet-valved compressor-cylinder outlet ports in each head of the double-acting compressor piston;

a fluid conveyance bore in the compressor power shaft;

a compressor-power-shaft inlet port in fluid conveyance from the hollow compressor piston to the fluid-conveyance bore in the compressor power shaft;

a fluid-conveyance bore in the cam-drive power shaft in fluid conveyance between a drive end of the double-acting power piston and a compressor end of the double-acting power piston;

compressor-end power-cylinder inlet ports in the compressor power shaft in fluid communication between the fluid-conveyance bore in the compressor power shaft and an inside periphery of the compressor end of the double-ended power cylinder when the drive end of the double-acting power piston is at a compression end of reciprocative strokes and the compressor end of the double-acting power piston is at an exhaust end of reciprocative strokes with power-cylinder exhaust ports uncovered by the double-acting power piston; and drive-end power-cylinder inlet ports in the drive-end power shaft in fluid communication between the fluid-conveyance bore in the drive-end power shaft and an inside periphery of the drive end of the double-ended power cylinder when the compressor end of the double-acting power piston is at compression ends of reciprocative strokes and the drive end of the double-acting power piston is at exhaust ends of reciprocative strokes with power-cylinder exhaust ports uncovered by the double-acting power piston.

34. A rocketjet engine according to claim 33 and further comprising:

an inside periphery of a central outlet port in a thruster-end head of the hollow double-acting compressor piston in sliding-seal contact with an outside periphery of an outlet sleeve attached to a thruster-end head of the double-acting compressor cylinder in fluid communication from an inside periphery of the hollow double-acting compressor piston; and outlet-sleeve orifices in fluid communication between the outlet sleeve and thruster inlet ports in the combustor portion of the reaction-engine thruster.

35. A rocketjet engine according to claim 11 and further comprising:

a thruster oxidizer injector in fluid transmission between the outside periphery and the inside periphery of the combustor section of the reaction-engine thruster; and a thruster oxidizer pump regulative to pump regulatable amounts of oxidizer at predetermined rates and timing to the thruster oxidizer injector through oxidizer conveyances from an oxidizer container.

36. A rocketjet engine according to claim 35 wherein the air scoop is cone-shaped, having a nozzle point at a leading end of the rocketjet engine, nozzle walls enclosing a design portion of the rocketjet engine, a nozzle base attached to the rocketjet engine at a design position in relation to the reaction-engine thruster, and a plurality of air-scoop orifices sized, shaped and positioned in the walls of the cone-shaped air scoop to allow intake air to enter and to minimize boundary-layer drag of the rocketjet engine in atmospheric and stratospheric conditions of transatmospheric operation.

37. A rocketjet engine according to claim 34 wherein the air scoop is cone-shaped, having a nozzle point at a leading end of the rocket engine, nozzle walls enclosing a design portion of the rocketjet engine, a nozzle base attached to the rocketjet engine at a design position in relation to the reaction-engine thruster, and a plurality of air-scoop orifices sized, shaped and positioned in the walls of the cone-shaped air-scoop to allow intake air to enter and to minimize surface air-foil drag of the rocketjet engine in atmospheric and stratospheric operation.

38. A rocketjet engine according to claim 36 and further comprising:

a bypass duct in communication of intake air from proximate the air scoop to a bypass mix section downstream from the reaction-engine thruster.

39. A rocketjet engine according to claim 37 and further comprising:

a bypass duct in communication of intake air from proximate the air scoop to a bypass mix section downstream from the reaction-engine thruster.

40. A rocketjet engine according to claim 34 and further comprising:

a bypass fan in gear-driven relationship to the power-takeoff shaft; and a bypass duct in communication of intake air from proximate the air scoop to a bypass mix section downstream from the reaction-engine thruster.

41. A rocketjet engine according to claim 35 and further comprising:

a bypass fan in gear-driven relationship to the power-takeoff shaft; and a bypass duct in communication of intake air from proximate the air scoop to a bypass mix section downstream from the reaction-engine thruster.

42. A rocketjet engine according to claim 34 and further comprising:

a propeller attached in rotationally-driven relationship to the power-takeoff shaft.

43. A rocketjet engine according to claim 34 and further comprising:

a rotary-wing speed-reduction gear and drive shaft attached in rotationally-driven relationship to the power-takeoff shaft.

44. A rocketjet engine according to claim 24 wherein the reaction-engine thruster is a variable-nozzle thruster having a nozzle cone that is slidable linearly in variable distance from a thruster nozzle sleeve to form a variable plug-nozzle venturi throat between the thruster nozzle sleeve and a cone base extended from a combustor section of the reaction-engine thruster, the cone base having a diameter larger than a diameter of the thruster nozzle sleeve.

45. A rocketjet engine according to claim 24 and further comprising:

a second rocketjet engine as described in claim 1;

a power-takeoff shaft of each joined end-to-end concentrically in vibration-damping relationship of weight, travel speed and travel distance of reciprocating parts of each.

46. A rocketjet engine according to claim 45 wherein the reaction-engine thrusters of each rocketjet engine are positioned with parallel axes which are perpendicular to the power-takeoff shafts of each of the two rocketjet engines to form an opposed twin-thruster rocketjet engine.

47. A rocketjet engine according to claim 45 and further comprising:

a double-compressor-engine thruster to which intake air from compressor cylinders of both rocketjet engines is directed through intake-air conveyances of a double-compressor, single-thruster rocketjet engine.

48. AS rocketjet engine according to claim 45 and further comprising:

a thruster oxidizer injector in fluid transmission between the outside periphery and the inside periphery of the combustion section of the reaction-engine thruster of each of the rocketjet engines; and a thruster oxidizer pump regulative to pump predetermined amounts of oxidizer at design rates and timing to a thruster oxidizer injector for each reaction-engine thruster through thruster oxidizer conveyances from an oxidizer container.

49. A rocketjet engine according to claim 24 wherein the double-acting compressor piston is a two-stage double-acting compressor piston having a first-stage piston end with a first-stage piston head having a first-stage diameter at one end for first-stage compression and a second-stage piston end with a second-stage piston head having a second-stage smaller diameter at the opposite end for second-stage further compression of air and optionally oxidizer compressed to a low pressure by the first-stage piston head and further comprising:

a double-ended compressor cylinder having a first-stage end in which the first-stage piston head is in sliding-seal contact, a first-stage cylinder head on the first-stage end, a second-stage end with a second-stage smaller diameter in which the second-stage piston head with a correspondingly smaller second-stage diameter is in sliding-seal contact, and having a second-stage cylinder head on the second-stage end of the double-ended compressor cylinder;

a means of fluid conveyance from the first-stage end to the second-stage end of the double-ended cylinder; and a means of fluid conveyance from the second-stage end of the double-ended compressor cylinder to a compressed-gas intake means at the reaction-engine thruster;

50. A rocketjet engine according to claim 49 wherein the double-acting compressor piston is hollow and further comprising:
one-way-outlet-valved ports in the first-stage piston head in one-way-valve fluid communication from the first-stage end of double-ended compressor cylinder to an inside periphery of the hollow double-acting piston;
one-way-outlet-valved ports in the second-stage piston head in one-way-valved fluid communication from the inside periphery of the hollow double-acting piston into the second-stage end of the double-ended compressor cylinder; and
one-way-outlet-valved ports in the second-stage cylinder head in one-way-valve fluid communication from the second-stage end of the double-ended compressor cylinder to a fluid conveyance from the double-ended compressor cylinder to the reaction-engine thruster.

51. A rocketjet engine according to claim 50 and further comprising:
a thruster oxidizer injector in fluid transmission between the outside periphery and the inside periphery of the combustor section of the reaction-engine thruster; and
a thruster oxidizer pump regulative to pump regulatable amounts of oxidizer at predetermined rates and timing to the thruster oxidizer injector through oxidizer conveyance from an oxidizer container.

52. A rocketjet engine according to claim 24 wherein the power-cylinder fuel injector is a phase-change fuel injector structured like the phase-change water injector for phase-change injection of fuel into the power cylinder in a fuel-rich combustion-gas form:

* * * * *

UNITED STATES PATENT AND TRADEMARK OFFICE
CERTIFICATE OF CORRECTION

PATENT NO.    : 5,222,361
DATED         : June 29, 1993
INVENTOR(S)   : Daniel E. Nelson et al.

It is certified that error appears in the above-identified patent and that said Letters Patent is hereby corrected as shown below:

The title page, showing the illustrative figure should be deleted and substitute therefor the attached title page.

Drawings, delete Sheets 1-14, consisting of Figs. 1-14, and substitute therefor drawing sheets, consisting of Figs. 1-14, as shown on the attached pages.

United States Patent [19]

Nelson et al.

[11] Patent Number: 5,222,361
[45] Date of Patent: Jun. 29, 1993

[54] ROCKETJET ENGINE

[76] Inventors: Daniel E. Nelson; Anju Nelson, both of 605 S. North Lake Blvd., No. 91,, Altamonte, Springs, Fla. 32701

[21] Appl. No.: 713,099

[22] Filed: Jun. 11, 1991

Related U.S. Application Data

[63] Continuation-in-part of Ser. No. 227,766, Aug. 3, 1988, abandoned.

[51] Int. Cl.⁵ .............................................. F02K 3/00
[52] U.S. Cl. ...................................... 60/269; 60/729
[58] Field of Search ................. 60/39.33, 39.53, 39.55, 60/226.1, 262, 269, 729

[56] References Cited

U.S. PATENT DOCUMENTS 3,541,795  11/1970  Nelson ............................... 123/532
3,570,463  3/1971  Nelson ................................... 60/269

Primary Examiner—Richard A. Bertsch
Assistant Examiner—W. T. Wicker

[57] ABSTRACT

A rocketjet engine has a light, hollow double-acting compressor piston (35 and 123). It is reciprocated by a smaller-diameter double-acting power piston (51) through a power shaft (52 and 60) connecting them. Up to 90 percent of intake air is routed from a compressor cylinder (36) to a thruster (1 and 106) and the remaining ten percent to a power cylinder (55). Fuel and water are preheated and sprayed into the power cylinder with phase-change injectors 67-70 at ends of compression strokes after complete flame-front propagation to actuate the compressor with combined combustion and steam pressure. To provide steam-propulsion pressure in addition to peak-heat combustion pressure and to cool the thruster, fuel is preheated and spray injected into an upstream combustor (8 and 109) portion of the thruster (1 and 106). Water is added as wet steam through a flash-boiler-steam injector (30) at a downstream portion of the combustor in order achieve prior peak combustion heat, pressure and completeness of flame propagation. Variable nozzle-to-throat-ratio thrusters (1) maximize thrust efficiency at any atmospheric or space altitude. Fixed-nozzle-to-throat-ratio thrusters (106) maximize efficiency and low weight at dedicated altitude ranges. A porous intake cone (90) has less frontal drag than pointed rocket engines. Various vibration-damping, power-take-off and operational features are provided.

52 Claims, 15 Drawing Sheets

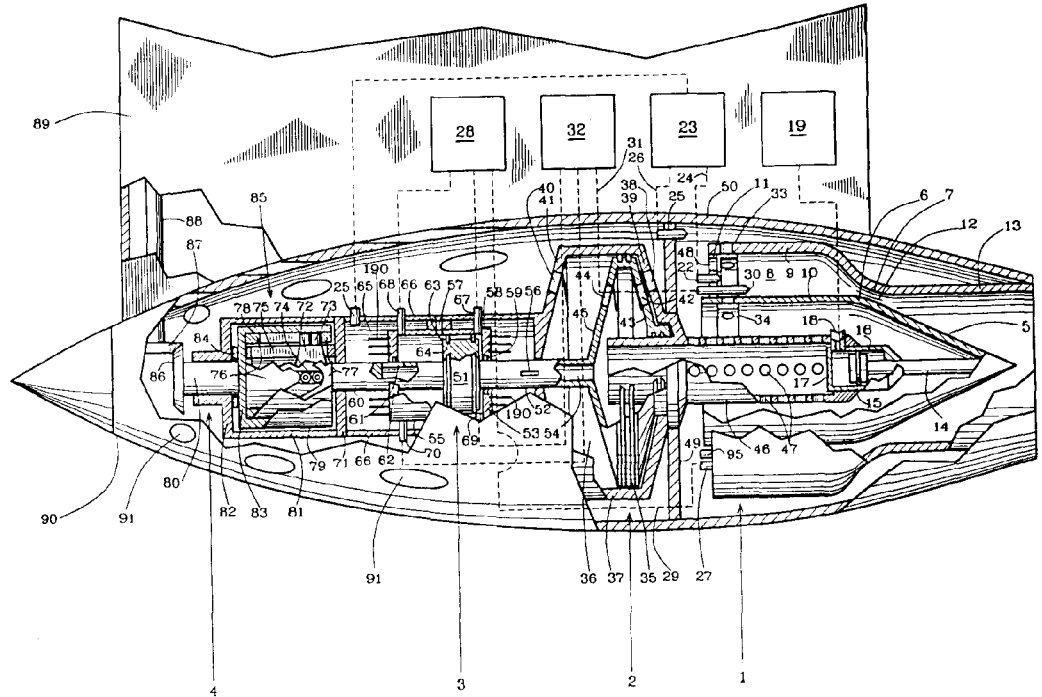

FIG.13
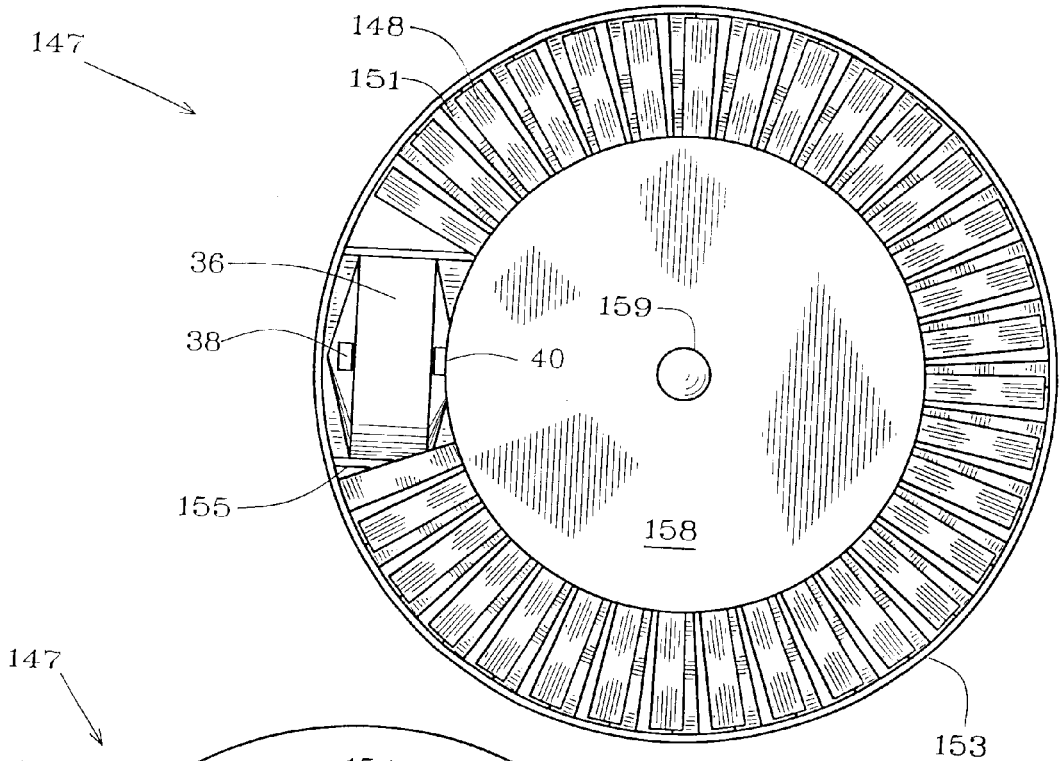
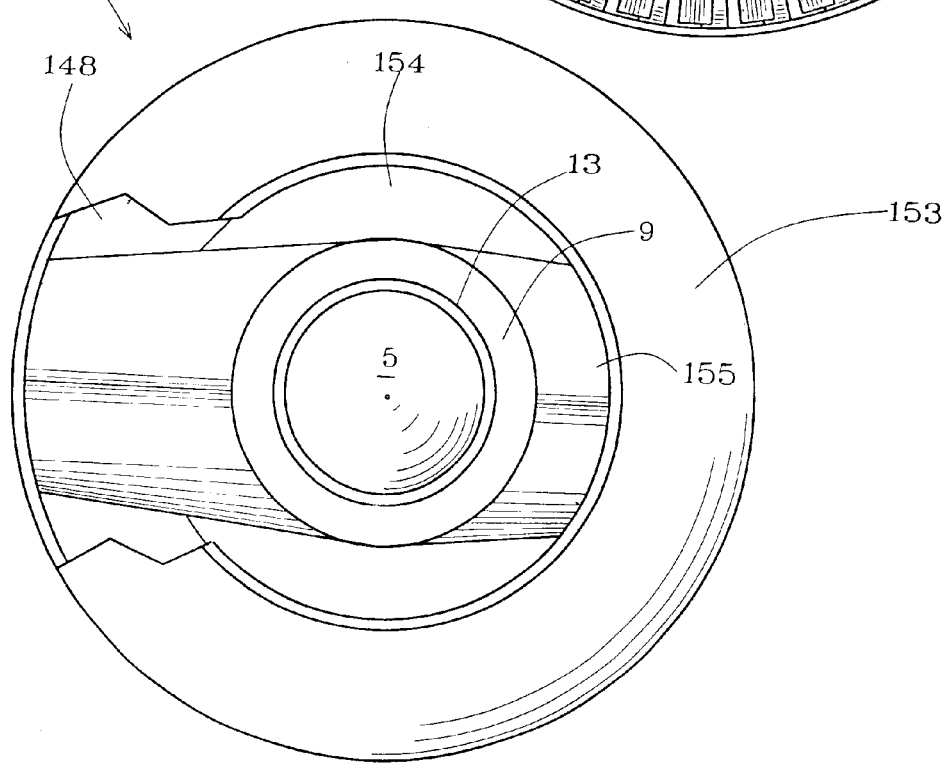
FIG.14

UNITED STATES PATENT AND TRADEMARK OFFICE
CERTIFICATE OF CORRECTION

PATENT NO.      : 5,222,361
DATED           : June 29, 1993
INVENTOR(S)     : Daniel E. Nelson et al.

It is certified that error appears in the above-identified patent and that said Letters Patent is hereby corrected as shown below:

Column 2,
Line 40, delete "system" and insert -- systems --; delete "It is" and insert -- They are --; and delete "engine" (2nd occur.) and insert -- engines --.
Line 43, delete "it provides" and insert -- they provide --.

Column 4,
Line 42, delete "and",
Line 44, after "engines." add -- and --.
Line 56, after "with" insert -- separte but similar --.

Column 7,
Lines 50-51, insert the following paragraph:

--Designations of fluid containers 19, 23, 28 and 32 are intended to include fluid sources and fluid pumps which are appropriate for each application. Thus, nozzle-control fluid container 19 indicates a fluid container and a pump for pumping either gaseous or liquid nozzle-control fluid in and out of the control end 17 of the control cylinder 16. Oxidizer container 23 indicates an oxidizer source and pump for pumping either liquid or gaseous oxidizer fluid to thruster oxidizer injector 22 or to either upstream oxidizer injector 25. Fuel container 28 indicates a fuel source and pump for timed pumping of fuel to thruster fuel injector 27, to compressor-end phase-change fuel injector 67 and to drive-end phase-change fuel injector 68. Water container 32 indicates a water source and pump for timed pumping of water to thruster phase-change water injector 30, to compressor-end phase-change water injector 69 and to drive-end phase-change injector 70.. Such pumps, which are not a part of this disclosure, are designed for the injection rate, the fluid lubricity and the physical state of each of the respective fluids.--

Line 62, after "2." insert -- Compressor piston 35 is referred to also as being double-ended and can be either single-stage or double-staged. --.

Column 9,
Line 49, delete "nigh" and insert -- high --; and
Line 51, after "alternately" delete "through".

Column 10,
Line 31, after "80." insert -- The rotational power-take off shaft is referred to optionally as a power-take off shaft or as a drive shaft. --.

UNITED STATES PATENT AND TRADEMARK OFFICE
CERTIFICATE OF CORRECTION

PATENT NO.    : 5,222,361
DATED         : June 29, 1993
INVENTOR(S)   : Daniel E. Nelson et al.

It is certified that error appears in the above-identified patent and that said Letters Patent is hereby corrected as shown below:

Column 10 (cont'd),
Line 44, delete "for"; and
Lines 43 and 44, insert the following:

--The cam followers 72 extended radially from the cam-drive power shaft 60 are in rotation-resisting reciprocative contact with the drive base plate 71 as a base portion of drive housing 81 by means of sliding contact with walls transverse guide 75 which is extended from the base plate 71. The rotational power-takeoff shaft 80 is in reciprocation-resisting rotational contact with the drive housing 81 by means of opposing end cams 76 and 77 which are in sliding and rotational contact with cam-follower rollers 73 and 74. Rotation-resisting reciprocative contact and reciprocation-resisting rotational contact are terms adopted to describe features of the double-end-cam drive employed in preferred embodiments of this invention. Rotation-resisting reciprocative contact occurs when rotation of cam followers 72 is arrested and reciprocation the cam followers 72 is allowed by sliding contact with walls of the transverse guide 75. Reciprocation-resisting rotational contact occurs when reciprocation of rotational power-takeoff shaft 80 is arrested by rotational contact with thrust bearings 84 of a drive-shaft plate 83 and drive-housing plate 82 between a drive end of transverse guide 75 and drive housing plate 82. Rotational travel for guide 75 and drive housing plate 82. Rotational travel for reciprocation-resisting rotational contact is converted from reciprocative travel at lines of contact of cam followers, typically rollers 73, with cam slopes of end cams 76 and 77. The rotational travel is transmitted to the rotational power-takeoff shaft 80 through the sleeve extension 79 of the shaft 80 from the drive-shaft plate 83.--

Column 11,
Line 23, after "engine." insert -- Air scoop and nose cone are used interchangeably in relation to the rocketjet engine. --; and
Line 24, after "thrust" delete "is".

Column 13,
Line 24, after "tradeoffs." insert the -- The gear box 101 can also be a rotary-wing speed-reduction gear to rotary-wing drive shaft represented optionally as bypass-fan shaft 100. --.

Column 15,
Line 9, after "with a" insert -- double-acting piston with a --; and
Line 15, after "125." insert -- Circumferential walls of the first-stage piston head can be short enough to contain only sealing-ring grooves and to provide structural support for the first-stage piston head 120. --.

UNITED STATES PATENT AND TRADEMARK OFFICE
CERTIFICATE OF CORRECTION

PATENT NO.   : 5,222,361
DATED        : June 29, 1993
INVENTOR(S)  : Daniel E. Nelson et al.

It is certified that error appears in the above-identified patent and that said Letters Patent is hereby corrected as shown below:

Column 18,
Line 61, delete "heated" and insert -- heat --; and
Line 23, after "state." insert -- The valve 17 and the valve seat 171 together can be referred to optionally as an atomizer valve. --.

Column 19,
Line 34, after "176" insert -- which preferably has truncated-sphere-shaped inside walls --;
Lines 36-37, delete "resistance-hater" and insert -- resistance-heated --;
Line 39, after "55." insert -- The resistance-heated phase-change bore 178 is referred to optionally as an injector orifice. --; and
Line 47, after "182" insert -- , which is optionally concave, --.

Column 20,
Line 66, after "invention." insert the following:
-- Referring to FIGS. 4 and 5, intake air from inside of double-acting single-stage compressor piston 35 is directed into outlet sleeve 46 through outlet sleeve port 190. An inside periphery of a central outlet port 191 is in sliding-seal contact with an outside periphery of outlet sleeve 46. In embodiments having a fixed nozzle throat 107, the outlet sleeve can be terminated proximate the back-flow wall 49. In embodiments having a variable-nozzle thruster 1, the outlet sleeve 46 is extended into the nozzle cone 5 as illustrated.

A representative rocketjet engine would have the following characteristics.

Assumptions:

| | |
|---|---|
| Compression-piston diameter | 36 inches |
| Power-piston diameter | 10 inches |
| Piston speed | 10,000 feet-per-minute |
| Stroke length | 5 inches |
| Thrust velocity | 6,500 feet-per-second |
| Weight without bypass | 800 pounds |
| Weight with bypass | 1,200 pounds |

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

```
Airflow calculations:
    Area of compressor piston = 3.14 X 18 X 18 = 1,017 sq. in.
    Airflow to compressor in cubic feet per second
        = 1,017 / 144 sq. inches per sq. foot = 7.065 sq. feet
        - 25% volumetric and power-piston losses = 5.298 sq. feet
        X 10,000 feet per minute = 52,980 cu. feet per minute
        / 60 seconds per minute = 883 cu. feet per second
        / 14.5 cu. feet per pound of air
        = 60.89 pounds of air per second
Thrust calculations without bypass:
    Thrust = Lbs. of air per second X (exhaust velocity - intake
        velocity) / 32.2 = 60.89 X 6,500 / 32.2
        = 12,291.5 pounds of thrust (static)
Thrust per weight without bypass
    = 12,291.5 / 800 = 15.36 pounds
    = 15.36 pounds of thrust per pound of engine
```

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

```
   Thrust per weight with bypass
       = 15.36 X 5 for increased mass flow / 2 for decreased
         exhaust velocity / 1.5 for increased engine weight
       = 15.36 X 5 / 2 / 1.5 = 25.6 pounds
       = 25.6 pounds of thrust per pound of engine
   Specific fuel consumption in air-breathing mode
        0.20 Lb/H/Lb St. with single-stage compressor and variable
nozzle as illustrated in FIGS. 4 and 10
        0.15 Lb/H/Lb  St. with  two-stage compressor and  variable
nozzle as illustrated in FIG. 4
   Specific impulse in rocket mode
        350 S.
   Engine life between overhauls
        30,000 hours
```

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

Piston speed of 10,000 feet per second is possible due to lack of side-pressure friction and due to a bounce factor from compression and combustion instead of friction for reciprocative directional change of the pistons and shaft. Contact speed is approximately one-half of that for similar frictional contact from rotational in turbine engines.

Thrust velocity of approximately 6,500 feet per second is accounted for by high chamber pressure and low weight of exhaust gases with steam added to an unrestricted, rocket-type of thruster. The same exhaust velocity is assured at all power levels with full efficiency by the variable nozzle ratio. Exhaust velocity of present turbine engines is 2,000 to 2,500 feet per second, approximately one-third as fast, as a result of airflow-overrun cooling and resistance of turbine blades. Rocket exhaust velocity is approximately 6,000 feet per second, depending on propellants used. Lightness and higher pressure of steam in exhaust gases increase velocity in rocket mode by approximately 10 percent for whatever fuel and oxidizer are used.

Specific fuel consumption is decreased to approximately one-third of present air-breathing turbine engines as a result of the following factors:

(1) Two-to-three times the exhaust velocity per fuel consumption;
    (2) Elimination of compression work load for compressing air flow-overrun cooling air; and
    (3) Elimination of ram pressurization beyond what is necessary to maintain sea-level density of air.

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

Specific impulse of 350 for rocket mode is derived by the increase in exhaust velocity from lightness and high pressure of steam added. It is approximately a 10 percent increase over the 316 S. of the present Space Shuttle OMS Engine. The same propellants of monomethyldrazine fuel and nitrogen tetroxide can be used in this engine in rocket or partial rocket mode. Hotter-burning propellants than monomethyldrazine and nitrogen tetroxide can be used in the rocketjet engine and they can have a more ideal mixture ratio for higher combustion heat. As in air-breathing mode or partial air-breathing mode, the flash-boiler injection of steam for cooling increases instead of decreases exhaust velocity of any fuel and oxidizer. Increased combustion heat just results in increased steam pressure and exhaust velocity.

UNITED STATES PATENT AND TRADEMARK OFFICE
CERTIFICATE OF CORRECTION

PATENT NO.  : 5,222,361
DATED       : June 29, 1993
INVENTOR(S) : Daniel E. Nelson et al.

It is certified that error appears in the above-identified patent and that said Letters Patent is hereby corrected as shown below:

Column 20 (cont'd),

Water is considered as a propellant for specific impulse in rocket mode but not for specific fuel consumption in air-breathing mode. Up to an injection rate that decreases combustion completeness by heat reduction, water added as steam has the same effect on thrust as fuel on an average basis in either rocket or air-breathing mode. Initial amounts of steam have a greater thrust effect than fuel and oxidizer. Greater amounts have an effect equal to fuel. Still greater amounts of steam have less effect on thrust than equal weights of fuel. At a steam-injection rate that averages the thrust effects of an equal weight of fuel, cooling effect on the engine in rocket mode makes long engine life possible, the same as in air-breathing mode.

Whether for rocket mode or for air-breathing mode of operation, the amount of water consumed will vary between 30 percent and 50 percent of the amount of fuel consumed by weight. Differences in rate of water consumption will depend primarily on the level of heat generated in particular operating conditions, the particular fuels used, density of air and oxygen content at atmospheric or stratospheric altitudes, oxidizers used in rocket mode and ambient heat. Injection of water as steam will be thermostatically controlled as needed to maintain ideal heat for combustion completeness and material integrity.

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

Engine weight-per-thrust of the rocketjet engine is approximately equal to weight of the shuttle OMS engine. Weight of fuel and oxidizer pumps, together with related plumbing, the combustor and thrust chamber of the dedicated rocket shuttle engine are as great per thrust as the rocketjet engine that is convertible between air-breathing and rocket modes of operation.

An afterburner is not necessary in the rocketjet engine. Thrust per weight and exhaust velocity are already greater than can be achieved in turbine engines with an afterburner. In addition, specific fuel consumption of the rocketjet engine is less instead of greater to achieve the greater thrust at a thrust velocity higher than possible with either an afterburner or with present rocket engines. Specific fuel consumption in turbine-engine after-burn practice is approximately 2.0 Lb/H/Lb. Compared to 0.2 Lb/H/Lb for the rocketjet engine, after-burning consumes approximately ten times as much fuel per thrust. This

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd), is due to poor combustion conditions downstream from a turbine-engine combustor. Further, after-burning is not possible in the rocketjet engine because of idealized fuel/air mixture ratio that utilizes all oxygen in the combustor. There is no airflow overrun to provide excess air to support after-burn combustion. Nor is there need to compensate for the airflow-overrun deterrent to thrust velocity and to compensate for the high work-load penalty for compression of airflow overrun to combustion-supportive pressure levels as in turbine engines with after-burning.

Engine life of 30,000 operating hours for a rocketjet engine is made possible by (1) absence of side pressure in piston conditions, (2) low heat with steam in combustion sections, and (3) wear-compensating adjustment of rollers in the cam-drive section. This engine life applies to rocket mode also. The shuttle OMS engine, by contrast, is limited to 20 minutes per firing time and 100 missions, for a total use life of only 33

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd), hours. Nearly one-thousandth as long. But it costs over 10 times as much to produce and over 1,000 times as much overall to operate. Further, its capabilities are limited to blast-off rocketry instead of lower cost of space flight and space utilization than commercial air flight made possible with the rocketjet engine.

From the above factors as general guides, particular sizes of rocketjet engines can be compared to present turbine engines and the OMS rocket engine as verifiable in JANE'S ALL THE WORLD'S AIRCRAFT and other public documents. A popular small size of jet engines currently in use for fighter aircraft and business aircraft weighs 640 pounds. It has a static thrust of 3,175 pounds. Its diameter is 24 inches. Specific fuel consumption is 0.71 Lb/H/Lb.

By comparison, a rocketjet engine with the same diameter but less than one-half of the frontal drag can have the following specifications. FIG. 2, 4, 9, 10 and 12 embodiments are used in this comparison.

| | |
|---|---|
| Diameter | 24 inches (except FIG. 12) |
| Weight | 400-600 pounds (FIG. 12, 1,000 pounds) |
| Thrust (static) | |
| FIG. 2 | 3,794 Lbs. |
| FIG. 4 | 12,295 Lbs. |
| FIG. 9 | 2,732 Lbs. |
| FIG. 10 | 6,148 Lbs. |
| FIG. 12 | 24,590 Lbs. |

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

Specific fuel consumption, cruising at Mach 3-4 between 80,000 and 100,000 feet altitude. Owing to increased speed per specific fuel consumption, total fuel consumption is one-third-to-one-fourth per nautical mile of what it would be at Mach 1.

FIG. 2        0.22 Lb/H/Lb.
        FIG. 4        0.22 Lb/H/Lb.
        FIG. 9        0.15 Lb/H/Lb.
        FIG. 10      0.15 Lb/H/Lb.
        FIG. 12      0.22 Lb/H/Lb.

Specific impulse in full rocket mode at any altitude.

350 S.

For specific impulse, water is included as a propellant in

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd), addition to fuel and oxidizer. With flash-boiler steam injection, it improves specific impulse by making it possible to idealize mixture ratio of fuel and oxidizer to generate more heat. All heat down to a level that would deter complete combustion is then converted to high-pressure dry steam with light weight for greater exhaust velocity without sacrificing structural integrity. As with specific fuel consumption, total fuel consumption per nautical mile is decreased progressively with increase in speed in space. It is like "gearing up" but without frictional limitations. This increases greatly the cumulative speed achievable in space flight and vastly increases the range of space flight.

A large turbine engine newly being put into service has a fan diameter of 63 inches, a weight of 7,300 pounds and a static thrust of 25,000 pounds. Its specific fuel consumption is 0.575 Lb/H/Lb. Cruising at 35,000 feet altitude, it has a range of 10,670 miles.

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd),

By comparison, a rocketjet engine with a diameter of 63 inches has the following characteristics. The same embodiments are compared as for the 24-inch-diameter engines above.

| | |
|---|---|
| Diameter | 63 inches |
| Weight | 3,500-to-5,000 pounds (FIG.12, 6,500 pounds) |
| Thrust (static) | |
| FIG. 2 | 31,912 Lbs. |
| FIG. 4 | 73,463 Lbs. |
| FIG. 9 | 18,233 Lbs. |
| FIG. 10 | 36,662 Lbs. |
| FIG. 12 | 146,926 Lbs. |

Specific fuel consumption, as follows, will be substantially the same as for the same embodiments in smaller sizes as indicated above at the same mach 3-4 speed between 80,000 and 100,000 feet altitude. The same one-third-to-one-fourth of total fuel consumption per nautical mile at Mach 1 per specific fuel consumption also will apply for the same reasons.

| | |
|---|---|
| FIG. 2 | 0.22 Lb/H/Lb. |
| FIG. 4 | 0.22 Lb/H/Lb. |
| FIG. 9 | 0.15 Lb/H/Lb. |
| FIG. 10 | 0.15 Lb/H/Lb. |
| FIG. 12 | 0.22 Lb/H/Lb. |

Specific impulse in full rocket mode at any altitude.

350 S.

UNITED STATES PATENT AND TRADEMARK OFFICE
CERTIFICATE OF CORRECTION

PATENT NO.  : 5,222,361
DATED       : June 29, 1993
INVENTOR(S) : Daniel E. Nelson et al.

It is certified that error appears in the above-identified patent and that said Letters Patent is hereby corrected as shown below:

Column 20 (cont'd),

Embodiments using the fixed nozzle illustrated in FIGS. 5, 6, 7 and 8 are basic units of the rocketjet engine. While not as efficient, they are lighter, less expensive to produce and easier to maintain for light aerospace craft. They are less versatile but are more easily constructed for a dedicated use condition. One dedicated use of the FIG. 6 embodiment, for instance, will be for medium-to-long-range missiles fired at a rapid rate from a liquid-propellant air-breathing cannon planned by the same inventive entity. With this embodiment of the rocketjet, it can obsolete most star-war development to date, most bomber aircraft and most artillery at a small percent of the cost per world-wide effectiveness.

Although the rocketjet engine is convertible in-flight between rocket and air-breathing modes, most of its uses will be atmospheric and stratospheric. That is where most of the world's

UNITED STATES PATENT AND TRADEMARK OFFICE
CERTIFICATE OF CORRECTION

PATENT NO.   : 5,222,361
DATED        : June 29, 1993
INVENTOR(S)  : Daniel E. Nelson et al.

It is certified that error appears in the above-identified patent and that said Letters Patent is hereby corrected as shown below:

Column 20 (cont'd), transportation occurs. Consequently, most units will be embodiments without on-board oxidizer containers, plumbing and injectors. But the same features which make it convertible for transatmospheric use also make it more efficient in air-breathing mode.

In addition to making near-space and solar-system transportation feasible, it is also a shuttle engine for deep-space vehicles using an electro-atomic engine with near-light-speed thrust velocity planned by the same inventive entity for cumulative speeds faster than light. "FTL propulsion," it is known by to those who are familiar with the physics involved.

With the rocketjet engine, it will be possible to attain orbital altitude and speed with the same amount of fuel used by conventional turbine engines to propel an equal weight of vehicle for a distance of approximately 300 nautical miles in the atmosphere. This is less than one-thousandth of the cost per weight to achieve the same orbital speed and altitude with conventional rocket engines. Positioning Earth-orbital satellites can become as inexpensive per weight as sending an airmail package. Cost of building a space station can become comparable to some surface structures. Cost for traveling to the moon can become comparable to present long-range air flight.

Other planets and their moons can become readily accessible. Long-range air flight can be trajectory in and out of near space. Space travel can become as common as present air travel, less exspensive and safer.
This will be decreased to approximately one percent of present level per ton-mile of atmospheric and stratospheric

UNITED STATES PATENT AND TRADEMARK OFFICE
CERTIFICATE OF CORRECTION

PATENT NO. : 5,222,361
DATED : June 29, 1993
INVENTOR(S) : Daniel E. Nelson et al.

It is certified that error appears in the above-identified patent and that said Letters Patent is hereby corrected as shown below:

Column 20 (cont'd), transportation. Less than ten percent of fuel will be consumed per average ton-mile at the speed, altitude and high efficiency of the rocketjet engine. Completeness of combustion is higher due to ideal mixture ratio of fuel and oxidizer. Duration of high combustion temperatures when oxides of nitrogen form is shorter due to the quick temperature-drop with steam injection. Presence of water deters smog formation.

Aircraft to use the rocketjet engine can have large, high-lift wings to cushion reentry into the atmosphere from either space or stratospheric altitudes. Friction-heat speeds in the atmosphere can be avoided. Supersonic speeds at altitudes below sonic-boom levels that average 80,000 feet can be eliminated. The large wings make atmospheric portions of flight and take-off-and-landing slower, easier to control and safer. A new era of safer and more versatile aerospace craft is made possible with the rocketjet engine.

UNITED STATES PATENT AND TRADEMARK OFFICE
CERTIFICATE OF CORRECTION

PATENT NO.    : 5,222,361
DATED         : June 29, 1993
INVENTOR(S)   : Daniel E. Nelson et al.

It is certified that error appears in the above-identified patent and that said Letters Patent is hereby corrected as shown below:

Column 20 (cont'd),

```
      Within the foreseeable embodiments of this invention, there
is technology for a new era of aerospace propulsion.
      A new  and useful  rocketjet engine having  been described,
all   such    modifications,    adaptations,    substitutions    of
equivalents, combinations  of components, applications  and forms
thereof as described by the following claims are included in this
invention.
```

Signed and Sealed this

Twenty-fourth Day of August, 2004

JON W. DUDAS
*Director of the United States Patent and Trademark Office*